US011485663B2

(12) United States Patent
Dutta et al.

(10) Patent No.: US 11,485,663 B2
(45) Date of Patent: Nov. 1, 2022

(54) METHODS FOR MANUFACTURING GLASS ARTICLES

(71) Applicant: Corning Incorporated, Corning, NY (US)

(72) Inventors: Indrajit Dutta, Horseheads, NY (US); Jean Marc Galea, Samoreau (FR); Melinda Ann Hourihan, Corning, NY (US); Lisa Ann Lamberson, Painted Post, NY (US); Robert Michael Morena, Lindley, NY (US); Jian-Zhi Jay Zhang, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 398 days.

(21) Appl. No.: 16/542,585

(22) Filed: Aug. 16, 2019

(65) Prior Publication Data

US 2020/0062630 A1    Feb. 27, 2020

Related U.S. Application Data

(60) Provisional application No. 62/721,233, filed on Aug. 22, 2018.

(51) Int. Cl.
*C03B 3/00* (2006.01)
*C03C 3/118* (2006.01)
(Continued)

(52) U.S. Cl.
CPC ................ *C03B 3/00* (2013.01); *C03B 17/02* (2013.01); *C03B 17/06* (2013.01); *C03C 3/087* (2013.01);
(Continued)

(58) Field of Classification Search
None
See application file for complete search history.

(56) References Cited

U.S. PATENT DOCUMENTS 2,748,006 A    5/1956   Kreidl et al.
3,784,386 A    1/1974   Araujo et al.
(Continued)

FOREIGN PATENT DOCUMENTS

GB         851326 A      10/1960
JP       11079782 A       3/1999
(Continued)

OTHER PUBLICATIONS

Napolitano et al., "Viscosity of a Standard Soda-Lime-Silica Glass", J. Res. Nat. Bur. Stand. Sec. A: Phys. Ch., vol. 68A, No. 5, May 11, 1964, p. 439-448. (Year: 1964).*
(Continued)

*Primary Examiner* — Lisa L Herring
(74) *Attorney, Agent, or Firm* — Amy T. Lang; John P. McGroarty

(57) ABSTRACT

Methods of producing a glass article include melting a first glass composition and feeding a second glass composition into the melter. Both glass compositions include the same combination of components but at least one component has a concentration that is different in each. At least three glass articles may be drawn from the melter, including: a first glass article formed from the first glass composition; at least one intermediate glass article composed of neither the first nor the second glass composition; and a final glass article not composed of the first glass composition. The concentration of the at least one component in the intermediate glass article may be between the concentration in the first and second glass compositions. The first glass article and final glass article may have differing values for certain properties, and
(Continued)

the intermediate glass article may have an intermediate set of values for the same properties.

18 Claims, 27 Drawing Sheets

(51) Int. Cl.
*C03C 3/087* (2006.01)
*C03C 4/00* (2006.01)
*C03B 17/02* (2006.01)
*C03C 3/093* (2006.01)
*C03B 17/06* (2006.01)

(52) U.S. Cl.
CPC .............. *C03C 3/093* (2013.01); *C03C 3/118* (2013.01); *C03C 4/00* (2013.01); *C03C 2204/00* (2013.01)

(56) References Cited

U.S. PATENT DOCUMENTS

| | | | |
|---|---|---|---|
| 3,915,684 | A | 10/1975 | Schornhorst |
| 4,304,584 | A | 12/1981 | Borrelli et al. |
| 5,827,344 | A | 10/1998 | Fyles et al. |
| 5,972,460 | A | 10/1999 | Tachiwana |
| 6,508,083 | B1 | 1/2003 | Naka et al. |
| 7,406,841 | B2 | 8/2008 | Mitra |
| 8,158,543 | B2 | 2/2012 | Dejneka et al. |
| 2005/0235696 | A1 | 10/2005 | Mitra |
| 2008/0213626 | A1 | 9/2008 | Kobayashi et al. |
| 2013/0319031 | A1 | 12/2013 | Coats, IV et al. |
| 2013/0319051 | A1* | 12/2013 | Bisson ..................... C03B 5/26 65/182.1 |
| 2014/0230490 | A1 | 8/2014 | Ellison et al. |
| 2018/0339932 | A1 | 11/2018 | Qian et al. |

FOREIGN PATENT DOCUMENTS

| | | |
|---|---|---|
| JP | 2000007372 A | 1/2000 |
| JP | 2003-267789 A | 9/2003 |
| JP | 2015-086118 A | 5/2015 |
| RU | 2206524 C1 | 6/2003 |
| WO | 2012093563 A1 | 7/2012 |
| WO | 2017/132837 A1 | 8/2017 |

OTHER PUBLICATIONS

Encyclopedia Britannica, "Industrial Glass", Encyclopedia Britannica Online Encyclopedia, 26 pages, retrieved Sep. 9, 2014. (Year: 2014).*

International Search Report and Written Opinion of the European International Searching Authority; PCT/US2019/047112; dated Feb. 4, 2020; 15 Pgs.

Invitation To Pay Additional Fees and Partial Search Report of the European International Searching Authority; PCT/US2019/047112; dated Nov. 19, 2019; 8 Pgs.

Brown et al; "X-Ray Scattering and X-Ray Spectroscopy Studies of Silicate Melts"; Rev. Mineral.; V. 32; pp. 317-410 (1995.

Fluegel; "Thermal Expansion Calculation of Silicate Glasses at 210 C, Based on the Systematic Analysis of Global Databases"; http://glassproperties.com—Dec. 2007; 25 Pages.

A. Winkelmann, O. Schott: "Über thermische Widerstandscoefficienten verschiedener Gläser in ihrer Abhängigkeit von der chemischen Zusammensetzung (Dependence of the thermal resistance of various glasses from the chemical composition)"; Annalen der Physik, 1894, vol. 287, issue 4, p. 730-746—Machine Translation Submitted.

Chinese Patent Application No. 201980055222.4, Office Action, dated Jul. 13, 2022, 17 pages, (9 pages of English Translation and 8 pages of Original Copy); Chinese Patent Office.

* cited by examiner

METHODS FOR MANUFACTURING GLASS ARTICLES

CROSS-REFERENCE TO RELATED APPLICATION

This application claims the benefit of priority to U.S. Provisional Application Ser. No. 62/721,233 filed on Aug. 22, 2018, the content of which is relied upon and incorporated herein by reference in its entirety.

BACKGROUND

Field

This disclosure relates to methods for manufacturing glass articles, and in particular, to methods for forming glass articles having target coefficients of thermal expansion.

Technical Background

Glass articles are used in a variety of industries, including the semiconductor packaging industry. In the semiconductor packaging industry, chips are placed on carrier substrates (e.g., glass plates) for processing which may include thermo-mechanical and lithographic steps. However, processing techniques may vary among manufacturers, giving rise to different carrier requirements for different manufacturing techniques that, in turn, give rise to difficulties in manufacturing a single carrier substrate design that meets all the requirements for different manufacturers.

Accordingly, a need exists for alternative methods of manufacturing glass carriers for use in semiconductor manufacturing.

SUMMARY

According to various aspects disclosed herein, a method of producing a glass article includes melting a first glass composition in a melter, the first glass composition comprising a combination of glass constituent components. A second glass composition may then be fed into the melter. This second glass composition includes the same combination of glass constituent components but at least one glass constituent component has a concentration that is different from the concentration of the same component in the first glass composition. At least three glass articles may be drawn from the melter while maintaining the contents of the melter in a molten state, including: (1) a first glass article that is formed from the first glass composition; (2) at least one intermediate glass article that is composed of neither the first glass composition nor the second glass composition; (3) and a final glass article that is composed of a composition that is different from the first glass composition. The concentration of the at least one component in the at least one intermediate glass article may be between the concentration of the at least one component in the first glass composition and the concentration of the at least one component in the second glass composition. The first glass article may have a first set of values for a set of properties. The final glass article may have a second set of values for the same set of properties, the second set of values being different from the first set of values. The at least one intermediate glass article may have an intermediate set of values for the set of properties that is between the first set of values and the second set of values.

Some aspects include the method of any of the foregoing aspects, wherein the final glass article comprises the second glass composition.

Some aspects include the method of any of the foregoing aspects, wherein the concentration of the at least one glass constituent component of the second glass composition is different from the concentration of the at least one glass constituent component of the first glass composition by no more than 2 weight %.

Some aspects include the method of any of the foregoing aspects, wherein the at least one component is selected from $SiO_2$, $Al_2O_3$, $B_2O_3$, $Na_2O$, $MgO$, $CaO$, $AlF_3$, and $Sb_2O_3$.

Some aspects include the method of any of the foregoing aspects, wherein the at least one component comprises $AlF_3$.

Some aspects include the method of any of the foregoing aspects, wherein the set of properties comprises one or more of a coefficient of thermal expansion ("CTE"), a Young's modulus, a density, a 200 Poise temperature, a surface quality, a refractive index, a resistivity, and an edge strength.

Some aspects include the method of any of the foregoing aspects, wherein the CTE of the first glass article is equal to or within $\pm 7.5 \times 10^{-7}/°$ C. different from the CTE of the final glass article.

Some aspects include the method of any of the foregoing aspects, wherein the refractive index of the first glass article is less than or equal to $\pm 0.01$ different from the refractive index of the final glass article.

Some aspects include the method of any of the foregoing aspects, wherein the difference between the CTE of the at least one intermediate glass article and the CTE of the first glass article, as a percentage of the CTE of the first glass article, is greater than the difference between the Young's modulus of the at least one intermediate glass article and the Young's modulus of the first glass article, as a percentage of the Young's modulus of the first glass article.

Some aspects include the method of any of the foregoing aspects, wherein a viscosity of the composition within the melter varies by no more than 25 Poise during the drawing the at least three glass articles.

Some aspects include the method of any of the foregoing aspects, wherein a 200 Poise temperature of the glass mixture within the melter is less than or equal to 1500° C.

Some aspects include the method of any of the foregoing aspects, wherein the at least three glass articles are in the shape of a boule.

Some aspects include the method of any of the foregoing aspects, wherein the feeding the second glass composition is simultaneous with the drawing the at least three glass articles.

Some aspects include the method of any of the foregoing aspects, wherein the at least one intermediate glass article comprises at least 3 glass articles, each having a different concentration of the at least one glass constituent component that is between the concentration of the at least one glass constituent component in the first glass composition and the concentration of the at least one glass constituent component in the second glass composition.

Some aspects include the method of any of the foregoing aspects, wherein the at least one intermediate glass article comprises at least 8 glass articles, each having a different concentration of the at least one glass constituent component that is between the concentration of the at least one glass constituent component in the first glass composition and the concentration of the at least one glass constituent component in the second glass composition.

Some aspects include the method of any of the foregoing aspects, wherein the at least one intermediate glass article comprises at least 18 glass articles, each having a different concentration of the at least one glass constituent component that is between the concentration of the at least one glass constituent component in the first glass composition and the concentration of the at least one glass constituent component in the second glass composition.

Some aspects include the method of any of the foregoing aspects, wherein the at least one intermediate glass article comprises at least 28 glass articles, each having a different concentration of the at least one glass constituent component that is between the concentration of the at least one glass constituent component in the first glass composition and the concentration of the at least one glass constituent component in the second glass composition.

Some aspects include the method of any of the foregoing aspects, further comprising feeding into the melter a third glass composition comprising the same combination of glass constituent components. At least one glass constituent component has a concentration that is different from a concentration of the same component of the first glass composition and the second glass composition. The method further comprises drawing at least a first additional glass article and a final additional glass article from the melter while maintaining the contents of the melter in a molten state. The first additional glass article has a first additional set of values for the set of properties and the final additional glass article has a final additional set of values for the set of properties.

Some aspects include the method of any of the foregoing aspects, wherein the set of properties comprises one or more of a coefficient of thermal expansion ("CTE"), a Young's modulus, a density, a 200 Poise temperature, a surface quality, a refractive index, a resistivity, and an edge strength.

Some aspects include the method of any of the foregoing aspects, wherein the CTE of the first glass article is equal to or within $\pm 15 \times 10^{-7}/°$ C. different from the CTE of the final additional glass article.

Some aspects include the method of any of the foregoing aspects, wherein the difference between the CTE of the first additional glass article and the CTE of the first glass article, as a percentage of the CTE of the first glass article, is greater than the difference between the Young's modulus of the first additional glass article and the Young's modulus of the first glass article, as a percentage of the Young's modulus of the first glass article.

Some aspects include the method of any of the foregoing aspects, wherein a viscosity of the composition within the melter varies by no more than 25 Poise during the drawing the first glass article and the drawing the final additional glass article.

Some aspects include the method of any of the foregoing aspects, wherein a 200 Poise temperature of the glass mixture within the melter is less than or equal to 1500° C.

Some aspects include the method of any of the foregoing aspects, wherein the first glass composition comprises an alkali boroaluminosilicate glass composition.

Some aspects include the method of any of the foregoing aspects, wherein the first glass composition comprises an alkaline earth boroaluminosilicate glass composition.

Some aspects include the method of any of the foregoing aspects, wherein the first glass composition comprises a zinc boroaluminosilicate glass composition.

Some aspects include the method of any of the foregoing aspects, wherein the first glass composition comprises: greater than or equal to 60 wt % and less than or equal to 65 wt % $SiO_2$; greater than or equal to 1.5 wt % and less than or equal to 5.0 wt % $Al_2O_3$; greater than or equal to 0 wt % and less than or equal to 2 wt % $B_2O_3$; greater than or equal to 6 wt % and less than or equal to 18 wt % $Na_2O$; greater than or equal to 0 wt % and less than or equal to 10 wt % $K_2O$; greater than or equal to 2 wt % and less than or equal to 10 wt % MgO; greater than or equal to 0 wt % and less than or equal to 2 wt % CaO; greater than or equal to 0 wt % and less than or equal to 2 wt % $TiO_2$; and greater than or equal to 10 wt % and less than or equal to 15 wt % ZnO.

Some aspects include the method of any of the foregoing aspects, wherein the first glass composition comprises: greater than or equal to 60 wt % and less than or equal to 65 wt % $SiO_2$; greater than or equal to 10 wt % and less than or equal to 15 wt % $Al_2O_3$; greater than or equal to 2 wt % and less than or equal to 4 wt % $B_2O_3$; greater than or equal to 2 wt % and less than or equal to 5 wt % $Li_2O$; greater than or equal to 6 wt % and less than or equal to 18 wt % $Na_2O$; greater than or equal to 1 wt % and less than or equal to 3 wt % MgO; and greater than or equal to 0 wt % and less than or equal to 3 wt % CaO.

Some aspects include the method of any of the foregoing aspects, wherein the first glass composition comprises: greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; and greater than or equal to 7 wt % and less than or equal to 9 wt % CaO.

Some aspects include the method of any of the foregoing aspects, wherein the first glass composition comprises: greater than or equal to 56 wt % and less than or equal to 66 wt % $SiO_2$; greater than or equal to 9.5 wt % and less than or equal to 12.0 wt % $Al_2O_3$; greater than or equal to 3.0 wt % and less than or equal to 7.5 wt % $Li_2O$; greater than or equal to 6 wt % and less than or equal to 18 wt % $Na_2O$; greater than or equal to 0 wt % and less than or equal to 14 wt % $K_2O$; greater than or equal to 0 wt % and less than or equal to 2 wt % MgO; and greater than or equal to 0 wt % and less than or equal to 8 wt % CaO.

Some aspects include the method of any of the foregoing aspects, wherein the first glass composition comprises: greater than or equal to 45 wt % and less than or equal to 55 wt % $SiO_2$; greater than or equal to 22 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 8 wt % MgO; and greater than or equal to 7 wt % and less than or equal to 12 wt % CaO.

Some aspects include the method of any of the foregoing aspects, wherein the first glass composition comprises: greater than or equal to 35 wt % and less than or equal to 48 wt % $SiO_2$; greater than or equal to 17 wt % and less than or equal to 20 wt % $Al_2O_3$; greater than or equal to 0 wt % and less than or equal to 5 wt % $Na_2O$; greater than or equal to 0 wt % and less than or equal to 7 wt % $K_2O$; greater than or equal to 0 wt % and less than or equal to 4 wt % MgO; greater than or equal to 0 wt % and less than or equal to 8.5 wt % CaO; and greater than or equal to 25 wt % and less than or equal to 32 wt % $La_2O_3$.

Some aspects include the method of any of the foregoing aspects, wherein the first glass composition comprises: greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; greater than or equal to 7 wt % and less than or equal to 9 wt % CaO; greater than or equal to 0 wt % and less than or equal to 0.7 wt % $Sb_2O_3$; and greater than 0 wt % and less than or equal to 1.5 wt % $AlF_3$.

Some aspects include the method of any of the foregoing aspects, wherein the first glass composition comprises: greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; greater than or equal to 7 wt % and less than or equal to 9 wt % CaO; greater than or equal to 0 wt % and less than or equal to 0.7 wt % $Sb_2O_3$; and greater than 0.5 wt % and less than or equal to 1.5 wt % $AlF_3$.

Some aspects include a glass article formed from a glass composition comprising: greater than or equal to 56 wt % and less than or equal to 66 wt % $SiO_2$; greater than or equal to 9.5 wt % and less than or equal to 12.0 wt % $Al_2O_3$; greater than or equal to 3.0 wt % and less than or equal to 7.5 wt % $Li_2O$; greater than or equal to 6 wt % and less than or equal to 18 wt % $Na_2O$; greater than or equal to 0 wt % and less than or equal to 14 wt % $K_2O$; greater than or equal to 0 wt % and less than or equal to 2 wt % MgO; and greater than or equal to 0 wt % and less than or equal to 8 wt % CaO.

Some aspects include a glass article formed from a glass composition comprising: greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; greater than or equal to 7 wt % and less than or equal to 9 wt % CaO; greater than or equal to 0 wt % and less than or equal to 0.7 wt % $Sb_2O_3$; and greater than 0 wt % and less than or equal to 1.5 wt % $AlF_3$.

Some aspects include a method for manufacturing a glass article having a target coefficient of thermal expansion ($CTE_T$). The method includes melting a molten base glass composition (or a "first glass composition") having an initial overall cation field strength, determining the target $CTE_T$ over a temperature range, and replacing an amount of a first alkaline earth component or a first alkali component having a first cation field strength in the molten base glass composition with an amount of a second alkaline earth component or a second alkali component having a second cation field strength that is different from the first cation field strength to produce a modified glass composition. A base glass article formed from the molten base glass composition comprises an average base glass coefficient of thermal expansion CTEB over the temperature range. The modified glass composition comprising an average coefficient of thermal expansion $CTE_M$ over the temperature range that is within $+/-1.0\times10^{-7}/°$ C. of the target $CTE_T$ and a modified overall cation field strength that is different from the initial overall cation field strength.

Some aspects include the method of any of the foregoing aspects, wherein the second cation field strength is less than the first cation field strength; the modified overall cation field strength is less than the initial overall cation field strength; and $CTE_M$ is greater than CTEB.

Some aspects include the method of any of the foregoing aspects, wherein the replacing comprises replacing an amount of the first alkaline earth component with an amount of an alkali component.

Some aspects include the method of any of the foregoing aspects, wherein the first alkaline earth component comprises MgO and the alkali component comprises $Na_2O$.

Some aspects include the method of any of the foregoing aspects, wherein the replacing comprises replacing an amount of the first alkaline earth component with an amount of the second alkaline earth component.

Some aspects include the method of any of the foregoing aspects, wherein the replacing comprises replacing an amount of the first alkali component with an amount of the second alkali component.

Some aspects include the method of any of the foregoing aspects, wherein the second cation field strength is greater than the first cation field strength; the modified overall cation field strength is greater than the initial overall cation field strength; and $CTE_M$ is less than CTEB.

Some aspects include the method of any of the foregoing aspects, wherein the replacing comprises replacing an amount of the first alkali component with an amount of an alkaline earth component.

Some aspects include the method of any of the foregoing aspects, wherein the first alkali component comprises $Na_2O$ and the alkaline earth component comprises MgO.

Some aspects include the method of any of the foregoing aspects, wherein the temperature range is from 0° C. to 300° C.

Some aspects include the method of any of the foregoing aspects, wherein the temperature range is from 20° C. to 260° C.

Some aspects include the method of any of the foregoing aspects, wherein CTEB is greater than or equal to $85\times10^{-7}/°$ C. and less than or equal to $95\times10^{-7}/°$ C. over the temperature range from 20° C. to 260° C.

Some aspects include the method of any of the foregoing aspects, wherein the target $CTE_T$ is greater than or equal to $80\times10^{-7}/°$ C. and less than or equal to $100\times10^{-7}/°$ C. over the temperature range from 20° C. to 260° C.

Some aspects include the method of any of the foregoing aspects, wherein a glass article formed from the modified glass composition comprises a Young's modulus of greater than or equal to 68 GPa.

Some aspects include the method of any of the foregoing aspects, wherein the target $CTE_T$ is greater than or equal to $75\times10^{-7}/°$ C. and less than or equal to $85\times10^{-7}/°$ C. over the temperature range from 20° C. to 260° C.

Some aspects include the method of any of the foregoing aspects, wherein a glass article formed from the modified glass composition comprises a Young's modulus of greater than or equal to 73 GPa.

Some aspects include the method of any of the foregoing aspects, wherein the target $CTE_T$ is greater than or equal to $40\times10^{-7}/°$ C. and less than or equal to $70\times10^{-7}/°$ C. over the temperature range from 20° C. to 260° C.

Some aspects include the method of any of the foregoing aspects, wherein the target $CTE_T$ is greater than or equal to $40\times10^{-7}/°$ C. and less than or equal to $60\times10^{-7}/°$ C. over the temperature range from 20° C. to 260° C.

Some aspects include the method of any of the foregoing aspects, wherein a glass article formed from the modified glass composition comprises a Young's modulus of greater than or equal to 90 GPa.

Some aspects include the method of any of the foregoing aspects, wherein the target $CTE_T$ is greater than or equal to $40\times10^{-7}/°$ C. and less than or equal to $54\times10^{-7}/°$ C. over the temperature range from 20° C. to 260° C.

Some aspects include the method of any of the foregoing aspects, wherein the target $CTE_T$ is greater than or equal to $90\times10^{-7}/°$ C. and less than or equal to $150\times10^{-7}/°$ C. over the temperature range from 20° C. to 260° C.

Some aspects include the method of any of the foregoing aspects, wherein a glass article formed from the modified glass composition comprises a Young's modulus of greater than or equal to 65 GPa.

Some aspects include the method of any of the foregoing aspects, wherein a glass article formed from the modified glass composition comprises a Young's modulus of greater than or equal to 72 GPa.

Some aspects include the method of any of the foregoing aspects, wherein the modified glass composition comprises a 200 P temperature of less than or equal to 1500° C.

Some aspects include the method of any of the foregoing aspects, wherein the modified glass composition comprises a 200 P temperature of less than or equal to 1450° C.

Some aspects include the method of any of the foregoing aspects, wherein the base glass composition comprises an alkali boroaluminosilicate glass composition.

Some aspects include the method of any of the foregoing aspects, wherein the base glass composition comprises an alkaline earth boroaluminosilicate glass composition.

Some aspects include the method of any of the foregoing aspects, wherein the base glass composition comprises a zinc boroaluminosilicate glass composition.

Some aspects include the method of any of the foregoing aspects, wherein the base glass composition comprises: greater than or equal to 60 wt % and less than or equal to 65 wt % $SiO_2$; greater than or equal to 1.5 wt % and less than or equal to 5.0 wt % $Al_2O_3$; greater than or equal to 0 wt % and less than or equal to 2 wt % $B_2O_3$; greater than or equal to 6 wt % and less than or equal to 18 wt % $Na_2O$; greater than or equal to 0 wt % and less than or equal to 10 wt % $K_2O$; greater than or equal to 2 wt % and less than or equal to 10 wt % MgO; greater than or equal to 0 wt % and less than or equal to 2 wt % CaO; greater than or equal to 0 wt % and less than or equal to 2 wt % $TiO_2$; and greater than or equal to 10 wt % and less than or equal to 15 wt % ZnO.

Some aspects include the method of any of the foregoing aspects, wherein the base glass composition comprises: greater than or equal to 60 wt % and less than or equal to 65 wt % $SiO_2$; greater than or equal to 10 wt % and less than or equal to 15 wt % $Al_2O_3$; greater than or equal to 2 wt % and less than or equal to 4 wt % $B_2O_3$; greater than or equal to 2 wt % and less than or equal to 5 wt % $Li_2O$; greater than or equal to 6 wt % and less than or equal to 18 wt % $Na_2O$; greater than or equal to 1 wt % and less than or equal to 3 wt % MgO; and greater than or equal to 0 wt % and less than or equal to 3 wt % CaO.

Some aspects include the method of any of the foregoing aspects, wherein the base glass composition comprises: greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; and greater than or equal to 7 wt % and less than or equal to 9 wt % CaO.

Some aspects include the method of any of the foregoing aspects, wherein the base glass composition comprises: greater than or equal to 45 wt % and less than or equal to 55 wt % $SiO_2$; greater than or equal to 22 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 8 wt % MgO; and greater than or equal to 7 wt % and less than or equal to 12 wt % CaO.

Some aspects include the method of any of the foregoing aspects, wherein the base glass composition comprises: greater than or equal to 35 wt % and less than or equal to 48 wt % $SiO_2$; greater than or equal to 17 wt % and less than or equal to 20 wt % $Al_2O_3$; greater than or equal to 0 wt % and less than or equal to 5 wt % $Na_2O$; greater than or equal to 0 wt % and less than or equal to 7 wt % $K_2O$; greater than or equal to 0 wt % and less than or equal to 4 wt % MgO; greater than or equal to 0 wt % and less than or equal to 8.5 wt % CaO; and greater than or equal to 25 wt % and less than or equal to 32 wt % $La_2O_3$.

Some aspects include the method of any of the foregoing aspects, further comprising delivering the modified glass composition to a forming vessel.

Some aspects include the method of any of the foregoing aspects, further comprising forming the modified glass composition into a glass boule with the forming vessel.

Some aspects include the method of any of the foregoing aspects, wherein when the target $CTE_T$ is greater than or equal to $80\times10^{-7}/°$ C. and less than or equal to $100\times10^{-7}/°$ C. over the temperature range from 20° C. to 260° C., determining the target $CTE_T$ comprises determining the target $CTE_T$ according to the following equation:

$$CTE_T=(-1.17[\text{wt \% }SiO_2])-(1.31[\text{wt \% }Al_2O_3])-(0.84[\text{wt \% }B_2O_3])+(4.36[\text{wt \% }Na_2O])+(0.98[\text{wt \% }MgO])+(47.1[\text{wt \% }TiO_2])-(0.64[\text{wt \% }ZnO])+(4.45[\text{wt \% }K_2O])-(37.2[\text{wt \% }CaO])-1.17.$$

Some aspects include the method of any of the foregoing aspects, wherein when the target $CTE_T$ is greater than or equal to $40\times10^{-7}/°$ C. and less than or equal to $70\times10^{-7}/°$ C. over the temperature range from 20° C. to 260° C., determining the target $CTE_T$ comprises determining the target $CTE_T$ according to the following equation:

$$CTE_T=(6.58[\text{wt \% }SiO_2])+(0.67[\text{wt \% }Al_2O_3])+(0.04[\text{wt \% }B_2O_3])+(3.64[\text{wt \% }Na_2O])+(0.59[\text{wt \% }MgO])+(1.34[\text{wt \% }CaO])+6.58.$$

Some aspects include the method of any of the foregoing aspects, wherein when the target $CTE_T$ is greater than or equal to $90\times10^{-7}/°$ C. and less than or equal to $150\times10^{-7}/°$ C. over the temperature range from 20° C. to 260° C., determining the target $CTE_T$ comprises determining the target $CTE_T$ according to the following equation:

$$CTE_T=(137.56[\text{wt \% }SiO_2])-(5.47[\text{wt \% }Al_2O_3])+(1.18[\text{wt \% }Li_2O])+(2.22[\text{wt \% }Na_2O])+(1.32[\text{wt \% }K_2O])-(5.37[\text{wt \% }MgO])-(0.09[\text{wt \% }CaO])+137.56.$$

Some aspects include a glass article formed from a glass composition including greater than or equal to 56 wt % and less than or equal to 66 wt % $SiO_2$; greater than or equal to 9.5 wt % and less than or equal to 12.0 wt % $Al_2O_3$; greater than or equal to 3.0 wt % and less than or equal to 7.5 wt % $Li_2O$; greater than or equal to 6 wt % and less than or equal to 18 wt % $Na_2O$; greater than or equal to 0 wt % and less than or equal to 14 wt % $K_2O$; greater than or equal to 0 wt % and less than or equal to 2 wt % MgO; and greater than or equal to 0 wt % and less than or equal to 8 wt % CaO.

Some aspects include the glass article of any of the foregoing aspects, comprising a coefficient of thermal expansion (CTE) of greater than or equal to $90\times10^{-7}$ and less than or equal to $150\times10^{-7}/°$ C. over the temperature range from 20° C. to 260° C.

Some aspects include the glass article of any of the foregoing aspects, comprising a Young's modulus of greater than or equal to 70 GPa and less than or equal to 100 GPa.

Some aspects include the glass article of any of the foregoing aspects, wherein the Young's modulus is greater than or equal to 72 GPa and less than or equal to 85 GPa.

Some aspects include the glass article of any of the foregoing aspects, comprising a 200 Poise temperature of greater than or equal to 0° C. and less than or equal to 1500° C.

Some aspects include the glass article of any of the foregoing aspects, wherein the 200 Poise temperature is greater than or equal to 1250° C. and less than or equal to 1500° C.

Some aspects include the glass article of any of the foregoing aspects, wherein the glass composition comprises a density of greater than or equal to 2.25 g/cm$^3$ and less than or equal to 2.75 g/cm$^3$.

Some aspects include the glass article of any of the foregoing aspects, wherein:

13 wt %<[wt % Li$_2$O+wt % Na$_2$O+wt % K$_2$O]<31 wt %.

Various aspects disclosed herein may be combined in any permutation.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

Figure 21:
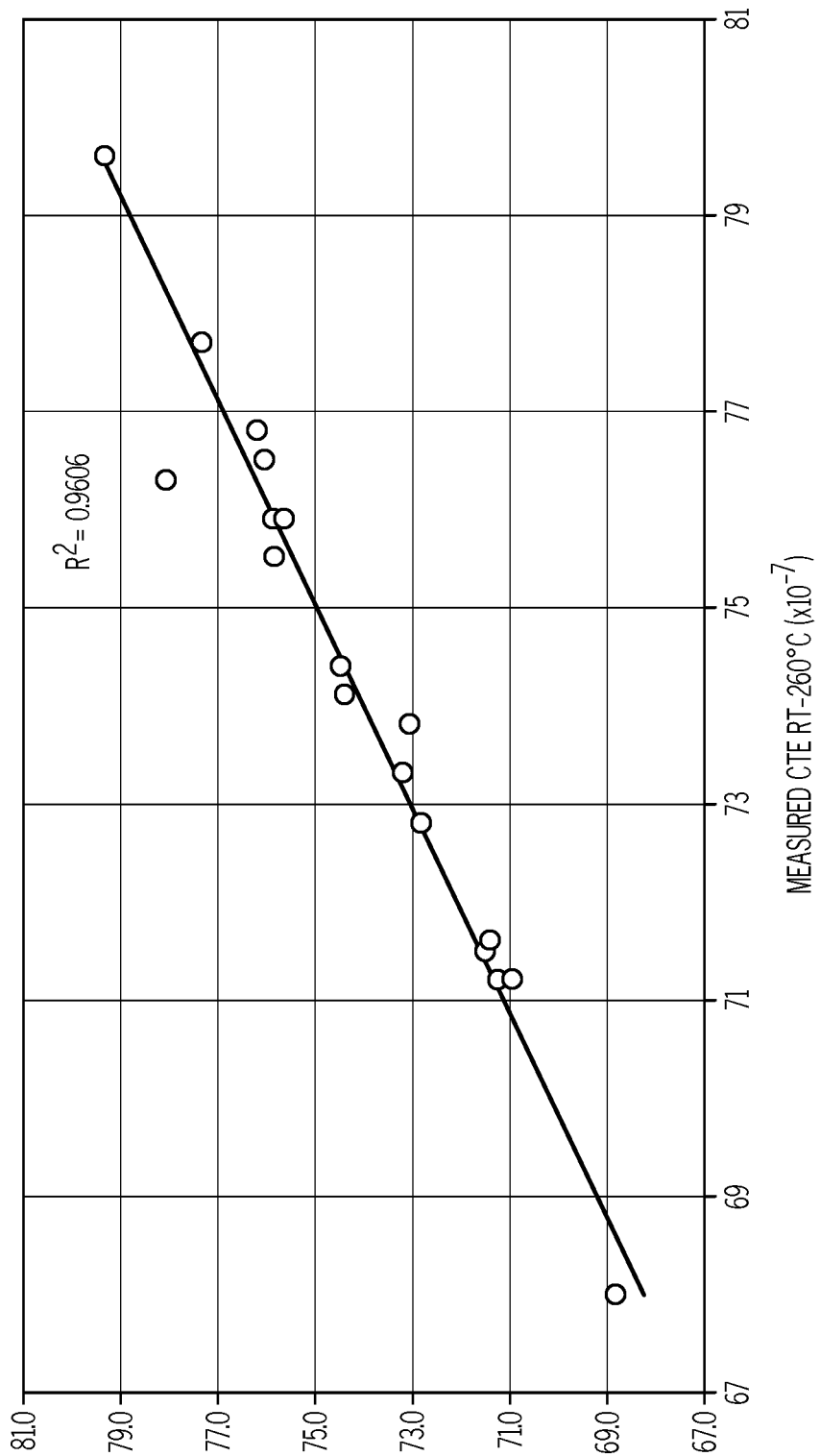
Figure 22:
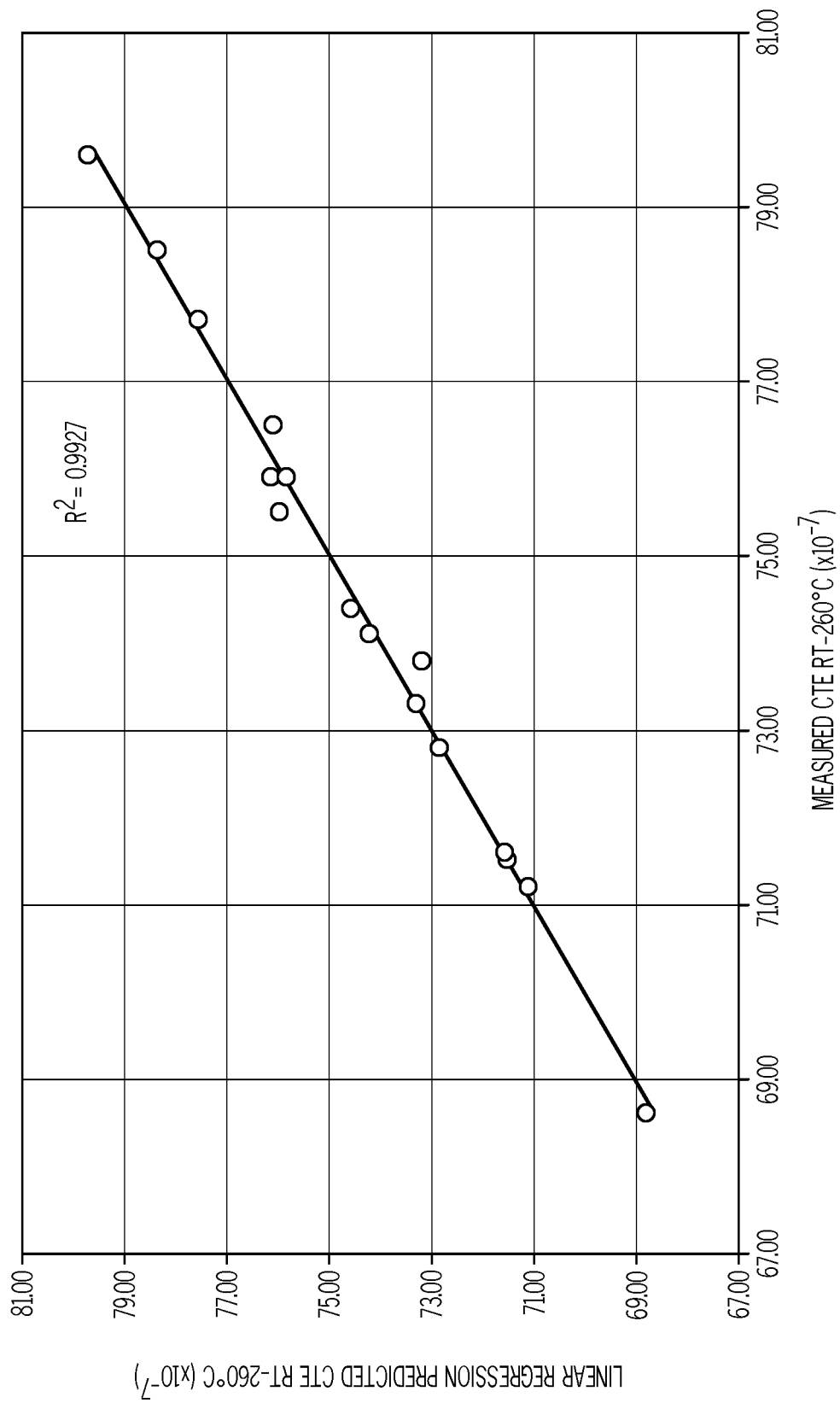
Figure 23:
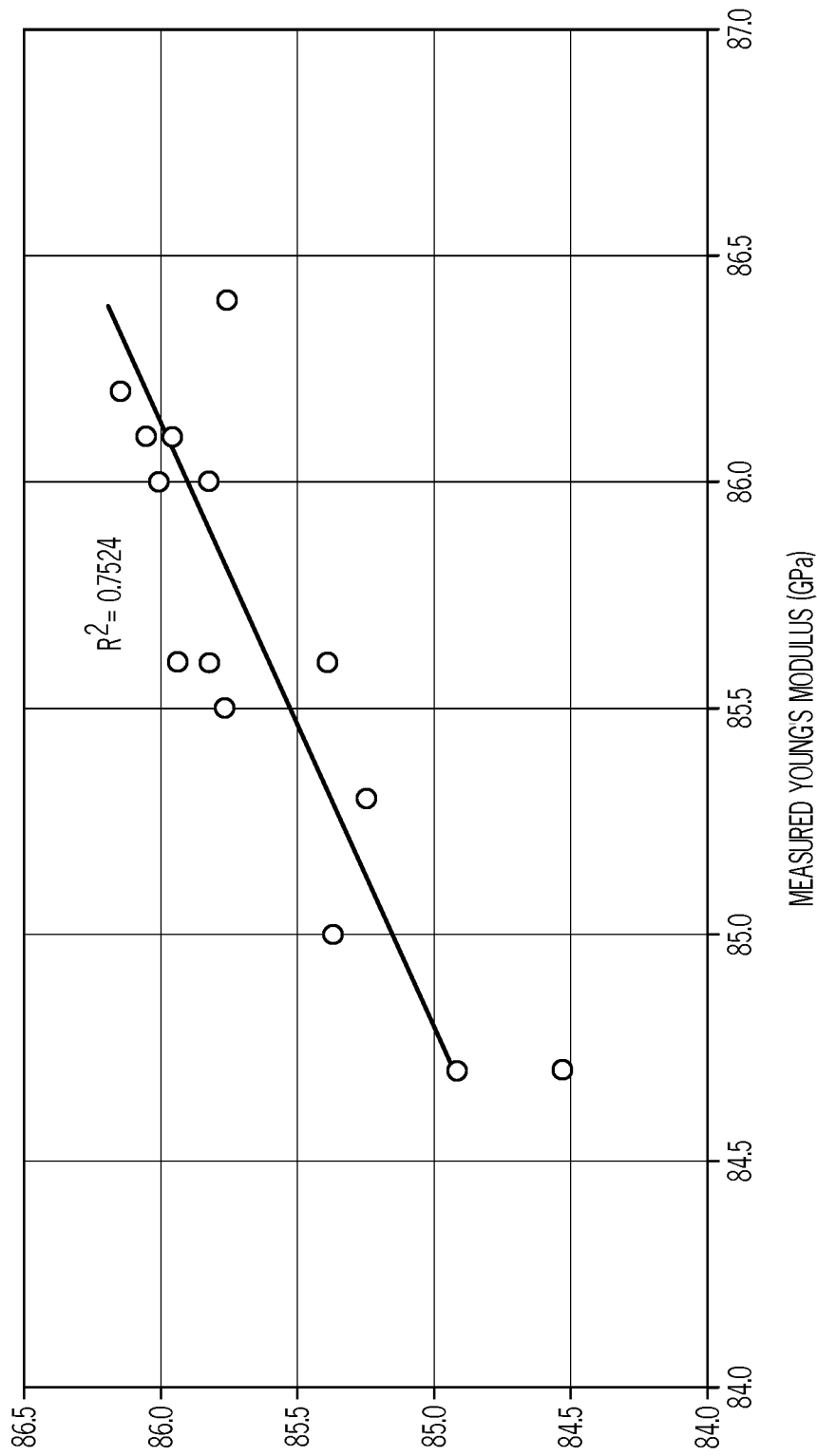
Figure 24:
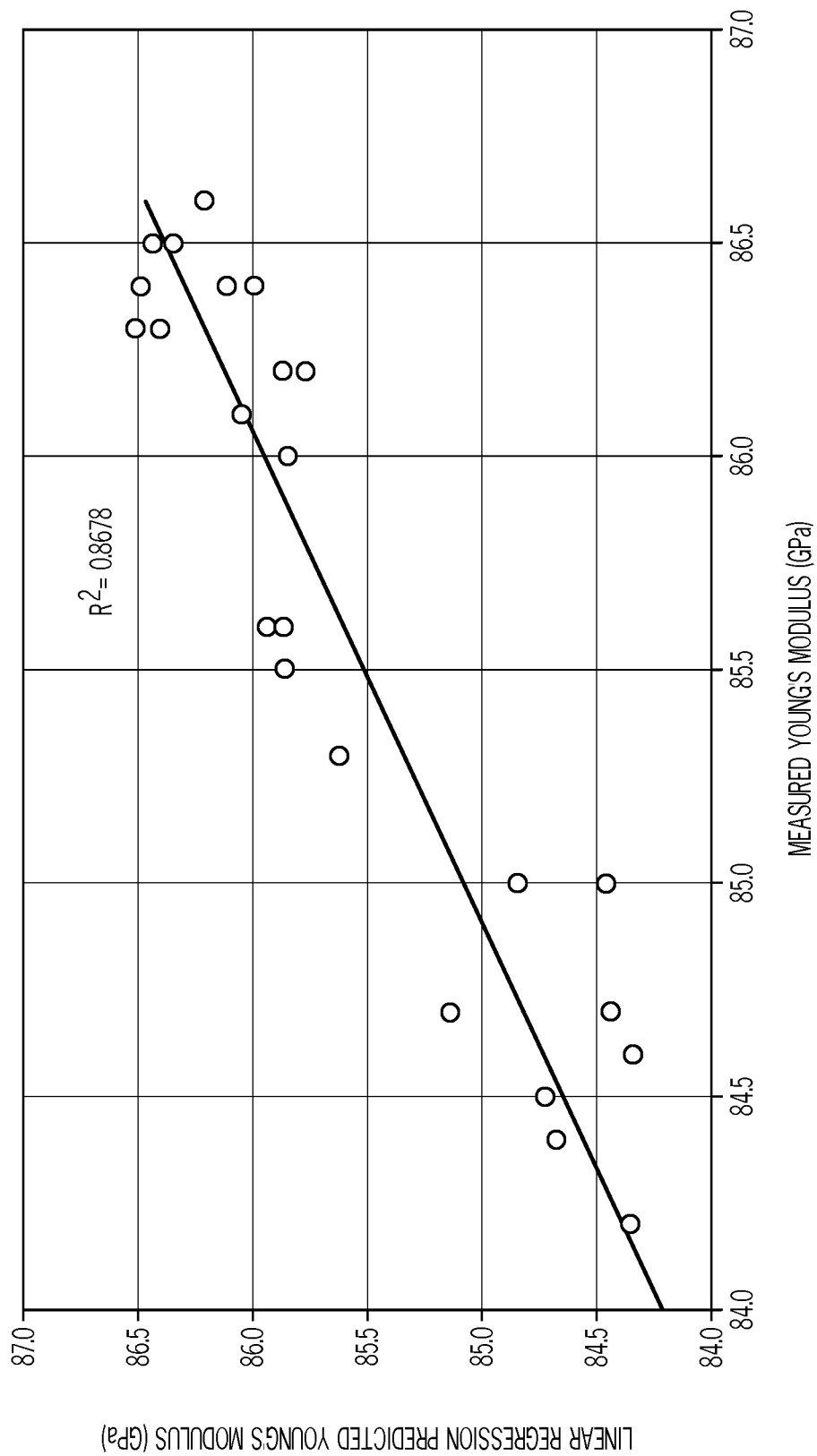
Figure 25:
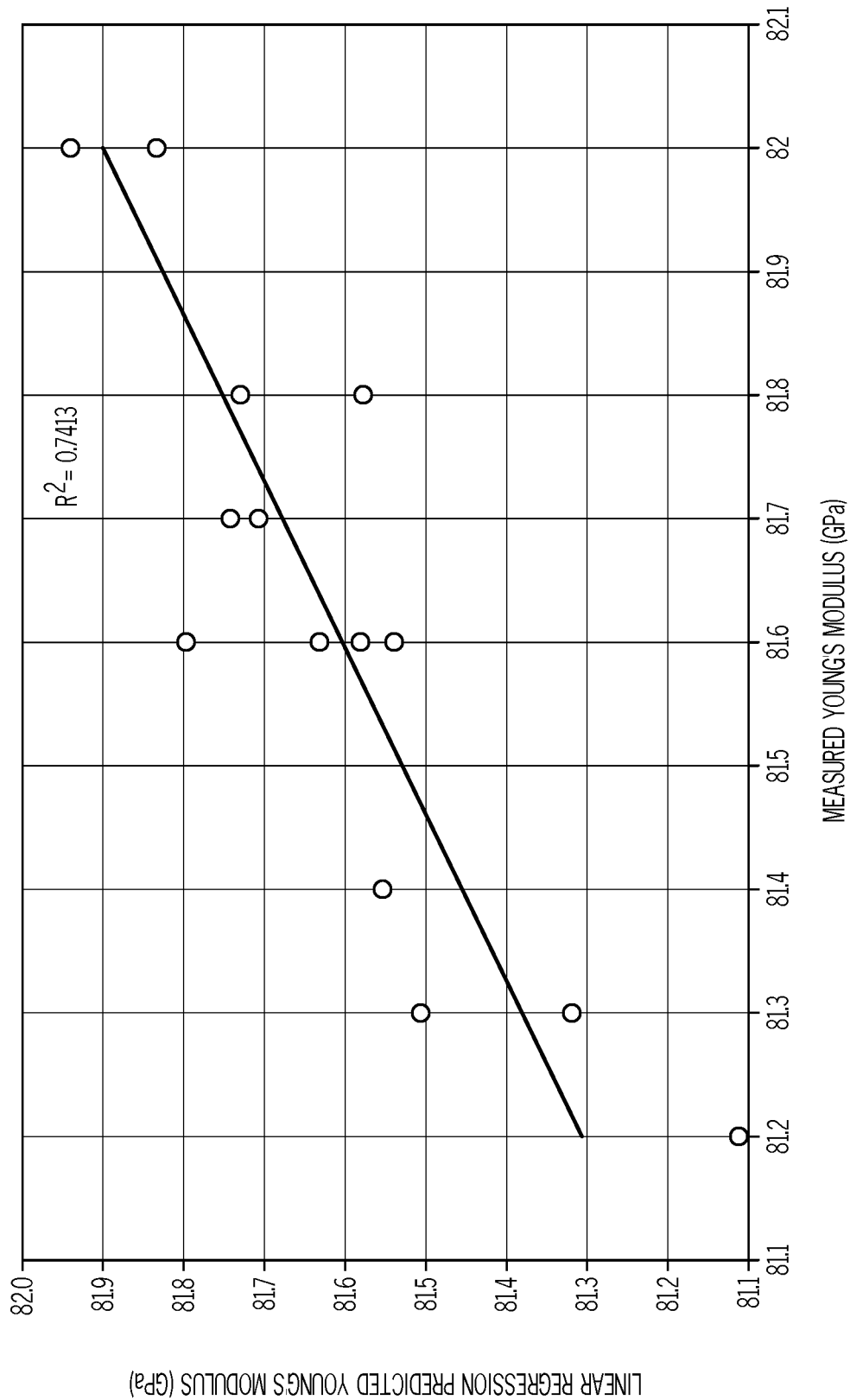
Figure 26:
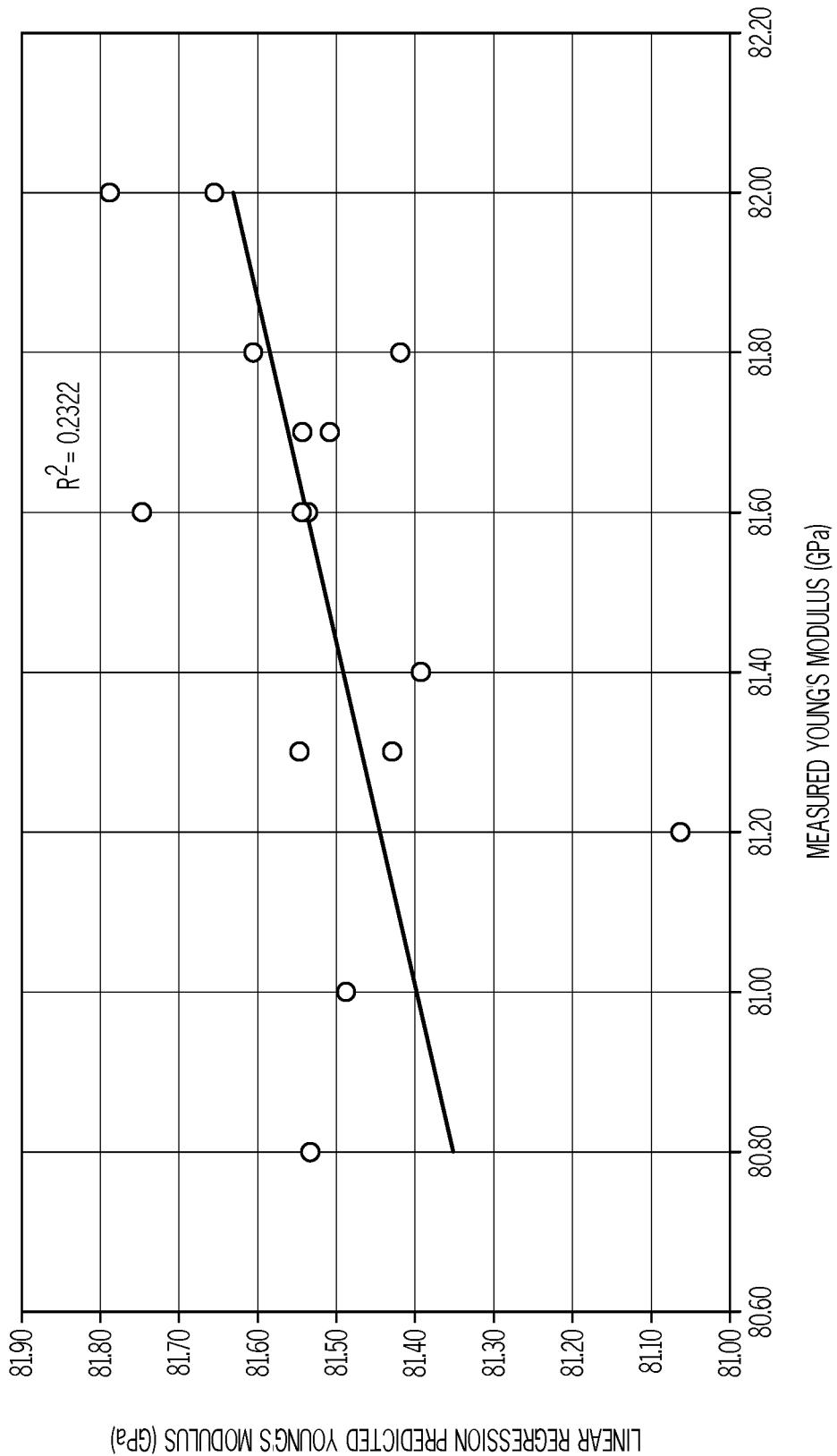
Figure 27:
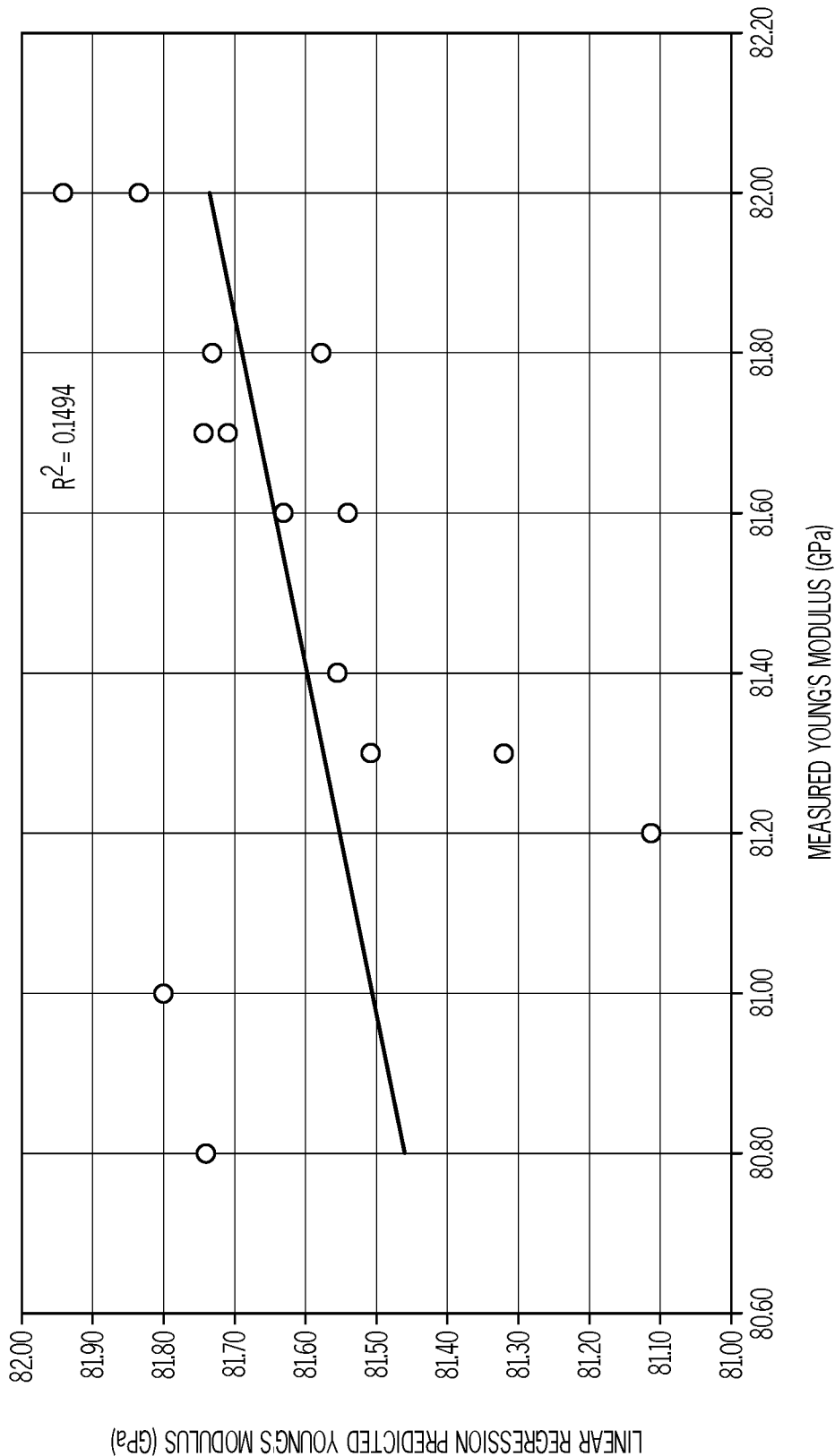

C.) for exemplary fluorine-containing glass compositions in accordance with one or more embodiments shown and described herein;

FIG. 21 is a plot of the predicted CTE (Y-axis; values× $10^{-7}/°$ C.) versus the measured CTE (X-axis; values× $10^{-7}/°$ C.) for exemplary fluorine-containing glass compositions in accordance with one or more embodiments shown and described herein;

FIG. 22 is a plot of the predicted CTE (Y-axis; values× $10^{-7}/°$ C.) versus the measured CTE (X-axis; values× $10^{-7}/°$ C.) for exemplary fluorine-containing glass compositions in accordance with one or more embodiments shown and described herein;

FIG. 23 is a plot of the predicted Young's modulus (Y-axis; GPa) versus the measured Young's modulus (X-axis; GPa) for exemplary fluorine-containing glass compositions in accordance with one or more embodiments shown and described herein;

FIG. 24 is a plot of the predicted Young's modulus (Y-axis; GPa) versus the measured Young's modulus (X-axis; GPa) for exemplary fluorine-containing glass compositions in accordance with one or more embodiments shown and described herein;

FIG. 25 is a plot of the predicted Young's modulus (Y-axis; GPa) versus the measured Young's modulus (X-axis; GPa) for exemplary fluorine-containing glass compositions in accordance with one or more embodiments shown and described herein;

FIG. 26 is a plot of the predicted Young's modulus (Y-axis; GPa), using alternative models, versus the measured Young's modulus (X-axis; GPa) for exemplary fluorine-containing glass compositions in accordance with one or more embodiments shown and described herein; and FIG. 27 is a plot of the predicted Young's modulus (Y-axis; GPa), using alternative models, versus the measured Young's modulus (X-axis; GPa) for exemplary fluorine-containing glass compositions in accordance with one or more embodiments shown and described herein.

DETAILED DESCRIPTION

Reference will now be made in detail to various embodiments of methods for manufacturing glass articles having a target coefficient of thermal expansion $CTE_T$, embodiments of which are illustrated in the accompanying drawings. Whenever possible, the same reference numerals will be used throughout the drawings to refer to the same or like parts. The components in the drawings are not necessarily to scale, emphasis instead being placed upon illustrating the principles of the embodiments.

The terms "glass" and "glass composition" encompass both glass materials and glass-ceramic materials, as both classes of materials are commonly understood. Likewise, the term "glass structure" encompasses structures comprising glass.

The term "coefficient of thermal expansion" or CTE is an average CTE over a particular range of temperatures, as determined in accordance with ASTM E228. Unless specified otherwise, the temperature range is from about 20° C. to about 260° C.

The elastic modulus (also referred to as Young's modulus) of the substrate is provided in units of gigapascals (GPa). The elastic modulus of the substrate is determined by resonant ultrasound spectroscopy on bulk samples of the substrate.

The density of the substrate is a measure of the degree of compactness of the substrate and is provided in g/cm³. The density is determined in accordance with ASTM C693.

The 200 Poise temperature is the temperature at which the glass melt demonstrates a viscosity of 200 Poise and is provided in ° C. This temperature is determined in accordance with ASTM C965.

The surface quality of a substrate is a numerical description of the flatness or roughness of a surface and is determined using a frequency stepping interferometer, for example, a TROPEL® FLATMASTER® MSP (Multi-Surface Profiler).

The refractive index of a substrate is the ratio of the velocity of light in a vacuum to its velocity in the substrate. As a ratio, the refractive index is unitless. The refractive index may be determined a refractometer, for example, a Bausch and Lomb Low Range Precision Refractometer or a Metricon Prism Coupler.

The resistivity of a substrate is a measure of the resisting power of a specified material to the flow of an electric current and is provided in Ω·m. The resistivity may be determined in accordance with ASTM D-257 and/or ASTM D-657.

The edge strength of a substrate is a measure of the substrate's modulus of rupture and is provided in MPa. The edge strength may be determined by performing a four-point bend of the substrate.

The viscosity of the melt is a quantity expressing the magnitude of internal friction, as measured by the force per unit area resisting a flow in which parallel layers unit distance apart have unit speed relative to one another. Viscosity is provided in Poise herein and may be determined by ASTM C965.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

Concentrations of the constituent components are specified in weight percent (wt % or weight %) on an oxide basis unless otherwise specified.

The term "formed from" can mean one or more of comprises, consists essentially of, or consists of. For example, a component that is formed from a particular material can comprise the particular material, consist essentially of the particular material, or consist of the particular material.

Directional terms as used herein—for example up, down, right, left, front, back, top, bottom, vertical, horizontal—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

In the semiconductor packaging industry, different manufacturers have overarching carrier substrate requirements (i.e., size, shape, etc.) that are somewhat uniform. However, the property specifications (i.e., coefficient of thermal expansion, elastic modulus, and the like) may differ from manufacturer to manufacturer or even from facility to facility. For example, the thermal profile of a semiconductor packaging process may be unique to a specific manufacturer, which in turn, gives rise to a need for carrier substrates having thermal characteristics tailored to the specific thermal profile, such as the coefficient of thermal expansion (CTE) or the like. In addition to particular CTE requirements, the glass carriers may also need to have certain other properties, such as elastic moduli, viscosity, surface quality, and edge strength requirements to be considered suitable for use in conjunction with particular semiconductor packaging operations. The wide array of property specifications for carrier substrates presents a unique challenge to manufacturers of glass substrates seeking to economically and efficiently mass produce carrier substrates compatible for use with different packaging operations.

For example, semiconductor fabrication labs may need to perform a wide array of post-fabrication processing of the semiconductor. This processing typically includes placing the semiconductor on the carrier substrate and then performing thermo-mechanical as well as lithographic steps. The steps may be used to add metal connects, epoxy molding compounds, soldering, and the like. Historically the semiconductor packaging industry used polymer material as the substrate carrier. The polymer material was sufficient for low-end chip packaging but has proven unsatisfactory for manufacturing high-end products due to the inherent structural instability of polymers at the packaging processing temperatures.

A recent trend in this industry is to use glass wafers (200 mm/300 mm diameter) or panels (500 mm×500 mm) as substrates. Depending on the manufacturer and the particular steps involved in the post-fabrication processing, the carrier substrate may experience variable amounts of stress and warpage throughout the post-fabrication process, and therefore have custom CTE requirements, for example.

To simplify the process of obtaining glasses meeting these custom CTE requirements, a library of glass articles may be produced that have a composition within a certain range (i.e., the compositions are similar) but physical properties which differ among each article in the library. This range of properties for a similar composition allows an end user to select and test a particular glass article with a specific property to determine the viability of using the glass article for a particular application without the need to specifically create an entire batch of glass when only a few exemplary glasses may be needed to validate the process. Of course, a range of other properties and applications, beyond CTE in semiconductor fabrication, are contemplated and possible.

Methods described herein facilitate forming carrier substrates having compositions that are compatible with the processes employed by various manufacturers, while allowing the properties of the carrier substrates, including the CTE, to be tuned to meet the specifications of individual manufacturers. Specifically, some embodiments described herein relate to a method of producing a glass article. In some embodiments, the method includes melting a first glass composition in a melter, the first glass composition comprising a combination of glass constituent components. A second glass composition may then be fed into the melter. This second glass composition may include the same combination of glass constituent components but at least one glass constituent component has a concentration that is different from the concentration of the same component in the first glass composition (sometimes referred to as the "varied component"). In some embodiments, at least three glass articles may be drawn from the melter while maintaining the contents of the melter in a molten state. These at least three glass articles may include: (1) a first glass article that is formed from the first glass composition; (2) at least one intermediate glass article that is composed of neither the first glass composition nor the second glass composition and which may be drawn either simultaneously with the feeding of the second glass composition or at some different time; (3) and a final glass article that is composed of a composition that is different from the first glass composition and may be the same as or different from the second glass composition. The concentration of the at least one component in the at least one intermediate glass article may be between the concentration of the at least one component in the first glass composition and the concentration of the at least one component in the second glass composition. The first glass article may have a first set of values for a set of properties. The final glass article may have a second set of values for the same set of properties, the second set of values being different from the first set of values. The at least one intermediate glass article may have an intermediate set of values for the set of properties that is between the first set of values and the second set of values.

Of course, more than a second glass composition could be added to the melter. For instance, the method may further include feeding a third glass composition into the melter. This third glass composition may include the same combination of glass constituent components, but just as with the second glass composition described above, at least one glass constituent component may have a concentration that differs from that of both the first glass composition and the second glass composition. Then, the method may further include drawing at least a first additional glass article and a final additional glass article from the melter while maintaining the contents of the melter in a molten state. The first additional glass article may have a first additional set of values for the same set of properties discussed above, and the final additional glass article may have a final additional set of values for the same set of properties.

In some embodiments, the concentration of the varied component in the first glass composition may be different from that in the second glass composition by no more than 2 weight %. For instance, the concentration of the varied component in the first glass composition may be different from that in the second glass composition by no more than 1.9 weight %, 1.8 weight %, 1.7 weight %, 1.6 weight %, 1.5 weight %, 1.4 weight %, 1.3 weight %, 1.2 weight %, 1.1 weight %, 1 weight %, 0.9 weight %, 0.8 weight %, 0.7 weight %, 0.6 weight %, 0.5 weight %, 0.4 weight %, 0.3 weight %, 0.2 weight %, 0.1 weight %, or any fractional part thereof. Further, all of the components of the first glass composition may have different concentrations in the second glass composition or all the components except one may retain the concentration present in the first glass composition. Thus, the concentration of one component, two components, three components, and so on, up to and including the concentration of all the components of the first glass composition, may be different in the second glass composition.

The at least one component, the concentration of which may differ between the first and second glass compositions, i.e. the varied component, may be any of the constituent components. Exemplary varied components include, but are not limited to, $SiO_2$, $Al_2O_3$, $B_2O_3$, $Na_2O$, $MgO$, $CaO$, $AlF_3$, and $Sb_2O_3$. In one embodiment, the varied component is $AlF_3$. Although $AlF_3$ may not be present (i.e. 0 weight %) in some embodiments, in other embodiments, $AlF_3$ may be present from greater than 0 weight % to less than or equal to about 1.5 weight %. In further embodiments, $AlF_3$ may be present from greater than or equal to 0.5 weight % to less than or equal to about 1.5 weight %.

As noted above, the first glass article may have a first set of values for a set of properties, the final glass article may have a second set of values, and the at least one intermediate glass article may have an intermediate set of values. Such properties may include, but are not limited to, CTE, Young's modulus, density, 200 Poise temperature, surface quality, refractive index, resistivity, and edge strength. In some embodiments, the CTE of the first glass article may be equal to or within $\pm 7.5 \times 10^{-7}/°$ C. different from the CTE of the final glass article. In some embodiments, where a third glass composition is added to the melter, the CTE of the first glass article may be equal to or within $\pm 15 \times 10^{-7}/°$ C. different from the CTE of the final additional glass article. In the same or different embodiments, the refractive index of the first glass article may be less than or equal to $\pm 0.01$ different from the refractive index of the final glass article.

Certain properties may remain substantially unchanged throughout the method, including the draws of all glass articles. For instance, in some embodiments, the viscosity of the composition within the melter may vary by no more than 25 Poise during the drawing the at least three glass articles. In the same or different embodiments, the 200 Poise temperature of the glass mixture within the melter may be less than or equal to 1500° C. Similar effects may be observed when more than a second glass composition, e.g., a third glass composition, is added to the melter.

In some embodiments, the value of only one property of a set of properties differs between the first, final, and intermediate glass articles. In other embodiments, all such values differ. In further embodiments, the values of any number of properties of a set of properties, from a single property to all properties, may differ between the first, final, and intermediate glass articles.

In some embodiments, the values of two or more properties may not differ to the same extent between the first, final, and intermediate glass articles. For instance, the value of one property may differ to a much larger degree than the value of another property. In some embodiments, for example, the difference between the CTE of the at least one intermediate glass article and the CTE of the first glass article, as a percentage of the CTE of the first glass article, may be greater than the difference between the Young's modulus of the at least one intermediate glass article and the Young's modulus of the first glass article, as a percentage of the Young's modulus of the first glass article. Similar effects may be observed when more than a second glass composition, e.g., a third glass composition, is added to the melter.

The shape of the glass articles produced is not particularly limited. An exemplary shape includes, but is not limited to, a glass boule. Any number of glass articles with different and unique glass compositions may be drawn from the melter. For example, hundreds, or even thousands, of glass articles may be drawn. A smaller number may also be drawn. For example, at least 5 glass articles may be drawn, i.e., the first glass article, the final glass article, and 3 intermediate glass articles. In the same or different embodiments, at least 10 glass articles may be drawn, i.e., at least 8 intermediate glass articles. Similarly, in the same or different embodiments, at least 20 glass articles may be drawn, i.e., at least 18 intermediate glass articles. Similarly, in the same or different embodiments, at least 30 glass articles may be drawn, i.e., at least 28 intermediate glass articles. Similar numbers of glass articles may be drawn when more than a second glass composition, e.g., a third glass composition, is added to the melter, but of course, even more glass articles could be drawn under such conditions. Due to the change in the concentration of the at least one component between the first and second glass compositions, the glass composition drawn changes slowly over time from that of the first glass composition to that of the second glass composition. Each intermediate article may be drawn at a different time. So, each intermediate article has a different concentration of the at least one glass constituent component that is between the concentration of the at least one glass constituent component in the first glass composition and the concentration of the at least one glass constituent component in the second glass composition. If two intermediate articles are drawn at about the same time, the difference in composition may be slight. As more time passes, the difference in composition may become more pronounced.

Figure 1:
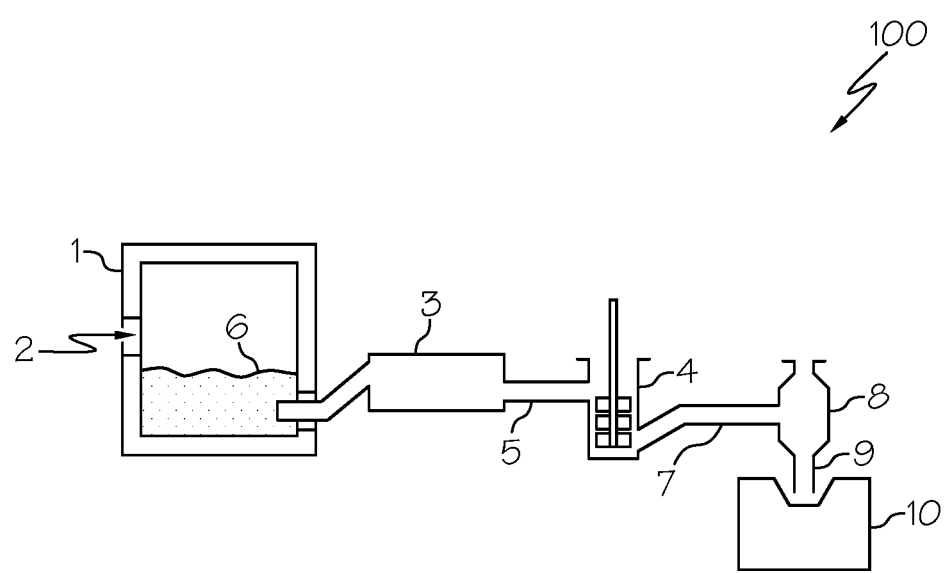
FIG. 1 schematically depicts one example glass manufacturing apparatus for forming glass substrates in accordance with one or more embodiments shown and described herein.

Referring now to FIG. 1, an example glass manufacturing apparatus 100 for forming a library of glass articles from molten glass is schematically depicted according to one or more embodiments described herein. The glass manufacturing apparatus 100 includes a melting vessel 1, a fining vessel 3, a mixing vessel 4, a delivery vessel 8, and a forming vessel 10. Glass batch materials are introduced into the melting vessel 1 as indicated by arrow 2. The batch materials, including batch oxides, are melted to form molten glass 6. The melting vessel 1 may include heating elements (not shown) for melting the batch materials. The fining vessel 3 has a high temperature processing area that receives the molten glass 6 from the melting vessel 1 and in which bubbles are removed from the molten glass 6. The fining vessel 3 is fluidly coupled to the mixing vessel 4 by a connecting tube 5. That is, molten glass flowing from the fining vessel 3 to the mixing vessel 4 flows through the connecting tube 5. The mixing vessel 4 is, in turn, fluidly coupled to the delivery vessel 8 by a connecting tube 7 such that molten glass flowing from the mixing vessel 4 to the delivery vessel 8 flows through the connecting tube 7.

The delivery vessel 8 supplies the molten glass 6 through a downcomer 9 into the forming vessel 10. The delivery vessel 8 may include heating elements (not shown) for heating and/or maintaining the glass in a molten state. In some embodiments, the delivery vessel 8 may cool and condition the molten glass in order to increase the viscosity of the glass prior to providing the glass to the forming vessel 10. The forming vessel 10 may be, for example, a fusion draw device, a slot draw device or a mold. The form of the resulting glass article will vary depending on the particular forming vessel 10 employed. However, in some embodiments, the glass article resulting from the forming vessel 10 may be in the form of a glass boule, which may then be formed into a glass plate. As the composition in the melter is varied, the resulting glass articles will exhibit different properties due to slightly different composition of each.

One convenient application for the methods described herein is to manufacture a library of glass articles having a range of target $CTE_T$ that can be achieved by making changes to a base glass composition. In some embodiments, the method includes replacing an amount of a first alkaline earth component or a first alkali component having a first cation field strength in the molten base glass composition with an amount of a second alkaline earth component or a second alkali component having a second cation field strength that is different from the first cation field strength. Without being bound by theory, it is believed that the CTE of an oxide glass depends on the strength of the bonds between the cations and the oxygen network. Accordingly, adjusting the overall cation field strength of the glass can be an effective driver to change the CTE of a resultant glass article, as will be described in greater detail below.

In some embodiments described herein, the CTE of the glass article may be selectively modified, or "tuned," by adjusting the amounts of various batch oxides added to the melting vessel 1, replacing one or more batch oxides with a different batch oxide. As used herein, the term "replaced" means that a batch oxide may be reduced in amount or even eliminated from the glass composition and a different batch oxide may be added to the glass composition or increased in amount. In embodiments in which the glass manufacturing process is a continuous method, replacement of one batch oxide with another batch oxide may include adding amounts of other batch oxides to the melting vessel 1 and not adding additional amounts of the batch oxide being replaced such that, over time, the batch oxide being replaced is reduced or eliminated from the molten glass composition in the melting vessel 1. Accordingly, the one or more batch oxides to be replaced may be replaced in the glass batch oxides introduced to the melting vessel 1 and ultimately may become the molten glass 6.

In some embodiments, an amount of one or more batch oxides (e.g., a first alkaline earth component or a first alkali component having a first cation field strength) in the molten base glass composition may be replaced with an amount of a different batch oxide (e.g., a second alkaline earth component or a second alkali component having a second cation field strength that is different from the first cation field strength) to achieve a target coefficient of thermal expansion $CTE_T$ by modifying the overall cation field strength for the glass composition. That is, it has been determined that the coefficient of thermal expansion of the glass composition is related to the overall cation field strength of the glass composition. For example, if the target $CTE_T$ is greater than the coefficient of thermal expansion of the base glass CTEB, the overall cation field strength for the glass composition should be decreased to achieve the target $CTE_T$, whereas if the target $CTE_T$ is less than the base glass CTEB, the overall cation field strength for the glass composition should be increased to achieve the target $CTE_T$. As used herein, the terms "base glass" and "base glass composition" refer to an initial base glass composition prior to modifications. The base glass composition may also be referred to as a "first glass composition." The resulting, or modified base glass composition, is referred to herein as the "modified glass" or "modified glass composition." The modified glass composition may also be referred to as a "second glass composition," as well as a "third glass composition."

The cation field strength of a cation may be represented as $Z/r^2$, where Z is the charge (unitless) of the cation and r is the radius (in Angstrom) of the cation. The overall cation field strength of a glass composition is calculated as follows: the molar fraction of only certain oxides is calculated first. For purposes of the present application, only the following oxides are considered in the overall cation field strength calculation: $SiO_2$, $Na_2O$, $CaO$, $MgO$, $Al_2O_3$, $K_2O$, $Li_2O$, and $ZnO$. The number of cations/molecule is then multiplied by the mole fraction and the field strength for each cation to obtain the contribution to the overall cation field strength from each oxide. The overall cation field strength is the sum of each oxide contribution. Table 1 provides cation field strength values for various cations that may be included in the batch oxides.

TABLE 1

Cation Field Strength in Silicate Glasses*

| Cation | Field strength |
|---|---|
| Alkali | |
| $Li^{+1}$ | 0.26 |
| $Na^{+1}$ | 0.18 |
| $K^{+1}$ | 0.12 |
| $Cs^{+1}$ | 0.11 |
| $Rb^{+1}$ | 0.10 |
| Alkaline Earth | |
| $Mg^{+2}$ | 0.46 |
| $Ca^{+2}$ | 0.36 |
| $Sr^{+2}$ | 0.29 |
| $Ba^{+2}$ | 0.26 |

*G. E. Brown, F. Farges, and G. Calas, Rev. Mineral., 32, 317-410, 1995.

Figure 2:
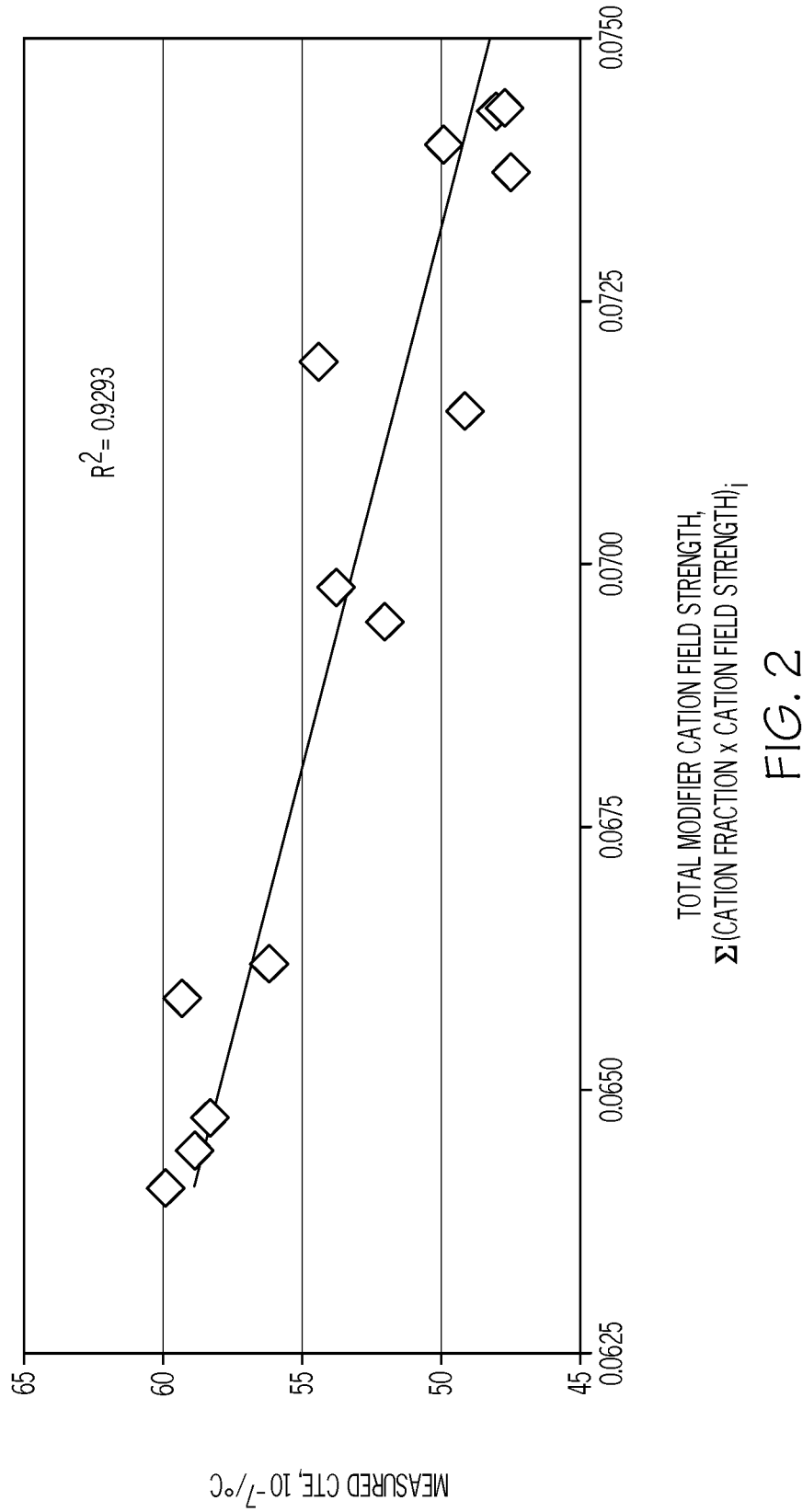
FIG. 2 is a plot of measured CTE (Y-axis; values×10$^{-7}$/° C.) as a function of total modifier cation field strength (X-axis) in accordance with one or more embodiments shown and described herein.
Figure 3:
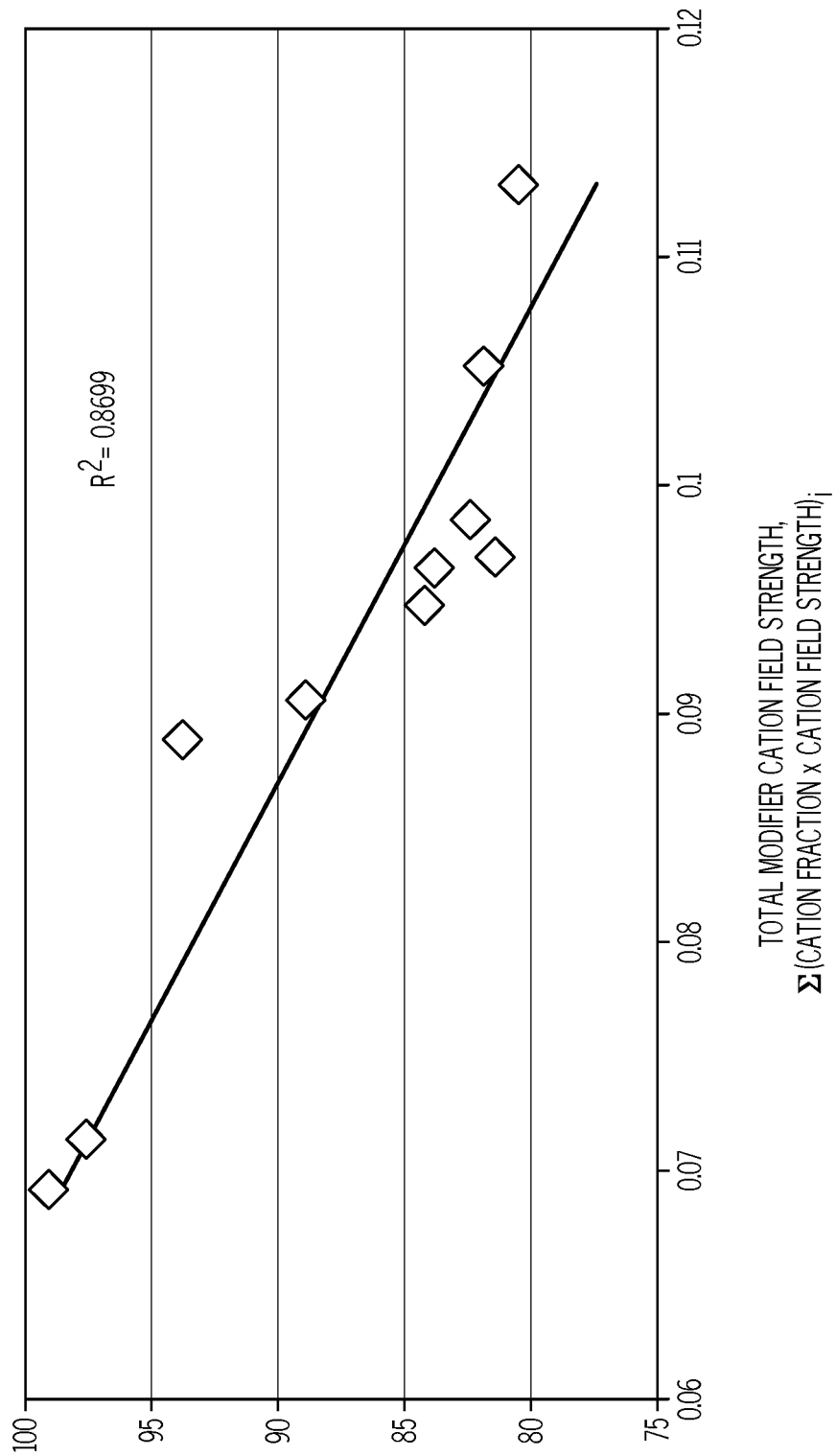
FIG. 3 is a plot of measured CTE (Y-axis; values×10$^{-7}$/° C.) as a function of total modifier cation field strength (X-axis) in accordance with one or more embodiments shown and described herein.

One method of hardening these glasses is ion exchange hardening. FIGS. 2 and 3 are exemplary plots of measured CTE (Y-axis; values×$10^{-7}$/° C.) as a function of total modifier cation field strength (X-axis). As may be seen from the $R^2$ value of FIGS. 2 and 3, the CTE is highly correlated with the total modifier cation field strength. In this example, when MgO is ion exchanged for $Na_2O$ and CaO, the CTE ranges from about 45×$10^{-7}$/° C. to about 65×$10^{-7}$/° C., with increasing field strength associated with decreasing CTE. Similarly, when MgO and CaO are ion exchanged for $K_2O$, the CTE ranges from about 80×$10^{-7}$/° C. to about 100×$10^{-7}$/° C., with increasing field strength associated with decreasing CTE.

In order to achieve the desired overall cation field strength (and thus the target $CTE_T$) for the glass composition, an amount of a first alkaline earth component in the batch oxides can be replaced with an amount of a second alkaline earth component, an amount of a first alkali component in the batch oxides can be replaced with an amount of a second alkali component, an amount of an alkaline earth component in the batch oxides can be replaced with an amount of an alkali component, or an amount of an alkali component in the batch oxides can be replaced with an amount of an alkaline earth component. In some embodiments an amount of any component may be replaced by an amount of any other component.

For example, if the target $CTE_T$ is greater than the base glass CTEB, in some embodiments, an amount of a first alkaline earth component in the base glass composition may be replaced with an amount of an alkali component or with an amount of a second alkaline earth component having a cation field strength that is less than the cation field strength of the first alkaline earth component. In some embodiments, an amount of a first alkali component in the base glass composition may be replaced with an amount of a second alkali component having a cation field strength that is less than the cation field strength of the first alkali component. For example, in some embodiments, an amount of MgO is replaced with an amount of $Na_2O$.

As another example, if the target $CTE_T$ is less than the base glass CTEB, in some embodiments, an amount of a first alkali component in the base glass composition may be replaced with an amount of an alkaline earth component or with an amount of a second alkali component having a cation field strength that is greater than the cation field strength of the first alkali component. In some embodiments, an amount of a first alkaline earth component in the base glass composition may be replaced with an amount of a second alkaline earth component having a cation field strength that is greater than the cation field strength of the first alkaline earth component. For example, in some embodiments, an amount of $Na_2O$ is replaced with an amount of MgO.

In embodiments, an amount of one or more batch components to be replaced may be determined based on the target $CTE_T$ using mathematical modeling including, without limitation, linear modeling. The particular model to be used depends on the embodiment, and may vary depending on factors including the base glass composition and the temperature range at which the CTE is measured. Accordingly, in embodiments, the method includes melting a base glass composition, forming a glass article from the base glass composition, modifying the base glass composition to form two or more modified base glass compositions, forming glass articles from each of the modified base glass compositions, measuring the CTE of each of the glass articles made from the base glass composition and the modified base glass compositions, and developing a linear regression based on the measured CTE of the glass articles and the glass composition of the glass articles. The number of glass compositions used in the linear regression analysis may vary depending on the particular embodiment. However, it should be understood that the number of glass compositions employed should be sufficient to result in a meaningful linear regression analysis.

The base glass composition may be any one of a number of suitable glass compositions. For example, the base glass composition may be an alkali boroaluminosilicate glass composition, an alkaline earth boroaluminosilicate glass composition, a zinc boroaluminosilicate glass composition, or the like. The glass composition may be selected based on its CTE at a particular temperature or over a range of temperatures (e.g., 0° C. to 400° C., 0° C. to 300° C., 0° C. to 260° C., 20° C. to 300° C., or 20° C. to 260° C.), its density, its Young's modulus, its 200 Poise temperature, or other properties that may be desired for processing or use of the glass article. The 200 Poise temperature is the minimum temperature at which the glass has a viscosity of 200 Poise, which is indicative of a minimum temperature of a well-melted glass.

The glass compositions may generally include a combination of $SiO_2$, $Al_2O_3$, at least one alkaline earth oxide and/or alkali oxides, such as $Na_2O$ and $K_2O$. In some embodiments, the glass compositions may further include minor amounts of one or more additional oxides, such as, by way of example and not limitation, $SnO_2$, $Sb_2O_3$, $ZrO_2$, ZnO, or the like. These components may be added as fining agents and/or to further modify the CTE of the glass composition.

In embodiments, the glass composition generally includes $SiO_2$ in an amount greater than or equal to 35 wt % and less than or equal to 75 wt %. When the content of $SiO_2$ is too small, it becomes difficult to obtain a crystallized glass having suitable impact resistance. On the other hand, when the content of $SiO_2$ is too large, melting ability of the glass decreases and the viscosity increases, so forming of the glass becomes difficult. In some embodiments, $SiO_2$ is present in the glass composition in an amount greater than or equal to 60 wt % and less than or equal to 65 wt %, greater than or equal to 56 wt % and less than or equal to 66 wt %, greater than or equal to 45 wt % and less than or equal to 55 wt %, greater than or equal to 35 wt % and less than or equal to 48 wt %, greater than or equal to 35 wt %, or even greater than or equal to 45 wt %.

The glass compositions may also include $Al_2O_3$. $Al_2O_3$, in conjunction with alkali oxides present in the glass composition, such as $Na_2O$ or the like, improves the susceptibility of the glass to ion exchange strengthening. Moreover, increased amounts of $Al_2O_3$ may also increase the softening point of the glass, thereby reducing the formability of the glass. The glass compositions described herein may include $Al_2O_3$ in an amount greater than or equal to 1.5 wt % and less than or equal to 27 wt %, greater than or equal to 1.5 wt % and less than or equal to 5 wt %, greater than or equal to 8 wt % and less than or equal to 15 wt %, greater than or equal to 10 wt % and less than or equal to 15 wt %, greater than or equal to 9.5 wt % and less than or equal to 12 wt %, greater than or equal to 17 wt % and less than or equal to 20 wt %, or greater than or equal to 22 wt % and less than or equal to 27 wt %.

In some embodiments described herein, the boron concentration in the glass compositions from which the glass articles are formed is a flux, which may be added to glass compositions to make the viscosity-temperature curve less steep as well as lowering the entire curve, thereby improving the formability of the glass and softening the glass. In embodiments, the glass compositions include greater than or equal to 0 wt % $B_2O_3$ and less than or equal to 2 wt % $B_2O_3$, greater than or equal to 2 wt % and less than or equal to 4 wt % $B_2O_3$, greater than or equal to 8 wt % and less than or equal to 10 wt % $B_2O_3$, or greater than or equal to 10 wt % and less than or equal to 15 wt % $B_2O_3$. In some embodiments, the glass compositions may be free from boron and compounds containing boron.

Embodiments of the glass compositions may further include one or more alkali oxides (e.g., $Na_2O$, $K_2O$, $Li_2O$, or the like). The alkali oxides facilitate the melting of the glass composition, lower the 200 Poise temperature, and lower the softening point of the glass, thereby offsetting the increase in the softening point due to higher concentrations of $SiO_2$ and/or $Al_2O_3$ in the glass composition. The alkali oxides also assist in improving the chemical durability of the glass composition and tuning the CTE to a desired value. The alkali oxides are generally present in the glass composition in an amount greater than or equal to 6 wt % and less than or equal to 40 wt %. In some embodiments, the amount of alkali oxides may be greater than or equal to 6 wt % and less than or equal to 28 wt %, greater than or equal to 8 wt % and less than or equal to 23 wt %, greater than or equal to 9 wt % and less than or equal to 17 wt %, or greater than or equal to 1 wt % and less than or equal to 8 wt %. In all of the glass compositions described herein, the alkali oxides include at least $Na_2O$ and $K_2O$. Some embodiments the alkali oxides further include $Li_2O$.

In order to achieve the desired CTE, embodiments of the glass compositions include $Na_2O$ in an amount greater than or equal to 1 wt % and less than or equal to 18 wt %, greater than or equal to 6 wt % and less than or equal to 18 wt %, greater than or equal to 0 wt % and less than or equal to 8 wt %, greater than or equal to 0 wt % and less than or equal to 5 wt %, or greater than or equal to 1 wt % and less than or equal to 8 wt %.

The concentration of $K_2O$ in the glass also influences the CTE of the glass composition. Accordingly, in some embodiments, the amount of $K_2O$ is greater than or equal to 0 wt % and less than or equal to 14 wt %, greater than or equal to 0 wt % and less than or equal to 10 wt %, or greater than or equal to 0 wt % and less than or equal to 7 wt %, greater than 0 wt % and less than or equal to 14 wt %, greater than 0 wt % and less than or equal to 10 wt %, or greater than 0 wt % and less than or equal to 7 wt %.

In embodiments of the glass composition that include $Li_2O$, the $Li_2O$ may be present in an amount greater than or equal to 2 wt % and less than or equal to 7.5 wt %, greater than or equal to 2 wt % and less than or equal to 5 wt %, or greater than or equal to 3 wt % and less than or equal to 7.5 wt %. However, in some embodiments, the glass composition may be substantially free of lithium and compounds containing lithium.

As provided hereinabove, embodiments of the glass compositions may further include one or more alkaline earth oxides. The alkaline earth oxide may include, for example, MgO, CaO, SrO, or combinations thereof. Alkaline earth oxides improve the meltability of the glass batch oxides and increase the chemical durability of the glass composition, in addition to influencing the CTE. In the glass compositions described herein, the glass compositions generally include at least one alkaline earth oxide in an amount greater than or equal to 1 wt % and less than or equal to 22 wt %, greater than or equal to 2 wt % and less than or equal to 12 wt %, greater than or equal to 1 wt % and less than or equal to 6 wt %, greater than or equal to 9 wt % and less than or equal to 22 wt %, greater than or equal to 12.5 wt % and less than or equal to 21 wt %, greater than or equal to 7 wt % and less than or equal to 20 wt %, greater than 0 wt % and less than or equal to 12.5 wt %, or greater than 0 wt % and less than or equal to 10 wt %.

MgO may be present in an amount from greater than or equal to 0 wt % to less than or equal to 12 wt %, greater than or equal to 1 wt % and less than or equal to 10 wt %, greater than or equal to 2 wt % and less than or equal to 10 wt %, greater than or equal to 1 wt % and less than or equal to 3 wt %, greater than or equal to 9 wt % and less than or equal to 12 wt %, greater than 0 wt % and less than or equal to 8 wt %, or even greater than 0 wt % and less than or equal to 4 wt %. However, it is contemplated that in some embodiments, MgO may not be included in the glass composition.

As another example, CaO may be present in the glass composition in an amount from greater than or equal to 0 wt % to less than or equal to 12 wt %. In embodiments, CaO may be present in an amount of from greater than 0 wt % to less than or equal to 8.5 wt %, greater than 0 wt % to less than or equal to 8 wt %, greater than 0 wt % to less than or equal to 3 wt %, greater than 0 wt % to less than or equal to 2 wt %, greater than or equal to 3 wt % to less than or equal to 6 wt %, greater than or equal to 7 wt % to less than or equal to 12 wt %, or greater than or equal to 8 wt % to less than or equal to 12 wt %. In some embodiments, CaO may be not be present in the glass composition.

In some embodiments, SrO may be included in the glass composition in an amount greater than 0.5 wt % and less than or equal to 3 wt %. In some embodiments, SrO may not be present in the glass composition.

In addition to the $SiO_2$, $Al_2O_3$, alkali oxides and alkaline earth oxides, a first embodiment of exemplary base glass compositions may optionally include one or more fining agents, such as, by way of example and not limitation, $SnO_2$, $Sb_2O_3$, $As_2O_3$, $F^-$, and/or $Cl^-$ (from NaCl or the like). When a fining agent is present in the glass composition, the fining agent may be present in amount less than or equal to 1 wt % or even less than or equal to 0.5 wt %. When the content of the fining agent is too large, the fining agent may enter the glass structure and affect various glass properties. However, when the content of the fining agent is too low, the glass may be difficult to form. For example, in some embodiments, $SnO_2$ is included as a fining agent in an amount greater than or equal to 0.25 wt % to less than or equal to 0.50 wt %.

Other metal oxides may additionally be included in the glass compositions of some embodiments. For example, the glass composition may further include ZnO or $ZrO_2$, each of which improves the resistance of the glass composition to chemical attack. In such embodiments, the additional metal oxide may be present in an amount greater than or equal to 10 wt % and less than or equal to 15 wt %. For example, the glass composition may include $ZrO_2$ in an amount less than or equal to 15 wt %. If the content of $ZrO_2$ is too high, it may not dissolve in the glass composition, may result in defects in the glass composition, and may drive the Young's modulus up. In embodiments, ZnO may be included in an amount of less than or equal to 15 wt %, or less than or equal to 12 wt %. In some embodiments, ZnO may be included as a substitute for one or more of the alkaline earth oxides, such as a partial substitute for MgO or in addition to or in place of at least one of CaO or SrO. Accordingly, the content of ZnO in the glass composition can have the same effects as described above with respect to alkaline earth oxides if it is too high or too low.

In some embodiments, the base glass composition comprises greater than or equal to 60 wt % and less than or equal to 65 wt % $SiO_2$, greater than or equal to 1.5 wt % and less than or equal to 5.0 wt % $Al_2O_3$, greater than or equal to 0 wt % and less than or equal to 2 wt % $B_2O_3$, greater than or equal to 6 wt % and less than or equal to 18 wt % $Na_2O$, greater than or equal to 0 wt % and less than or equal to 10 wt % $K_2O$, greater than or equal to 2 wt % and less than or equal to 10 wt % MgO, greater than or equal to 0 wt % and less than or equal to 2 wt % CaO, greater than or equal to 0 wt % and less than or equal to 2 wt % $TiO_2$, and greater than or equal to 10 wt % and less than or equal to 15 wt % ZnO.

In some embodiments, the base glass composition comprises greater than or equal to 60 wt % and less than or equal to 65 wt % $SiO_2$, greater than or equal to 10 wt % and less than or equal to 15 wt % $Al_2O_3$, greater than or equal to 2 wt % and less than or equal to 4 wt % $B_2O_3$, greater than or equal to 2 wt % and less than or equal to 5 wt % $Li_2O$, greater than or equal to 6 wt % and less than or equal to 18 wt % $Na_2O$, greater than or equal to 1 wt % and less than or equal to 3 wt % MgO, and greater than or equal to 0 wt % and less than or equal to 3 wt % CaO.

In some embodiments, the base glass composition comprises greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; and greater than or equal to 7 wt % and less than or equal to 9 wt % CaO.

In some embodiments, the base glass composition comprises greater than or equal to 56 wt % and less than or equal to 66 wt % $SiO_2$, greater than or equal to 9.5 wt % and less than or equal to 12.0 wt % $Al_2O_3$, greater than or equal to 3.0 wt % and less than or equal to 7.5 wt % $Li_2O$, greater than or equal to 6 wt % and less than or equal to 18 wt % $Na_2O$, greater than or equal to 0 wt % and less than or equal to 14 wt % $K_2O$, greater than or equal to 0 wt % and less than or equal to 2 wt % MgO, and greater than or equal to 0 wt % and less than or equal to 8 wt % CaO.

In some embodiments, the base glass composition comprises greater than or equal to 45 wt % and less than or equal to 55 wt % $SiO_2$, greater than or equal to 22 wt % and less than or equal to 27 wt % $Al_2O_3$, greater than or equal to 8 wt % and less than or equal to 10 wt % $B_2O_3$, greater than or equal to 0 wt % and less than or equal to 8 wt % $Na_2O$, greater than or equal to 0 wt % and less than or equal to 8 wt % MgO, and greater than or equal to 7 wt % and less than or equal to 12 wt % CaO.

In some embodiments, the base glass composition comprises greater than or equal to 35 wt % and less than or equal to 48 wt % $SiO_2$, greater than or equal to 17 wt % and less than or equal to 20 wt % $Al_2O_3$, greater than or equal to 0 wt % and less than or equal to 5 wt % $Na_2O$, greater than or equal to 0 wt % and less than or equal to 7 wt % $K_2O$, greater than or equal to 0 wt % and less than or equal to 4 wt % MgO, greater than or equal to 0 wt % and less than or equal to 8.5 wt % CaO, and greater than or equal to 25 wt % and less than or equal to 32 wt % $La_2O_3$.

In some embodiments, the base glass composition comprises greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; greater than or equal to 7 wt % and less than or equal to 9 wt % CaO; greater than or equal to 0 wt % and less than or equal to 0.7 wt % $Sb_2O_3$; and greater than 0 wt % and less than or equal to 1.5 wt % $AlF_3$.

In some embodiments, the base glass composition comprises greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; greater than or equal to 7 wt % and less than or equal to 9 wt % CaO; greater than or equal to 0 wt % and less than or equal to 0.7 wt % $Sb_2O_3$; and greater than 0.5 wt % and less than or equal to 1.5 wt % $AlF_3$.

In some embodiments, the base glass composition comprises greater than or equal to 45 wt % and less than or equal to 55 wt % $SiO_2$; greater than or equal to 20 wt % and less than or equal to 27 wt % $Al_2O_3$; greater than or equal to 8 wt % and less than or equal to 10 wt % $B_2O_3$; greater than or equal to 0 wt % and less than or equal to 8 wt % $Na_2O$; greater than or equal to 0 wt % and less than or equal to 6 wt % MgO; greater than or equal to 7 wt % and less than or equal to 9 wt % CaO; greater than or equal to 0 wt % and less than or equal to 0.7 wt % $Sb_2O_3$; and greater than 0 wt % and less than or equal to 1.5 wt % $AlF_3$.

As described above, following selection of a base glass composition, a linear regression analysis may be performed to develop a linear regression equation relating the coefficient of thermal expansion to the concentrations of the constituent components of the glass composition. In embodiments, the linear regression fit to the plurality of glass compositions may be used to determine a particular amount of one or more constituents needed to achieve the target $CTE_T$. For example, the linear regression fit can provide a coefficient for each of the constituents in the glass batch mixture. In some embodiments, the target $CTE_T$ over the temperature range from 20° C. to 260° C. may be determined according to the following equation:

$CTE_T$=(−1.17[wt % $SiO_2$])−(1.31[wt % $Al_2O_3$])−(0.84[wt % $B_2O_3$])+(4.36[wt % $Na_2O$])+(0.98[wt % MgO])+(47.1[wt % $TiO_2$])−(0.64[wt % ZnO])+(4.45[wt % $K_2O$])−(37.2[wt % CaO])−1.17.

In some embodiments, the target $CTE_T$ over the temperature range from 20° C. to 260° C. may be determined according to the following equation:

$CTE_T$=(6.58[wt % $SiO_2$])+(0.67[wt % $Al_2O_3$])+(0.04[wt % $B_2O_3$])+(3.64[wt % $Na_2O$])+(0.59[wt % MgO])+(1.34[wt % CaO])+6.58.

In some embodiments, the target $CTE_T$ over the temperature range from 20° C. to 260° C. may be determined according to the following equation:

$CTE_T$=(137.56[wt % $SiO_2$])−(5.47[wt % $Al_2O_3$])+(1.18[wt % $Li_2O$])+(2.22[wt % $Na_2O$])+(1.32[wt % $K_2O$])−(5.37[wt % MgO])−(0.09[wt % CaO])+137.56.

In some embodiments, the target $CTE_T$ over the temperature range from 20° C. to 260° C. may be determined according to the following equation:

$$CTE_T = (156.52[\text{wt \% SiO}_2]) - (3.41[\text{wt \% Al}_2\text{O}_3]) - (6.38[\text{wt \% B}_2\text{O}_3]) + (4.70[\text{wt \% Na}_2\text{O}]) + (3.56[\text{wt \% MgO}]) - (0.62[\text{wt \% CaO}]) - (7.68[\text{wt \% F}]) + 156.52.$$

In some embodiments, the target $CTE_T$ over the temperature range from 20° C. to 260° C. may be determined according to the following equation:

$$CTE_T = (142.70[\text{wt \% SiO}_2]) - (2.62[\text{wt \% Al}_2\text{O}_3]) - (8.08[\text{wt \% B}_2\text{O}_3]) + (0.45[\text{wt \% CaO}]) - (8.99[\text{wt \% F}]) + (4.35[\text{wt \% MgO}]) - (4.31[\text{wt \% Na}_2\text{O}]) + 142.70.$$

In some embodiments, the target $CTE_T$ over the temperature range from 20° C. to 260° C. may be determined according to the following equation:

$$CTE_T = (115.77[\text{wt \% SiO}_2]) + (0.07[\text{wt \% Al}_2\text{O}_3]) - (4.24[\text{wt \% B}_2\text{O}_3]) + (3.72[\text{wt \% Na}_2\text{O}]) - (3.00[\text{wt \% MgO}]) - (1.38[\text{wt \% CaO}]) - (9.49[\text{wt \% F}]) + 115.77.$$

In some embodiments, the target $CTE_T$ over the temperature range from 20° C. to 260° C. may be determined according to the following equation:

$$CTE_T = (119.24[\text{wt \% SiO}_2]) + (0.20[\text{wt \% Al}_2\text{O}_3]) - (3.20[\text{wt \% B}_2\text{O}_3]) - (1.95[\text{wt \% CaO}]) - (0.86[\text{wt \% F}]) - (5.48[\text{wt \% MgO}]) + (3.20[\text{wt \% Na}_2\text{O}]) + 119.24.$$

Other equations based on linear regression modeling are contemplated. The specific linear regression and coefficients can vary based on the base glass composition, the target $CTE_T$, and the range of temperatures over which the CTE is measured. Accordingly, the target $CTE_T$ may be inserted into the equation and the equation may be solved to determine the concentration of the batch oxides to form a modified glass composition with a modified coefficient of thermal expansion $CTE_M$ closely approximating the target $CTE_T$.

A linear regression analysis may also be performed to develop a linear regression equation relating the Young's modulus to the concentrations of the constituent components of the glass composition. In embodiments, the linear regression fit to the plurality of glass compositions may be used to determine a particular amount of one or more constituents needed to achieve the target Young's modulus ($E_T$). For example, the linear regression fit can provide a coefficient for each of the constituents in the glass batch mixture. In some embodiments, the target $E_T$ may be determined according to the following equation:

$E_T$=(4.77[wt % $SiO_2$])−(4.31[wt % $Al_2O_3$])−(3.33[wt % $B_2O_3$])−(1.67[wt % $Na_2O$])+(25.88[wt % MgO])+(5.32[wt % CaO])−(3.01[wt % F])+4.77.

In some embodiments, the target $E_T$ may be determined according to the following equation:

$E_T$=(113.95[wt % $SiO_2$])−(0.22[wt % $Al_2O_3$])−(2.75[wt % $B_2O_3$])−(0.39[wt % CaO])−(0.94[wt % F])−(0.49[wt % MgO])−(0.47[wt % $Na_2O$])+113.95.

In some embodiments, the target $E_T$ may be determined according to the following equation:

$E_T$=(91.49[wt % $SiO_2$])+(0.21[wt % $Al_2O_3$])−(2.67[wt % $B_2O_3$])+(0.15[wt % CaO])+(1.86[wt % F])−(0.16[wt % MgO])−(6.53[wt % $Na_2O$])+91.49.

In some embodiments, the target $E_T$ may be determined according to the following equation:

$E_T$=(−10.97[wt % $SiO_2$])−(3.95[wt % $Al_2O_3$])−(1.97[wt % $B_2O_3$])−(3.03[wt % CaO])+(0.39[wt % F])+(0.09[wt % MgO])−(1.60[wt % $Na_2O$])−10.97.

In embodiments, the $CTE_M$ of the modified glass composition is within +/−1.0×10$^{-7}$/° C. of the target $CTE_T$ over a corresponding temperature range. It should be understood that the accuracy of the $CTE_M$ may vary depending on the specific linear regression used, the temperature range over which the CTE is measured and approximated, and the glass composition.

It is further contemplated that other properties may be predicted based on linear regression modeling. For example, in embodiments, the Young's modulus (sometimes referred to as the "elastic modulus" or "E-mod") for a glass composition may be predicted based on linear regression modeling. Accordingly, one or more properties of a modified glass composition can be predicted prior to manufacturing a glass article from the glass composition. This may enable confirmation that the modified glass composition will meet processing requirements and that the glass article formed from the modified glass composition will have the desired properties before mixing the batch oxides and manufacturing the glass article.

Although the desired properties may vary depending on the particular embodiment, end use, and the processing requirements for the glass composition, in embodiments, the glass articles have a Young's modulus of greater than or equal to 65 GPa, which may minimize flexing of the glass during processing and prevent damage to devices attached to the glass, such as when the glass is used as a carrier substrate for electronic devices. For example, the glass articles may have a Young's modulus of greater than or equal to 68 GPa, greater than or equal to 70 GPa, greater than or equal to 72 GPa, greater than or equal to 73 GPa, greater than or equal to 74 GPa, greater than or equal to 75 GPa, greater than or equal to 76 GPa, greater than or equal to 78 GPa, greater than or equal to 80 GPa, greater than or equal to 82 GPa, greater than or equal to 84 GPa, greater than or equal to 86 GPa, greater than or equal to 88 GPa, or greater than or equal to 90 GPa. The glass article may have a Young's modulus of greater than or equal to 65 GPa and less than or equal to 100 GPa, greater than or equal to 70 GPa and less than or equal to 100 GPa, or greater than or equal to 72 GPa and less than or equal to 85 GPa.

In embodiments, the glass composition has a 200 Poise (200 P) temperature of less than 1500° C., which may enable the glass to be melted in a variety of processing facilities. For example, the glass composition may have a 200 P temperature of less than or equal to 1500° C. or less than or equal to 1450° C. In some embodiments, the glass composition has a 200 P temperature of greater than or equal to 1000° C. to 1500° C., greater than or equal to 1050° C. and less than or equal to 1500° C., greater than or equal to 1100° C. and less than or equal to 1500° C., greater than or equal to 1150° C. and less than or equal to 1500° C., greater than or equal to 1200° C. and less than or equal to 1500° C., greater than or equal to 1250° C. and less than or equal to 1500° C., greater than or equal to 1300° C. and less than or equal to 1500° C., greater than or equal to 1000° C. and less than or equal to 1450° C., greater than or equal to 1050° C. and less than or equal to 1450° C., greater than or equal to 1100° C. and less than or equal to 1450° C., greater than or equal to 1150° C. and less than or equal to 1450° C., greater than or equal to 1200° C. and less than or equal to 1450° C., greater than or equal to 1250° C. and less than or equal to 1450° C., or greater than or equal to 1300° C. and less than or equal to 1450° C.

EXAMPLES

The following examples illustrate one or more features of the embodiments described herein.

Example 1

A base glass composition of alkali/alkaline earth zincboroaluminosilicate glass and a base glass composition of alkali/alkaline earth boroaluminosilicate glass were selected based on their CTE (from 85 to 95×10$^{-7}$/° C. over the range from 20° C. to 260° C.), Young's modulus (greater than 65 GPa), and ease of melting (a 200 Poise temperature of less than 1500° C.). Each of the base glass compositions were varied slightly to produce modified glass compositions. The glass compositions were melted in covered Pt crucibles at a temperature between 1450° C. and 1475° C., poured into patties, and annealed to form glass articles. The alkali/alkaline earth zincboroaluminosilicate glass articles were coarse ground, then melted a second time to ensure good glass homogeneity. All glass articles were then characterized. In particular, X-ray fluorescence (XRF) was used to characterize the chemical composition, the coefficient of thermal expansion (CTE) was measured using dilatometry, and Young's modulus was measured using resonant ultrasound spectroscopy (RUS). For instance, one or more measurements may be conducted in accordance with ASTM E228 and/or ASTM C623 and/or ASTM C1198-09(2013).

Tables 2 and 3 show the compositions, measured CTE, and measured Young's modulus for the alkali/alkaline earth zincboroaluminosilicate glass compositions, while Table 3 shows the compositions and measured CTE for the alkali/alkaline earth boroaluminosilicate glass compositions. For the compositions provided in Tables 2 and 3, Composition 1 ("Comp. 1") served as the base glass composition. Note that the CTE range from 78 to 100×10$^{-7}$/° C. could be obtained by replacing $Na_2O$ with MgO, or by replacing MgO with $Na_2O$. Accordingly, the data provided in Tables 2 and 3 demonstrates that the CTE can be controlled by adjusting the cation field strength.

TABLE 2

Table 2: Glasses in the Alkali/Alkaline Earth Zincboroaluminosilicate glass family with CTE Values from 78-100 × 10$^{-7}$/° C. and Young's Modulus >68 GPa

| | Comp. 1 | Comp. 2 | Comp. 3 | Comp. 4 | Comp. 5 | Comp. 6 | Comp. 7 | Comp. 8 | Comp. 9 | Comp. 10 |
|---|---|---|---|---|---|---|---|---|---|---|
| | Oxide (wt %) measured by XRF | | | | | | | | | |
| $SiO_2$ | 62.8 | 61.5 | 62.9 | 62.9 | 62.9 | 63.0 | 62.8 | 61.0 | 63.4 | 59.7 |
| $Al_2O_3$ | 2.87 | 2.78 | 2.91 | 2.96 | 2.92 | 2.91 | 2.91 | 2.81 | 2.92 | 2.72 |
| $B_2O_3$ | 0.80 | 0.92 | 0.95 | 0.82 | 0.95 | 0.79 | 0.95 | 0.87 | 0.94 | 0.90 |
| $Na_2O$ | 8.33 | 8.29 | 16.4 | 15.3 | 14.4 | 13.6 | 13.6 | 13.4 | 13.2 | 12.9 |
| $K_2O$ | 9.16 | 9.15 | 0.01 | 0.01 | 0.01 | 0.00 | 0.01 | 0.01 | 0.00 | 0.01 |
| MgO | 3.03 | 3.31 | 4.13 | 4.98 | 6.13 | 6.79 | 7.14 | 8.26 | 7.15 | 9.76 |
| CaO | 0.04 | 0.04 | 0.05 | 0.06 | 0.07 | 0.07 | 0.08 | 0.08 | 0.08 | 0.09 |
| $TiO_2$ | 0.70 | 0.69 | 0.70 | 0.70 | 0.70 | 0.70 | 0.69 | 0.68 | 0.70 | 0.67 |
| ZnO | 11.2 | 11.9 | 11.5 | 11.7 | 11.4 | 11.4 | 11.4 | 12.6 | 11.4 | 12.8 |
| $Sb_2O_3$ | 0.43 | 0.44 | 0.44 | 0.40 | 0.44 | 0.44 | 0.44 | 0.41 | 0.44 | 0.42 |
| Measured CTE (×10$^{-7}$/° C.) | 99.0 | 97.6 | 93.8 | 88.8 | 84.2 | 83.7 | 82.3 | 81.8 | 81.4 | 80.4 |

TABLE 2-continued

Table 2: Glasses in the Alkali/Alkaline Earth Zincboroaluminosilicate glass family with CTE Values from 78-100 × $10^{-7}$/° C. and Young's Modulus >68 GPa

| | Comp. 1 | Comp. 2 | Comp. 3 | Comp. 4 | Comp. 5 | Comp. 6 | Comp. 7 | Comp. 8 | Comp. 9 | Comp. 10 |
|---|---|---|---|---|---|---|---|---|---|---|
| | | | | Oxide (wt %) measured by XRF | | | | | | |
| Predicted CTE ($\times 10^{-7}$/° C.) | 98.8 | 97.8 | 93.1 | 89.2 | 85.9 | 83.5 | 83.0 | 81.8 | 81.3 | 80.2 |
| Measured Young's Modulus (GPa) | 69.3 | 69.6 | 70.7 | 73.4 | 72.5 | 74.4 | 73.4 | 74.6 | 76.1 | 75.6 |
| Predicted Young's Modulus (GPa) | 70.1 | 68.8 | 69.7 | 73.3 | 73.6 | 74.1 | 74.6 | 74.6 | 75.5 | 75.4 |
| Predicted 200 Poise Temp. (° C.) | 1367 | 1356 | 1273 | 1326 | 1326 | 1332 | 1281 | 1331 | 1348 | 1301 |

TABLE 3

Table 3: Glasses in the Alkali/Alkaline Earth Zincboroaluminosilicate glass family with CTE Values from 78-84 × $10^{-7}$/° C. and Young's Modulus >73 GPa

| | Comp. 11 | Comp. 12 | Comp. 13 | Comp. 14 | Comp. 15 | Comp. 16 | Comp. 17 | Comp. 18 | Comp. 19 |
|---|---|---|---|---|---|---|---|---|---|
| | | | | Oxide (wt %) measured by XRF | | | | | |
| $SiO_2$ | 63.38 | 64.19 | 63.53 | 63.07 | 62.66 | 63.46 | 63.23 | 63.05 | 62.69 |
| $Al_2O_3$ | 2.93 | 3.10 | 2.93 | 2.91 | 2.89 | 2.99 | 2.99 | 2.90 | 2.89 |
| $B_2O_3$ | 0.74 | 0.94 | 0.91 | 0.95 | 0.92 | 0.81 | 0.84 | 0.94 | 0.94 |
| $Na_2O$ | 12.66 | 12.70 | 12.24 | 13.09 | 13.54 | 13.34 | 13.89 | 13.34 | 13.79 |
| $K_2O$ | 0.01 | 0.01 | 0.01 | 0.01 | 0.01 | 0.01 | 0.01 | 0.01 | 0.01 |
| MgO | 7.48 | 6.96 | 7.87 | 7.48 | 7.44 | 6.57 | 6.50 | 7.18 | 7.15 |
| CaO | 0.08 | 0.08 | 0.09 | 0.08 | 0.08 | 0.07 | 0.07 | 0.08 | 0.08 |
| $TiO_2$ | 0.70 | 0.70 | 0.70 | 0.69 | 0.69 | 0.69 | 0.68 | 0.69 | 0.69 |
| ZnO | 11.27 | 10.82 | 11.25 | 11.45 | 11.36 | 11.56 | 11.44 | 11.40 | 11.41 |
| $Sb_2O_3$ | 0.44 | 0.38 | 0.44 | 0.44 | 0.44 | 0.42 | 0.42 | 0.44 | 0.44 |
| Measured CTE ($\times 10^{-7}$/° C.) | 79.7 | 79.4 | 78.1 | 81.6 | 82.0 | 81.0 | 83.2 | 81.9 | 83.9 |
| Predicted CTE ($\times 10^{-7}$/° C.) | 79.7 | 79.4 | 77.7 | 80.9 | 82.8 | 81.2 | 83.2 | 81.8 | 83.8 |
| Measured Young's Modulus (GPa) | 75.3 | 80.0 | 76.3 | 74.5 | 74.6 | 73.5 | 73.5 | 74.1 | 74.1 |
| Predicted Young's Modulus (GPa) | 75.0 | 78.9 | 76.4 | 74.7 | 74.2 | 74.5 | 73.2 | 73.6 | 73.9 |
| Predicted 200 Poise Temp. (° C.) | 1402 | 1406 | 1384 | 1285 | 1281 | 1280 | 1267 | 1279 | 1279 |

For each of the glass compositions provided in Tables 2 and 3, the measured Young's modulus values exceeded 69 GPa, while the predicted 200 Poise temperature for each of the glass compositions was below 1450° C.

TABLE 4

Table 4: Glasses in the Alkali/Alkaline Earth Boroaluminosilicate glass family with CTE Values from 85-96 × $10^{-7}$/° C.

| | Comp. 20 | Comp. 21 | Comp. 22 | Comp. 23 |
|---|---|---|---|---|
| | Oxide (wt %) measured by XRF | | | |
| $SiO_2$ | 64.28 | 64.28 | 63.72 | 63.98 |
| $Al_2O_3$ | 14.33 | 14.39 | 14.31 | 14.33 |
| $B_2O_3$ | 2.74 | 2.73 | 2.79 | 2.45 |
| $Li_2O$ | 4.3 | 4.3 | 4.28 | 4.31 |
| $Na_2O$ | 9 | 10.87 | 10.88 | 12.83 |
| MgO | 2.61 | 2.58 | 1.3 | 1.25 |
| CaO | 2.39 | 0.5 | 2.37 | 0.5 |
| $SnO_2$ | 0.36 | 0.36 | 0.37 | 0.35 |

TABLE 4-continued

Table 4: Glasses in the Alkali/Alkaline Earth Boroaluminosilicate glass family with CTE Values from 85-96 × $10^{-7}$/° C.

| | Comp. 20 | Comp. 21 | Comp. 22 | Comp. 23 |
|---|---|---|---|---|
| | Oxide (wt %) measured by XRF | | | |
| Measured CTE ($\times 10^{-7}$/° C.) | 85 | 90 | 91 | 96 |
| Predicted CTE ($\times 10^{-7}$/° C.) | 85 | 89 | 81 | 96 |

For the alkali/alkaline earth boroaluminosilicate glass compositions shown in Table 4, the CTE values are shown for the range of 85 to 96×$10^{-7}$/° C. range, although compositions could have been selected to encompass the entire range from 78 to 100×$10^{-7}$/° C. Because of the lower amount of MgO present in the starting glass composition (Comp. 20) as compared to the amount of MgO in Comp. 1, both MgO and CaO replacement by Na$_2$O was needed to achieve the CTEs throughout the range.

The composition and property data provided in Tables 2-4 were combined and standard linear regression analysis was used to construct a predictive model for both CTE and Young's modulus. The regression coefficients that were obtained are provided in Table 5.

TABLE 5

Table 5: Linear Regression Coefficients for CTE and Young's Modulus

| Oxide | CTE (20° C.-260° C.) | Coefficient | Young's Modulus | Coefficient |
|---|---|---|---|---|
| SiO$_2$ | Intercept | −1.171629046 | Intercept | −228.971 |
| Al$_2$O$_3$ | X Variable 1 | −1.314280351 | X Variable 1 | 34.66347 |
| B$_2$O$_3$ | X Variable 2 | −0.844484203 | X Variable 2 | 4.593175 |
| Na$_2$O | X Variable 3 | 4.364221579 | X Variable 3 | 1.645936 |
| MgO | X Variable 4 | 0.97884678 | X Variable 4 | 3.349705 |
| TiO$_2$ | X Variable 5 | 47.09788707 | X Variable 5 | 174.5979 |
| ZnO | X Variable 6 | −0.645462742 | X Variable 6 | 2.703049 |
| K$_2$O | X Variable 7 | 4.45477385 | X Variable 7 | 2.123741 |
| CaO | X Variable 8 | −37.20821358 | X Variable 8 | 5.121629 |

Figure 4:
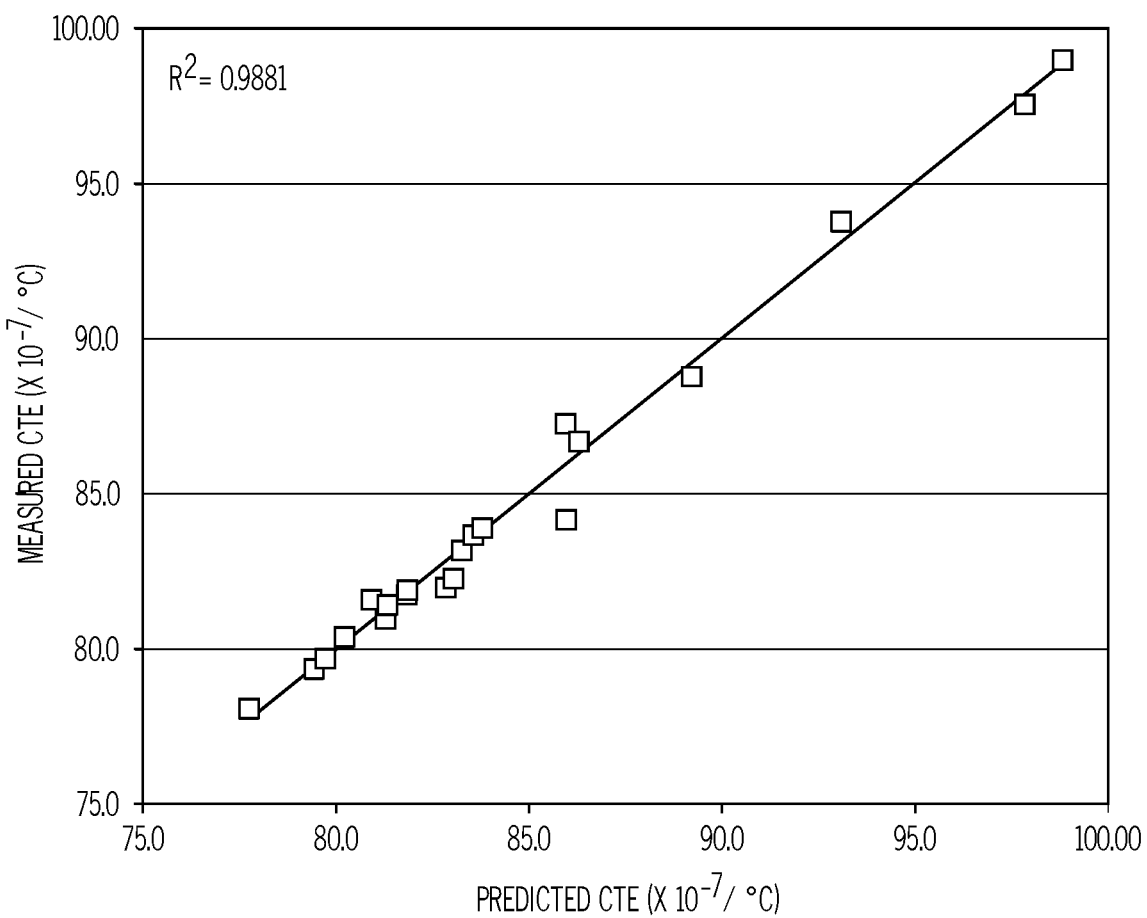
FIG. 4 is a plot of the measured CTE (Y-axis; values×10$^{-7}$/° C.) as a function of the predicted CTE (X-axis; values×10$^{-7}$/° C.) for example glass compositions in accordance with one or more embodiments shown and described herein.
Figure 5:
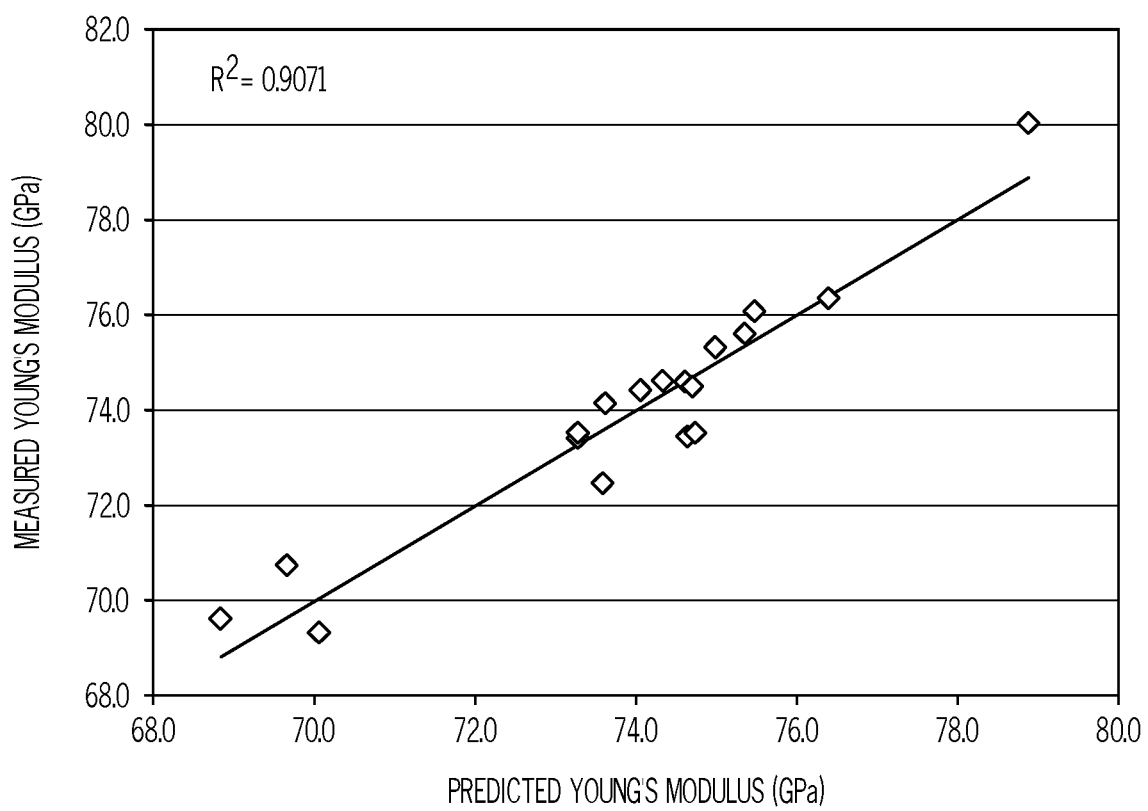
FIG. 5 is a plot of the measured Young's modulus (Y-axis; in GPa) as a function of the predicted Young's modulus (X-axis; in GPa) for example glass compositions in accordance with one or more embodiments shown and described herein.

The predicted results from these linear regression models are provided in Tables 2-4 above. In all cases, the predicted values for CTE are within $1.0 \times 10^{-7}/°$ C. and the predicted values for Young's modulus are within 1.0 GPa. The agreement between the measured and predicted values is shown in FIGS. 4 and 5. Specifically, FIG. 4 is a plot of the measured CTE (Y-axis; values $\times 10^{-7}/°$ C.) as a function of the predicted CTE (X-axis; values $\times 10^{-7}/°$ C.) for the glasses from Tables 2 and 3. FIG. 5 is a plot of the measured Young's modulus (Y-axis; in GPa) as a function of the predicted Young's modulus (X-axis; in GPa). As may be seen from the $R^2$ value for both of FIGS. 4 and 5, the model has a high predictive capability for both CTE and Young's modulus over the CTE range from $78\text{-}100 \times 10^{-7}/°$ C. measured from 20° C. to 260° C.

In order to confirm the utility of the model for manufacturing a glass with a target CTE$_T$, a week-long trial was conducted in which the amounts of Na$_2$O and MgO were varied. Minor variations in other oxide components are related to issues such as the need to overcompensate for particular components due to raw material losses during batching or to selective volatilization losses during melting. The compositions and predicted CTEs are reported in Table 6. For each of the glass compositions, the predicted CTE was in the range from 84 to $93 \times 10^{-7}/°$ C. from 20° C. to 260° C. and the predicted Young's modulus was greater than 65 GPa based on the regression coefficients provided in Table 4.

TABLE 6

Table 6: Glasses made in production tank with predicted CTE values

| | Oxide (wt %) measured by XRF | | | | | | | | | | Predicted CTE |
|---|---|---|---|---|---|---|---|---|---|---|---|
| | SiO$_2$ | Al$_2$O$_3$ | B$_2$O$_3$ | Na$_2$O | MgO | TiO$_2$ | ZnO | K$_2$O | CaO | Sb$_2$O$_3$ | ($\times 10^{-7}/°$ C.) |
| Comp. 24 | 62.66 | 2.97 | 0.94 | 14.17 | 6.66 | 0.69 | 11.30 | 0.16 | 0.04 | 0.41 | 87 |
| Comp. 25 | 62.61 | 2.98 | 0.94 | 14.19 | 6.68 | 0.69 | 11.30 | 0.15 | 0.04 | 0.42 | 87 |
| Comp. 26 | 62.59 | 2.98 | 0.96 | 14.23 | 6.68 | 0.69 | 11.28 | 0.14 | 0.04 | 0.41 | 87 |
| Comp. 27 | 62.67 | 2.99 | 0.94 | 14.17 | 6.67 | 0.69 | 11.29 | 0.14 | 0.04 | 0.41 | 87 |
| Comp. 28 | 62.63 | 2.87 | 0.92 | 14.66 | 6.37 | 0.70 | 11.39 | 0.02 | 0.02 | 0.42 | 89 |
| Comp. 29 | 62.60 | 2.87 | 0.95 | 14.66 | 6.35 | 0.70 | 11.41 | 0.02 | 0.02 | 0.42 | 89 |
| Comp. 30 | 62.69 | 2.87 | 0.93 | 14.63 | 6.33 | 0.70 | 11.39 | 0.02 | 0.02 | 0.42 | 89 |
| Comp. 31 | 62.74 | 2.87 | 0.93 | 14.60 | 6.34 | 0.69 | 11.37 | 0.02 | 0.02 | 0.42 | 89 |
| Comp. 32 | 62.7 | 2.88 | 0.93 | 14.66 | 6.32 | 0.69 | 11.36 | 0.02 | 0.02 | 0.42 | 89 |
| Comp. 33 | 62.76 | 2.87 | 0.92 | 14.62 | 6.32 | 0.70 | 11.35 | 0.02 | 0.02 | 0.42 | 89 |
| Comp. 34 | 62.80 | 2.87 | 0.92 | 14.62 | 6.28 | 0.69 | 11.36 | 0.02 | 0.02 | 0.42 | 89 |
| Comp. 35 | 62.82 | 2.86 | 0.92 | 14.74 | 6.19 | 0.69 | 11.33 | 0.02 | 0.02 | 0.41 | 89 |
| Comp. 36 | 62.86 | 2.86 | 0.93 | 14.65 | 6.24 | 0.69 | 11.32 | 0.02 | 0.02 | 0.41 | 89 |
| Comp. 37 | 62.81 | 2.85 | 0.94 | 14.71 | 6.21 | 0.69 | 11.33 | 0.02 | 0.02 | 0.42 | 89 |
| Comp. 38 | 62.91 | 2.87 | 0.93 | 14.65 | 6.19 | 0.69 | 11.31 | 0.02 | 0.02 | 0.41 | 89 |
| Comp. 39 | 62.72 | 2.86 | 0.95 | 14.76 | 6.21 | 0.69 | 11.35 | 0.02 | 0.02 | 0.42 | 89 |
| Comp. 40 | 62.76 | 2.86 | 0.94 | 14.79 | 6.18 | 0.69 | 11.33 | 0.02 | 0.02 | 0.41 | 90 |
| Comp. 41 | 62.74 | 2.96 | 0.94 | 14.20 | 6.75 | 0.69 | 11.27 | 0.02 | 0.02 | 0.41 | 87 |
| Comp. 42 | 62.82 | 2.90 | 0.93 | 14.59 | 6.33 | 0.69 | 11.29 | 0.02 | 0.02 | 0.41 | 89 |
| Comp. 43 | 62.63 | 2.90 | 0.98 | 14.11 | 6.96 | 0.69 | 11.28 | 0.02 | 0.02 | 0.41 | 87 |
| Comp. 44 | 62.74 | 2.88 | 0.93 | 14.08 | 6.95 | 0.69 | 11.28 | 0.02 | 0.02 | 0.41 | 87 |
| Comp. 45 | 62.71 | 2.87 | 0.93 | 14.15 | 6.89 | 0.69 | 11.30 | 0.02 | 0.02 | 0.42 | 87 |
| Comp. 46 | 62.62 | 2.88 | 0.94 | 14.20 | 6.88 | 0.69 | 11.32 | 0.02 | 0.03 | 0.42 | 87 |
| Comp. 47 | 62.59 | 2.88 | 1.02 | 14.20 | 6.85 | 0.69 | 11.30 | 0.02 | 0.03 | 0.42 | 87 |
| Comp. 48 | 62.67 | 2.90 | 0.95 | 14.17 | 6.86 | 0.69 | 11.30 | 0.03 | 0.03 | 0.41 | 87 |
| Comp. 49 | 63.08 | 2.91 | 0.93 | 13.54 | 7.16 | 0.69 | 11.23 | 0.02 | 0.03 | 0.41 | 85 |
| Comp. 50 | 62.78 | 2.91 | 0.93 | 13.35 | 7.56 | 0.69 | 11.32 | 0.02 | 0.03 | 0.41 | 84 |
| Comp. 51 | 62.79 | 2.88 | 0.92 | 13.34 | 7.59 | 0.69 | 11.33 | 0.02 | 0.03 | 0.42 | 84 |
| Comp. 52 | 62.77 | 2.88 | 0.93 | 13.37 | 7.58 | 0.69 | 11.33 | 0.02 | 0.02 | 0.41 | 84 |
| Comp. 53 | 62.77 | 2.87 | 0.94 | 13.40 | 7.56 | 0.69 | 11.32 | 0.02 | 0.02 | 0.41 | 85 |
| Comp. 54 | 62.81 | 2.88 | 0.92 | 13.39 | 7.55 | 0.69 | 11.31 | 0.02 | 0.02 | 0.41 | 85 |
| Comp. 55 | 62.78 | 2.88 | 0.92 | 13.43 | 7.53 | 0.69 | 11.31 | 0.02 | 0.02 | 0.42 | 85 |
| Comp. 56 | 62.83 | 2.90 | 0.91 | 13.42 | 7.51 | 0.69 | 11.29 | 0.02 | 0.02 | 0.41 | 85 |
| Comp. 57 | 62.86 | 2.88 | 0.90 | 13.45 | 7.48 | 0.69 | 11.29 | 0.02 | 0.02 | 0.41 | 85 |
| Comp. 58 | 62.82 | 2.94 | 0.93 | 13.45 | 7.43 | 0.69 | 11.29 | 0.02 | 0.02 | 0.4 | 85 |
| Comp. 59 | 62.96 | 2.97 | 0.91 | 13.51 | 7.28 | 0.68 | 11.27 | 0.02 | 0.02 | 0.41 | 84 |
| Comp. 60 | 62.86 | 2.96 | 0.94 | 13.54 | 7.31 | 0.69 | 11.25 | 0.02 | 0.02 | 0.41 | 85 |
| Comp. 61 | 63.21 | 2.86 | 0.92 | 15.71 | 4.93 | 0.69 | 11.24 | 0.02 | 0.02 | 0.41 | 92 |
| Comp. 62 | 63.36 | 2.84 | 0.91 | 15.90 | 4.62 | 0.68 | 11.25 | 0.02 | 0.02 | 0.41 | 93 |

Example 2

Another base glass composition was selected based on their CTE (from 40 to $70 \times 10^{-7}$ 1° C. over the range from 20° C. to 260° C.), Young's modulus (greater than 72 GPa), and ease of melting (a 200 Poise temperature of less than 1500° C.). The glass compositions were prepared as described above. Tables 7 and 8 show the compositions, measured CTE, and measured Young's modulus for the glass compositions.

TABLE 7

Table 7: Adjustable Glass Compositions with CTE in the range of 40-70 × $10^{-7}$/° C. (Reported in Oxide wt %)

| | $SiO_2$ | $Al_2O_3$ | $B_2O_3$ | $Na_2O$ | MgO | CaO | $Sb_2O_3$ | $SnO_2$ |
|---|---|---|---|---|---|---|---|---|
| Comp. 63 | 49.70 | 24.94 | 9.76 | 3.22 | 3.46 | 8.13 | 0.57 | 0.00 |
| Comp. 64 | 48.93 | 24.90 | 10.33 | 3.58 | 3.15 | 8.47 | 0.00 | 0.21 |
| Comp. 65 | 48.91 | 24.95 | 10.28 | 3.56 | 3.17 | 8.44 | 0.00 | 0.21 |
| Comp. 66 | 49.81 | 24.94 | 9.68 | 3.85 | 2.80 | 8.14 | 0.57 | 0.00 |
| Comp. 67 | 49.07 | 24.93 | 10.05 | 3.69 | 3.06 | 8.43 | 0.00 | 0.21 |
| Comp. 68 | 49.19 | 25.16 | 9.57 | 5.10 | 1.57 | 8.58 | 0.00 | 0.20 |
| Comp. 69 | 49.56 | 25.33 | 9.01 | 4.99 | 1.64 | 8.65 | 0.00 | 0.19 |
| Comp. 70 | 49.39 | 25.05 | 9.52 | 5.75 | 0.81 | 8.53 | 0.00 | 0.20 |
| Comp. 71 | 49.39 | 25.04 | 9.77 | 6.30 | 0.36 | 8.50 | 0.00 | 0.20 |
| Comp. 72 | 49.09 | 24.99 | 9.86 | 6.77 | 0.13 | 8.37 | 0.00 | 0.20 |
| Comp. 73 | 48.88 | 25.03 | 9.71 | 6.83 | 0.26 | 8.41 | 0.00 | 0.20 |
| Comp. 74 | 49.13 | 25.01 | 9.84 | 6.73 | 0.09 | 8.38 | 0.00 | 0.20 |
| Comp. 75 | 47.37 | 25.12 | 9.82 | 7.43 | 1.10 | 8.45 | 0.00 | 0.20 |
| Comp. 76 | 47.62 | 25.44 | 9.11 | 7.54 | 1.21 | 8.39 | 0.00 | 0.20 |
| Comp. 77 | 47.46 | 25.35 | 9.29 | 7.50 | 1.20 | 8.39 | 0.00 | 0.20 |
| Comp. 78 | 43.86 | 24.93 | 9.80 | 5.33 | 5.26 | 10.17 | 0.52 | 0.00 |
| Comp. 79 | 43.87 | 25.45 | 14.78 | 5.30 | 2.38 | 7.46 | 0.51 | 0.00 |

TABLE 8

Table 8: Measured and Predicted Properties of Adjustable Glass Compositions with CTE in the range of 40-70 × $10^{-7}$/° C.

| | Modeled CTE < Tg ($\times 10^{-7}$/° C.) | Measured CTE ($\times 10^{-7}$/° C.) | Modeled Young's Modulus (GPa) | Measured Young's Modulus (GPa) |
|---|---|---|---|---|
| Comp. 63 | 47.0 | 47.5 | 80 | 80 |
| Comp. 64 | 48.7 | 47.7 | 78 | 78 |
| Comp. 65 | 48.5 | 48.0 | 78 | 78 |
| Comp. 66 | 49.1 | 49.1 | 79 | 79 |
| Comp. 67 | 49.0 | 49.9 | 78 | 78 |
| Comp. 68 | 53.6 | 52 | 75 | 76 |
| Comp. 69 | 53.2 | 53.8 | 76 | 76 |
| Comp. 70 | 55.7 | 56.1 | 74 | 74 |
| Comp. 71 | 57.6 | 58.3 | 72 | 72 |
| Comp. 72 | 59.3 | 58.8 | 72 | 72 |
| Comp. 73 | 59.7 | 59.3 | 72 | 72 |
| Comp. 74 | 59.1 | 59.9 | 72 | 72 |
| Comp. 75 | 63.0 | 62.6 | 74 | 74 |
| Comp. 76 | 63.3 | 63.1 | 75 | 75 |
| Comp. 77 | 63.2 | 63.4 | 75 | 75 |
| Comp. 78 | 59.7 | 59.9 | 83 | 83 |
| Comp. 79 | 54.3 | 54.4 | 74 | 74 |

Standard linear regression analysis was used to construct a predictive model for both CTE and Young's modulus based on the composition and property data provided in Tables 7-8. The regression coefficients that were obtained are provided in Table 8.

TABLE 9

Table 9: Linear Regression Coefficients for CTE and Young's Modulus

| Oxide | CTE (20° C.-260° C.) | Coefficient | Young's Modulus | Coefficient |
|---|---|---|---|---|
| $SiO_2$ | Intercept | 31.98615022 | Intercept | 119.6278898 |
| $Al_2O_3$ | X Variable 1 | −0.430953446 | X Variable 1 | −0.724461839 |
| $B_2O_3$ | X Variable 2 | 0.061922264 | X Variable 2 | −1.752943291 |
| $Na_2O$ | X Variable 3 | 4.247079525 | X Variable 3 | −0.094245376 |
| MgO | X Variable 4 | 0.904545076 | X Variable 4 | 2.199434789 |
| CaO | X Variable 5 | 1.026704946 | X Variable 5 | −1.43091694 |

Figure 6:
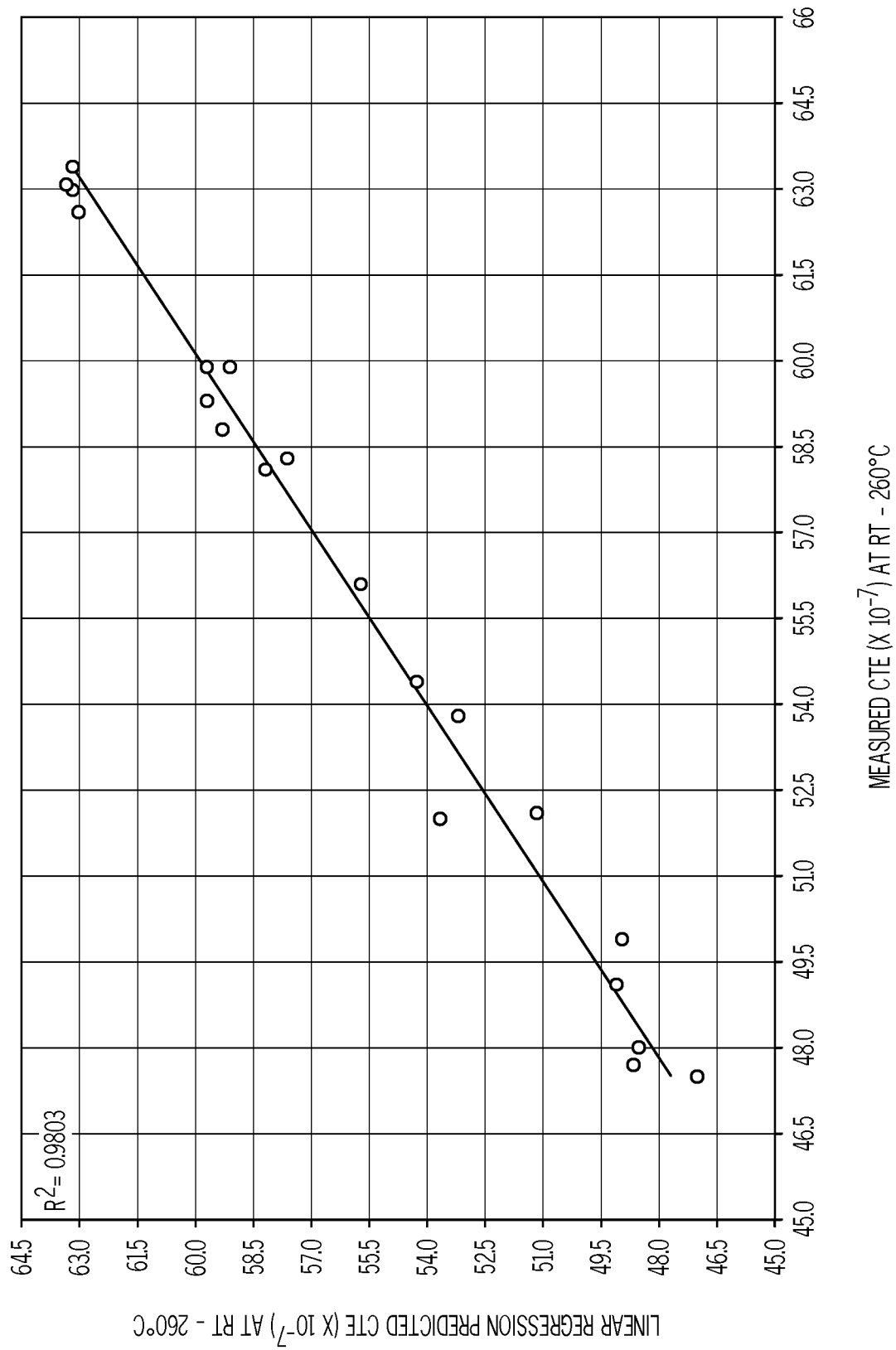
FIG. 6 is a plot of the measured CTE (Y-axis; values×10$^{-7}$/° C.) as a function of the predicted CTE (X-axis; values×10$^{-7}$/° C.) for different example glass compositions in accordance with one or more embodiments shown and described herein.
Figure 7:
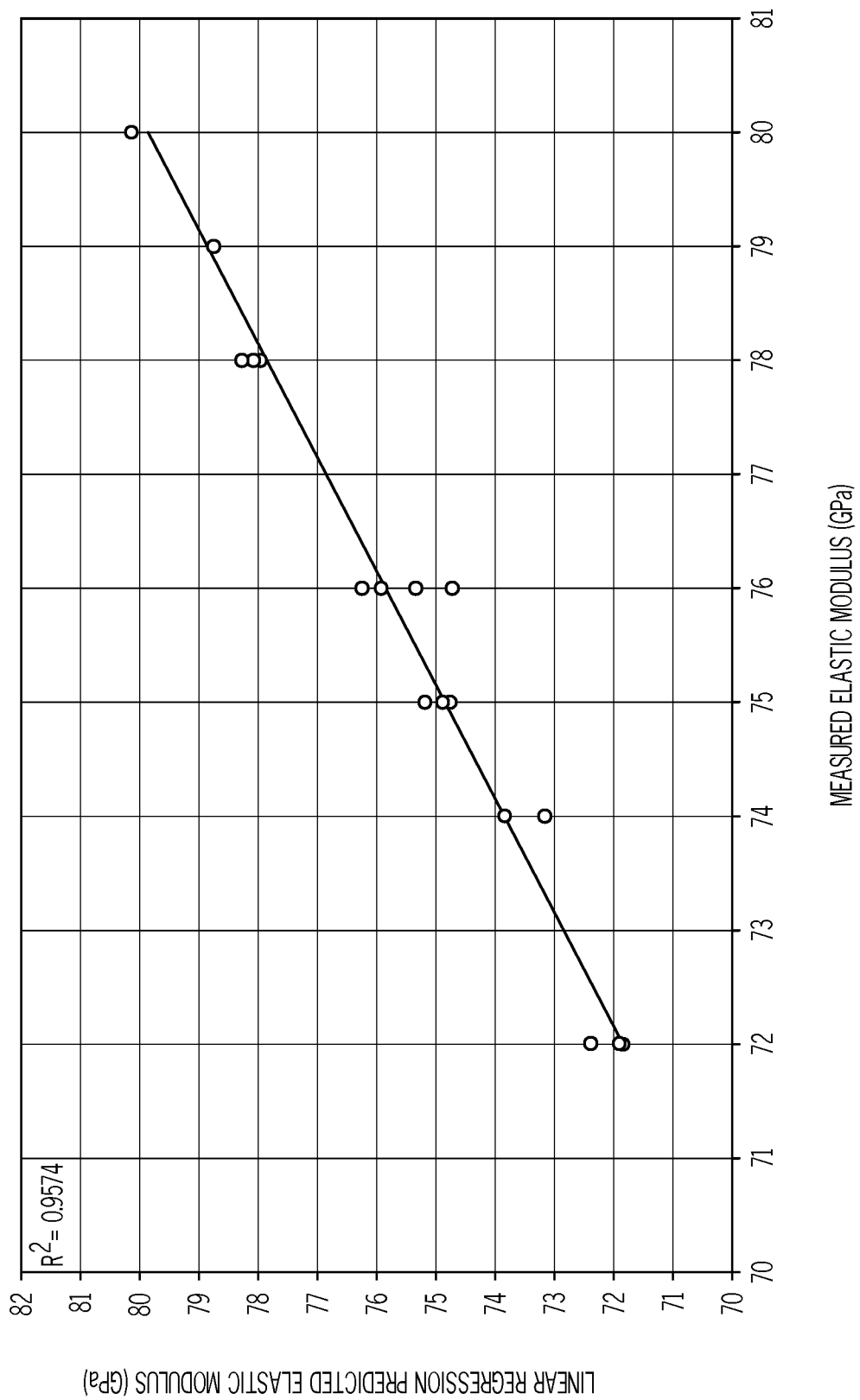
FIG. 7 is a plot of the measured Young's modulus (Y-axis; in GPa) as a function of the predicted Young's modulus (X-axis; in GPa) for different example glass compositions in accordance with one or more embodiments shown and described herein.

The predicted results from these linear regression models are provided in Table 8 above. In all cases, the predicted values for CTE are within $1.6 \times 10^{-7}$/° C., with all but one predicted value being within $1.0 \times 10^{-7}$/° C., and the predicted values for Young's modulus are within 1.0 GPa. The agreement between the measured and predicted values is shown in FIGS. 6 and 7. Specifically, FIG. 6 is a plot of the measured CTE (Y-axis; values×$10^{-7}$/° C.) as a function of the predicted CTE (X-axis; values×$10^{-7}$/° C.) for the glasses from Table 7. FIG. 7 is a plot of the measured Young's modulus (Y-axis; in GPa) as a function of the predicted Young's modulus (X-axis; in GPa). As may be seen from the $R^2$ value for both of FIGS. 6 and 7, the model has a high predictive capability for both CTE and Young's modulus over the CTE range from 40-70×$10^{-7}$/° C. measured from 20° C. to 260° C.

Using the models described in Table 9, CTEs and Young's modulus values for additional various glass compositions were predicted. In particular, Comp. 80 below was used as a base glass composition to generate various additional glass compositions. The compositions are provided in Table 10, and predicted values of various properties are provided in Table 11.

TABLE 10

Table 10: Adjustable Glass Compositions with CTE in the range of 40-70 × $10^{-7}$/° C. (Reported in Oxide wt %)

| | $SiO_2$ | $Al_2O_3$ | $b_2o_3$ | $Na_2O$ | MgO | CaO | F | $Sb_2O_3$ |
|---|---|---|---|---|---|---|---|---|
| Comp. 80 | 49.95 | 25.00 | 9.83 | 0.00 | 6.72 | 8.34 | 0.00 | 0.50 |
| Comp. 81 | 49.95 | 25.00 | 9.83 | 0.00 | 4.72 | 10.34 | 0.00 | 0.50 |
| Comp. 82 | 49.95 | 25.00 | 9.83 | 1.51 | 5.20 | 8.34 | 0.00 | 0.50 |
| Comp. 83 | 49.95 | 25.00 | 9.83 | 1.88 | 4.84 | 8.34 | 0.00 | 0.50 |
| Comp. 84 | 49.95 | 25.00 | 9.83 | 2.25 | 4.46 | 8.34 | 0.00 | 0.50 |
| Comp. 85 | 49.95 | 25.00 | 9.83 | 3.10 | 3.61 | 8.34 | 0.00 | 0.50 |
| Comp. 86 | 49.95 | 25.00 | 9.83 | 3.35 | 3.36 | 8.34 | 0.00 | 0.50 |
| Comp. 87 | 49.95 | 25.00 | 9.83 | 3.35 | 3.36 | 8.34 | 1.15 | 0.50 |
| Comp. 88 | 49.95 | 25.00 | 9.83 | 4.00 | 2.71 | 8.34 | 0.00 | 0.50 |
| Comp. 89 | 49.95 | 25.00 | 9.83 | 4.00 | 2.71 | 8.34 | 1.15 | 0.50 |
| Comp. 90 | 49.95 | 25.00 | 9.83 | 5.25 | 1.47 | 8.34 | 0.00 | 0.50 |
| Comp. 91 | 49.95 | 25.00 | 9.83 | 5.35 | 1.37 | 8.34 | 0.00 | 0.50 |
| Comp. 92 | 49.95 | 25.00 | 9.83 | 5.51 | 1.20 | 8.34 | 0.00 | 0.50 |
| Comp. 93 | 49.95 | 25.00 | 9.83 | 6.26 | 0.45 | 8.34 | 0.00 | 0.50 |
| Comp. 94 | 49.95 | 25.00 | 9.83 | 6.46 | 0.25 | 8.34 | 0.00 | 0.50 |
| Comp. 95 | 49.95 | 25.00 | 9.83 | 6.71 | 0.00 | 8.34 | 0.00 | 0.50 |
| Comp. 96 | 47.95 | 25.00 | 9.83 | 7.52 | 1.20 | 8.34 | 0.00 | 0.50 |
| Comp. 97 | 47.95 | 25.00 | 9.83 | 7.52 | 1.20 | 8.34 | 1.00 | 0.50 |
| Comp. 98 | 47.95 | 25.00 | 9.83 | 7.52 | 1.20 | 8.34 | 1.50 | 0.50 |

TABLE 11

Table 11: Predicted Properties of Adjustable Glass Compositions with CTE in the range of 40-70 × $10^{-7}$/° C.

|  | Modeled CTE < Tg (×$10^{-7}$/° C.) | Modeled Young's Modulus (GPa) | Predicted Density (g/cm³) | Predicted 200 Poise Temperature (° C.) | Predicted Liquidus Temperature (° C.) |
|---|---|---|---|---|---|
| Comp. 80 | 37 | 82 | 3 | 1446 | 1269 |
| Comp. 81 | 39 | 81 | 3 | 1446 | 1200 |
| Comp. 82 | 41 | 81 | 3 | 1483 | 1215 |
| Comp. 83 | 43 | 80 | 3 | 1460 | 1147 |
| Comp. 84 | 45 | 80 | 3 | 1437 | 1185 |
| Comp. 85 | 46 | 79 | 2 | 1482 | 1148 |
| Comp. 86 | 48 | 78 | 2 | 1487 | 1122 |
| Comp. 87 | 48 | — | — | — | — |
| Comp. 88 | 51 | 77 | 2 | 1492 | 1231 |
| Comp. 89 | 51 | — | — | — | — |
| Comp. 90 | 53 | 77 | 2 | 1467 | 1230 |
| Comp. 91 | 56 | 76 | 2 | 1487 | 1228 |
| Comp. 92 | 57 | 76 | 2 | 1482 | 1228 |
| Comp. 93 | 59 | 75 | 2 | 1444 | 1223 |
| Comp. 94 | 66 | 75 | 2 | 1454 | 1222 |
| Comp. 95 | 60 | 74 | 2 | 1467 | 1163 |
| Comp. 96 | 71 | 74 | 2 | 1467 | 1063 |
| Comp. 97 | 71 | — | — | — | — |
| Comp. 98 | 71 | — | — | — | — |

As shown in Table 11, each of the glass compositions is expected to have a CTE between 40×$10^{-7}$/° C. and 60×$10^{-7}$/° C., a Young's modulus greater than 72 GPa, and a 200 Poise temperature of less than 1500° C.

To further confirm that the concept could be used for a variety of glasses and to achieve a variety of CTEs, different starting glass compositions were studied. Two modeled glass compositions were selected to cover CTETs in the range below 60×$10^{-7}$/° C., and the CTE was modeled using the linear regression model provided in Table 8. The results are provided in Table 12 below.

TABLE 12

Table 12: Adjustable Glass Compositions with Modeled CTE in the range of 41-60 × $10^{-7}$/° C.

| Oxide (wt %) | Starting Glass Comp. 99 | Replacing Na₂O for MgO | | | | | | | | | Replacing MgO for Na₂O | |
|---|---|---|---|---|---|---|---|---|---|---|---|---|
| | | Comp. 100 | Comp. 101 | Comp. 102 | Comp. 103 | Comp. 104 | Comp. 105 | Comp. 106 | Comp. 107 | Comp. 108 | Comp. 109 | |
| $SiO_2$ | 49.95 | 49.95 | 54.1 | 50 | 50 | 50 | 50 | 50 | 50 | 50 | 50 | |
| $Al_2O_3$ | 25 | 25 | 22.9 | 25 | 25 | 25 | 25 | 25 | 25 | 25 | 25 | |
| $B_2O_3$ | 9.83 | 9.83 | 9 | 9.8 | 9.8 | 9.8 | 9.8 | 9.8 | 9.8 | 9.8 | 9.8 | |
| $Na_2O$ | 5.51 | 1.51 | 1.7 | 3.1 | 3.3 | 3.4 | 4 | 5.3 | 5.4 | 6.3 | 6.7 | |
| MgO | 1.2 | 5.2 | 4.4 | 3.6 | 3.4 | 3.3 | 2.7 | 1.5 | 1.4 | 0.4 | 0 | |
| CaO | 8.34 | 8.34 | 7.6 | 8.3 | 8.3 | 8.3 | 8.4 | 8.3 | 8.3 | 8.3 | 8.4 | |
| $SnO_2$ | 0.16 | 0.16 | 0.16 | 0.16 | 0.16 | 0.16 | 0.16 | 0.16 | 0.16 | 0.16 | 0.16 | |
| Modeled CTE < Tg (×$10^{-7}$/° C.) | 57 | 41 | 43 | 46 | 48 | 49 | 51 | 53 | 56 | 59 | 60 | |
| Modeled Young's Modulus (GPa) | 76.4 | 80.9 | 80.3 | 78.9 | 78.4 | 78 | 77.5 | 76.5 | 75 | 75.1 | 74.4 | |
| Modeled Density (g/cm³) | 2.45 | 2.51 | 2.51 | 2.49 | 2.49 | 2.49 | 2.48 | 2.45 | 2.44 | 2.45 | 2.45 | |
| Modeled 200 Poise Temp (° C.) | 1482 | 1483 | 1460 | 1482 | 1487 | 1485 | 1492 | 1467 | 1487 | 1444 | 1467 | |
| Modeled Liquidus Temp (° C.) | 1228 | 1215 | 1147 | 1148 | 1121 | 1303 | 1230 | 1230 | 1227 | 1223 | 1162 | |

Based on the modeled data, the CTE can be tuned within the range from 40 to 60×10$^{-7}$/° C. by starting with different base glass compositions and adjusting the composition. Each of the compositions had a CTE within the target range, a Young's modulus of greater than 72 GPa and a 200 Poise temperature of less than 1500° C., indicating that these glasses would remain suitable for processing under the same or similar conditions as the base glass composition.

Using the models described in Table 9, CTEs and Young's modulus values for glass compositions modified from a different base glass composition were predicted. In particular, Comp. 110 below was modified to generate various additional glass compositions. The compositions are provided in Table 13, and predicted values of various properties are provided in Table 14.

TABLE 13

Table 13: Adjustable Glass Compositions with CTE in the range of 40-60 × 10$^{-7}$/° C. (Reported in Oxide wt %)

|  | SiO$_2$ | Al$_2$O$_3$ | Na$_2$O | K$_2$O | MgO | CaO | La$_2$O$_3$ | Sb$_2$O$_3$ |
|---|---|---|---|---|---|---|---|---|
| Comp. 110 | 46.12 | 18.49 | 0.00 | 0.00 | 3.77 | 1.44 | 30.02 | 0.00 |
| Comp. 111 | 46.12 | 18.49 | 0.00 | 0.00 | 3.77 | 6.44 | 25.02 | 0.00 |
| Comp. 112 | 39.50 | 18.49 | 0.00 | 4.54 | 0.00 | 7.42 | 30.02 | 0.00 |
| Comp. 113 | 39.50 | 18.49 | 0.00 | 5.04 | 0.00 | 6.92 | 30.02 | 0.00 |
| Comp. 114 | 39.50 | 18.49 | 0.00 | 5.54 | 0.00 | 6.42 | 30.02 | 0.00 |
| Comp. 115 | 39.50 | 18.49 | 0.00 | 5.78 | 0.00 | 6.18 | 30.02 | 0.00 |
| Comp. 116 | 39.50 | 18.49 | 0.00 | 6.78 | 0.00 | 5.18 | 30.02 | 0.00 |
| Comp. 117 | 39.50 | 18.49 | 3.53 | 0.00 | 0.00 | 8.42 | 30.02 | 0.00 |
| Comp. 118 | 39.50 | 18.49 | 3.53 | 0.50 | 0.00 | 7.2 | 30.02 | 0.00 |
| Comp. 119 | 39.50 | 18.49 | 1.77 | 5.77 | 0.00 | 4.42 | 30.02 | 0.00 |
| Comp. 120 | 39.50 | 18.49 | 2.77 | 4.77 | 0.00 | 4.42 | 30.02 | 0.00 |
| Comp. 121 | 39.50 | 18.49 | 4.03 | 0.00 | 0.00 | 7.92 | 30.02 | 0.00 |
| Comp. 122 | 39.50 | 18.49 | 3.77 | 3.77 | 0.00 | 4.42 | 30.02 | 0.00 |

TABLE 14

Table 14: Predicted Properties of Adjustable Glass Compositions with CTE in the range of 40-60 × 10$^{-7}$/° C.

|  | Modeled CTE < Tg (×10$^{-7}$/° C.) | Modeled Young's Modulus (GPa) | Predicted Density (g/cm$^3$) | Predicted 200 Poise Temperature (° C.) | Predicted Liquidus Temperature (° C.) |
|---|---|---|---|---|---|
| Comp. 110 | 42 | 96 | 3.16 | 1452 | 1188.7 |
| Comp. 111 | 43 | 94 | 3.07 | 1469 | 1259.7 |
| Comp. 112 | 45 | 93 | 3.18 | 1462 | 1194.9 |
| Comp. 113 | 46 | 93 | 3.17 | 1463 | 1200.2 |
| Comp. 114 | 48 | 93 | 3.17 | 1462 | 1186.0 |
| Comp. 115 | 49 | 93 | 3.19 | 1462 | 1183.0 |
| Comp. 116 | 50 | 93 | 3.19 | 1458 | 1182.5 |
| Comp. 117 | 51 | 94 | 3.20 | 1440 | 1194.8 |
| Comp. 118 | 52 | 93 | 3.19 | 1457 | 1166.6 |
| Comp. 119 | 53 | 93 | 3.18 | 1463 | 1164.0 |
| Comp. 120 | 55 | 92 | 3.18 | 1460 | 1157.3 |
| Comp. 121 | 56 | 93 | 3.19 | 1445 | 1125.9 |
| Comp. 122 | 58 | 90 | 3.16 | 1416 | 1138.0 |

As shown in Table 14, each of the glass compositions is expected to have a CTE between $40 \times 10^{-7}$/° C. and $60 \times 10^{-7}$/° C., a Young's modulus greater than 90 GPa, and a 200 Poise temperature of less than 1500° C.

Example 3

In order to achieve higher CTEs, a glass composition including $Li_2O$ was studied. In particular, Comp. 123 below was modified to generate additional glass compositions having CTEs between $90 \times 10^{-7}$/° C. and $130 \times 10^{-7}$/° C. The compositions are provided in Table 15, and predicted values of various properties are provided in Table 16.

TABLE 15

Table 15: Adjustable Glass Compositions with CTE in the range of 90-130 × $10^{-7}$/° C. (Reported in Oxide wt %)

|  | $SiO_2$ | $Al_2O_3$ | $Li_2O$ | $Na_2O$ | $K_2O$ | MgO | CaO | $Sb_2O_3$ |
|---|---|---|---|---|---|---|---|---|
| Comp. 123 | 65.96 | 11.55 | 6.20 | 7.54 | 0.36 | 1.27 | 6.83 | 0.25 |
| Comp. 124 | 65.96 | 11.55 | 6.2 | 9.54 | 0.36 | 1.27 | 4.83 | 0.25 |
| Comp. 125 | 65.96 | 11.55 | 6.2 | 11.54 | 0.36 | 1.27 | 2.83 | 0.25 |
| Comp. 126 | 65.96 | 11.55 | 5.2 | 10.54 | 5.36 | 0.27 | 0.82 | 0.25 |
| Comp. 127 | 65.96 | 11.55 | 7.2 | 10.54 | 3.36 | 0.27 | 0.83 | 0.25 |
| Comp. 128 | 65.96 | 11.55 | 3.2 | 17.54 | 0.36 | 0.27 | 0.83 | 0.25 |
| Comp. 129 | 62.6 | 9.55 | 9.2 | 10.00 | 8.36 | 0 | 0 | 0.25 |
| Comp. 130 | 62.6 | 9.55 | 3.2 | 11.00 | 13.36 | 0 | 0 | 0.25 |
| Comp. 131 | 62.6 | 9.55 | 6.2 | 12.00 | 9.36 | 0 | 0 | 0.25 |
| Comp. 132 | 62.6 | 9.55 | 3.2 | 14.73 | 9.36 | 0.27 | 0 | 0.25 |
| Comp. 133 | 60.6 | 9.55 | 3.2 | 13.00 | 13.36 | 0 | 0 | 0.25 |
| Comp. 134 | 59.6 | 9.55 | 3.2 | 14.00 | 13.36 | 0 | 0 | 0.25 |
| Comp. 135 | 58.6 | 9.55 | 3.2 | 15.00 | 13.36 | 0 | 0 | 0.25 |
| Comp. 136 | 57.1 | 9.55 | 3.2 | 16.50 | 13.36 | 0 | 0 | 0.25 |

TABLE 16

Table 16: Predicted Properties of Adjustable Glass Compositions with CTE in the range of 90-130 × $10^{-7}$/° C.

|  | Modeled CTE <Tg ($\times 10^{-7}$/° C.) | Modeled Young's Modulus (GPa) | Predicted Density (g/cm³) | Predicted 200 Poise Temperature (° C.) | Predicted Liquidus Temperature (° C.) |
|---|---|---|---|---|---|
| Comp. 123 | 92 | 83 | 2.49 | 1340 | 901.93 |
| Comp. 124 | 95 | 83 | 2.48 | 1341 | 855.03 |
| Comp. 125 | 98 | 82 | 2.47 | 1278 | 794.94 |
| Comp. 126 | 102 | 82 | 2.45 | 1388 | 759.21 |
| Comp. 127 | 103 | 82 | 2.45 | 1266 | 809.78 |
| Comp. 128 | 106 | 74 | 2.46 | 1484 | 781.26 |
| Comp. 129 | 109 | 83 | 2.48 | 1268 | 877.35 |
| Comp. 130 | 115 | 75 | 2.46 | 1364 | 974.46 |
| Comp. 131 | 117 | 81 | 2.47 | 1303 | 741.1 |
| Comp. 132 | 119 | 75 | 2.47 | 1403 | 935.18 |
| Comp. 133 | 121 | 72 | 2.47 | 1440 | 726.7 |
| Comp. 134 | 123 | 72 | 2.49 | 1404 | 763.69 |
| Comp. 135 | 128 | 77 | 2.48 | 1406 | 779.49 |
| Comp. 136 | 131 | 77 | 2.5 | 1394 | 752.21 |

Standard linear regression analysis was used to construct a predictive model for both CTE and Young's modulus based on the compositions provided in Table 15 and corresponding measured properties. The regression coefficients that were obtained are provided in Table 17.

TABLE 17

Table 17: Linear Regression Coefficients for CTE and Young's Modulus

| Oxide | CTE (20° C.-260° C.) | Coefficient | Young's Modulus | Coefficient |
|---|---|---|---|---|
| $SiO_2$ | Intercept | 137.5612129 | Intercept | 72.03447013 |
| $Al_2O_3$ | X Variable 1 | −5.471592999 | X Variable 1 | 0.096444782 |
| $Li_2O$ | X Variable 2 | 1.181240915 | X Variable 2 | 0.92453515 |
| $Na_2O$ | X Variable 3 | 2.221133922 | X Variable 3 | 0.092136596 |
| $K_2O$ | X Variable 4 | 1.319063347 | X Variable 4 | −0.464253215 |
| MgO | X Variable 5 | −5.372521274 | X Variable 5 | −1.197632544 |
| CaO | X Variable 6 | −0.097587446 | X Variable 6 | 1.117490089 |

Figure 8:
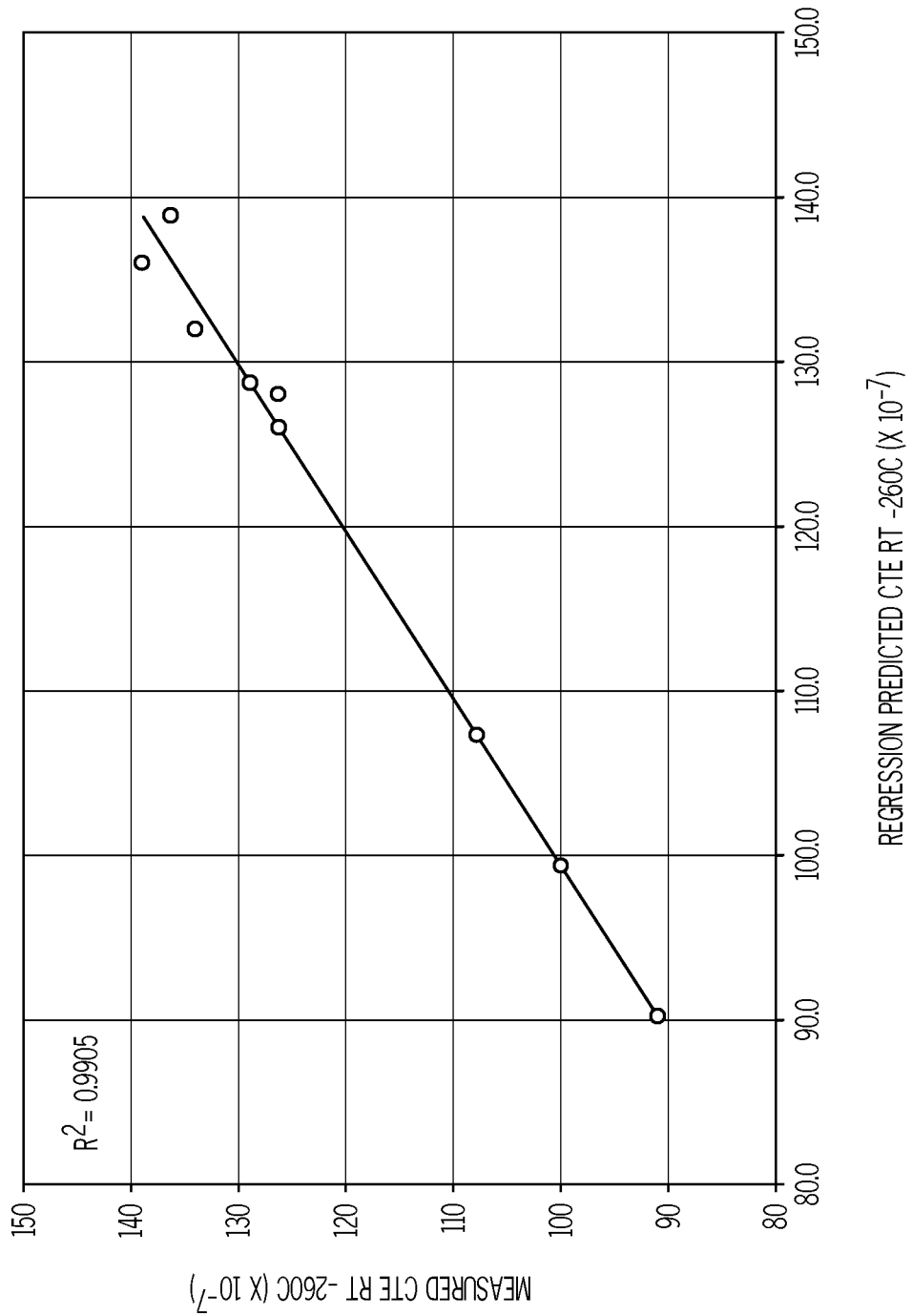
FIG. 8 is a plot of the measured CTE (Y-axis; values×10$^{-7}$/° C.) as a function of the predicted CTE (X-axis; values×10$^{-7}$/° C.) for example glass compositions in accordance with one or more embodiments shown and described herein.
Figure 9:
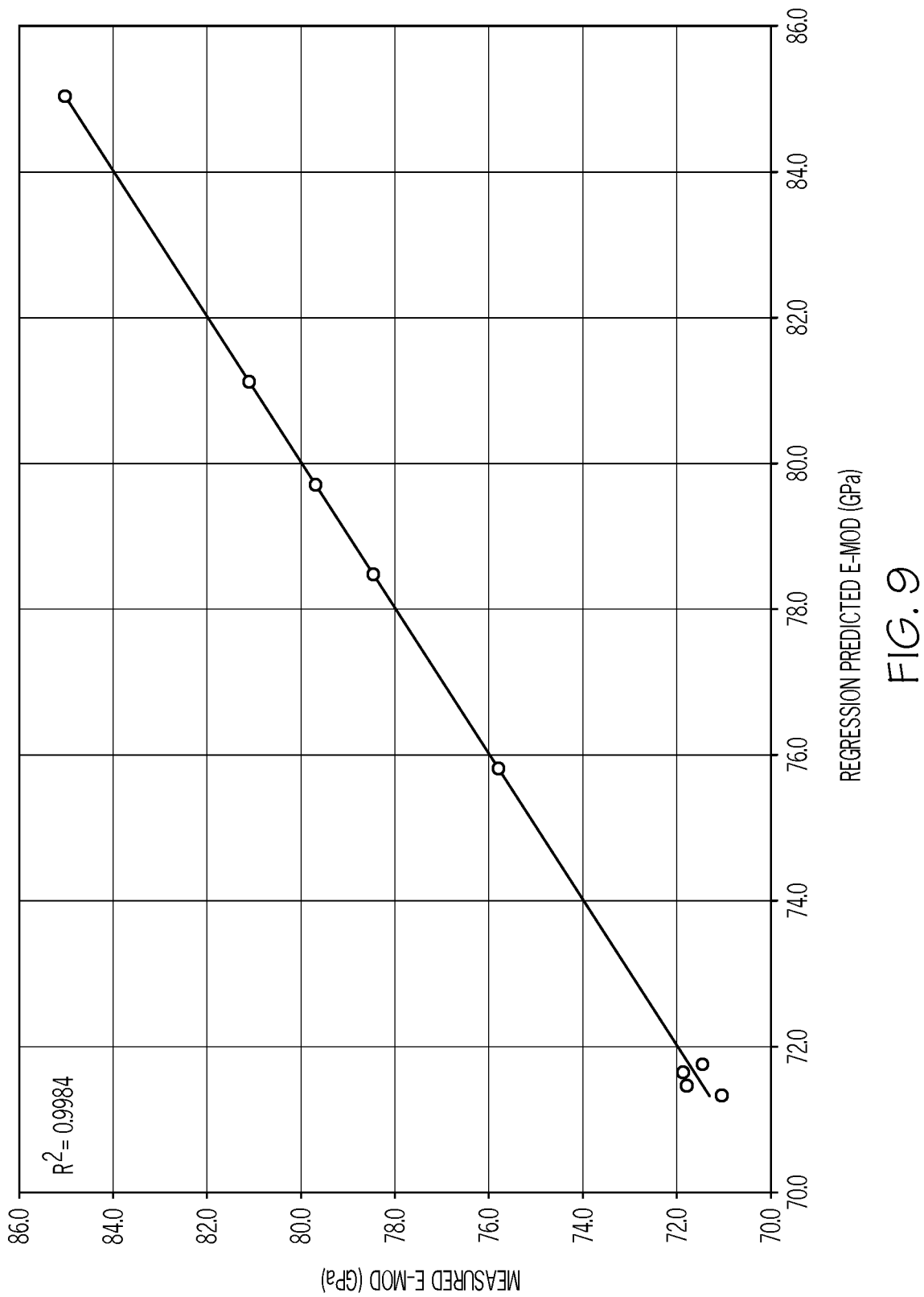
FIG. 9 is a plot of the measured Young's modulus (Y-axis; in GPa) as a function of the predicted Young's modulus (X-axis; in GPa) for example glass compositions in accordance with one or more embodiments shown and described herein.

The predicted results from these linear regression models are provided in Table 16 above. As shown in Table 16, each of the glass compositions is expected to have a CTE between $90 \times 10^{-7}/°$ C. and $130 \times 10^{-7}/°$ C., a Young's modulus greater than 72 GPa, and a 200 Poise temperature of less than 1500° C. The agreement between the measured and predicted values is shown in FIGS. 8 and 9. Specifically, FIG. 8 is a plot of the measured CTE (Y-axis; values×$10^{-7}/°$ C.) as a function of the predicted CTE (X-axis; values×$10^{-7}/°$ C.) for the glasses from Table 16. FIG. 9 is a plot of the measured Young's modulus (Y-axis; in GPa) as a function of the predicted Young's modulus (X-axis; in GPa). As may be seen from the $R^2$ value for both of FIGS. 8 and 9, the model has a high predictive capability for both CTE and Young's modulus over the CTE range from 90-130×$10^{-7}/°$ C. measured from 20° C. to 260° C.

Additional compositions were studied to explore the ability to adjust the CTE over a wider range of temperatures. In particular, previous experiments observed the CTE over the range from 20° C. to 260° C. Additional glass compositions having CTEs between $90 \times 10^{-7}/°$ C. and $150 \times 10^{-7}/°$ C. measured over 20° C. to 300° C. and 20° C. to 390° C. are provided in Table 18, and predicted values of CTE over various ranges are provided in Table 19.

TABLE 19

Table 19: Properties of Adjustable Glass Compositions with CTE in the range of 90-150 × $10^{-7}/°$ C. over 20° C. to 300° C. and 20° C. to 390° C.

| | Measured CTE (20° C.-300° C.) | Predicted CTE (20° C.-300° C.) | Measured CTE (20° C.-390° C.) | Predicted CTE (20° C.-390° C.) |
|---|---|---|---|---|
| Comp. 137 | 92 | 92.29 | 96.8 | 96.79 |
| Comp. 138 | 102 | 101.62 | 107.2 | 107.22 |
| Comp. 139 | 110 | 109.58 | 115 | 114.98 |
| Comp. 140 | 129 | 128.46 | 134.8 | 134.75 |
| Comp. 141 | 128 | 130.06 | 132.4 | 134.74 |
| Comp. 142 | 131 | 130.88 | 137.1 | 137.19 |
| Comp. 143 | 136 | 134.22 | 141.8 | 139.66 |
| Comp. 144 | 142 | 138.43 | 148.4 | 144.65 |
| Comp. 145 | 139 | 141.46 | 144.7 | 148.22 |

Standard linear regression analysis was used to construct a predictive model for CTE over 20° C. to 300° C. and over 20° C. to 390° C. based on the compositions provided in Table 18 and corresponding measured properties. The regression coefficients that were obtained are provided in Table 20.

TABLE 20

Table 20: Linear Regression Coefficients for CTE over 20° C. to 300° C. and 20° C. to 390° C.

| Oxide | CTE (20° C.-300° C.) | Coefficient | CTE (20° C.-390° C.) | Coefficient |
|---|---|---|---|---|
| $SiO_2$ | Intercept | 131.9093419 | Intercept | 138.5093769 |
| $Al_2O_3$ | X Variable 1 | −5.053570424 | X Variable 1 | −5.655734141 |
| $Li_2O$ | X Variable 2 | 1.397804857 | X Variable 2 | 1.673991001 |
| $Na_2O$ | X Variable 3 | 2.312944293 | X Variable 3 | 2.731779214 |
| $K_2O$ | X Variable 4 | 1.485189419 | X Variable 4 | 1.36455255 |
| MgO | X Variable 5 | −4.972563994 | X Variable 5 | −5.519456652 |
| CaO | X Variable 6 | −0.05878923 | X Variable 6 | 0.078265306 |

Figure 10:
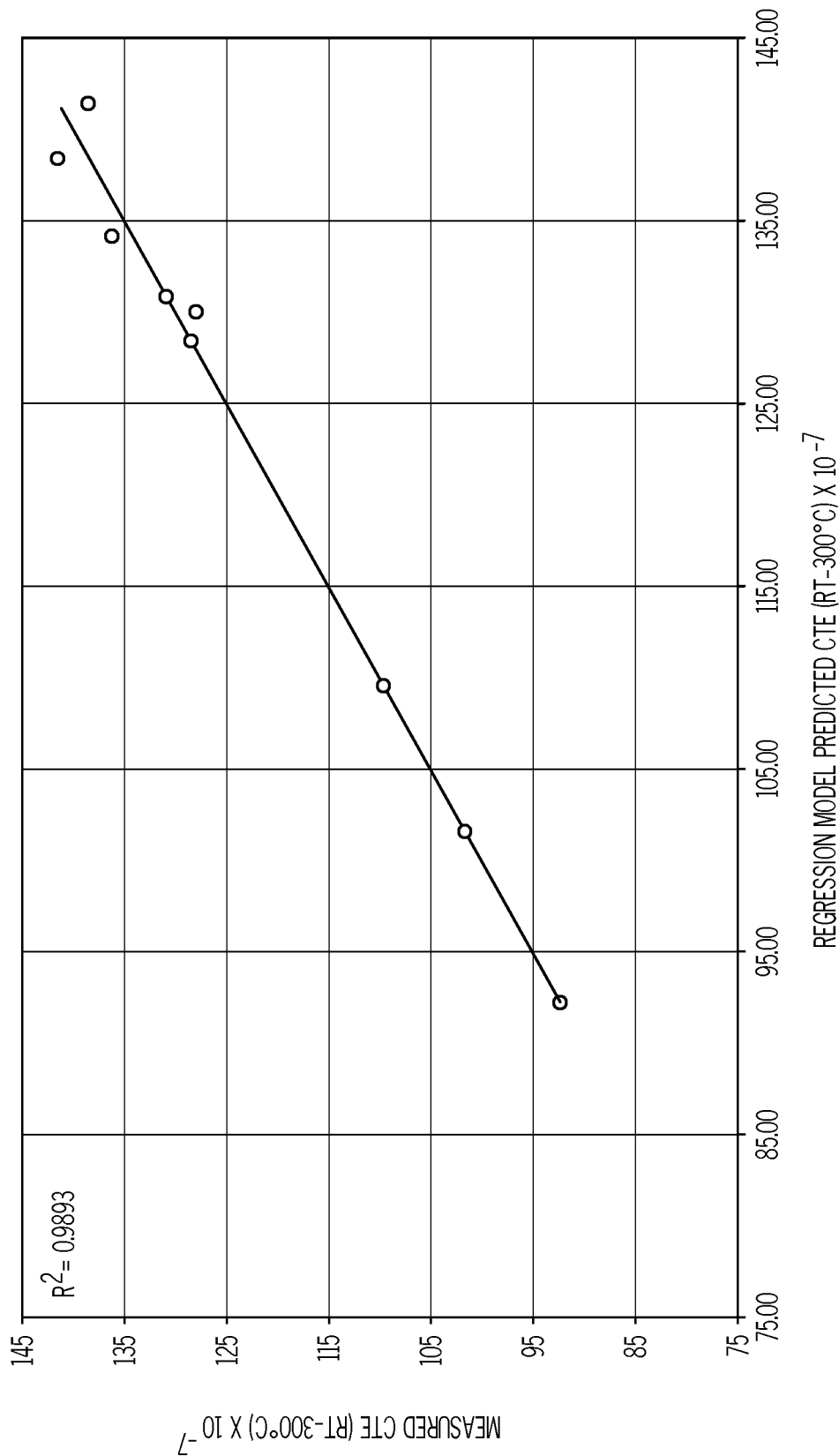
FIG. 10 is a plot of the measured CTE (Y-axis; values×10$^{-7}$/° C.) as a function of the predicted CTE (X-axis; values×10$^{-7}$/° C.) over 20° C. to 300° C. for example glass compositions in accordance with one or more embodiments shown and described herein.
Figure 11:
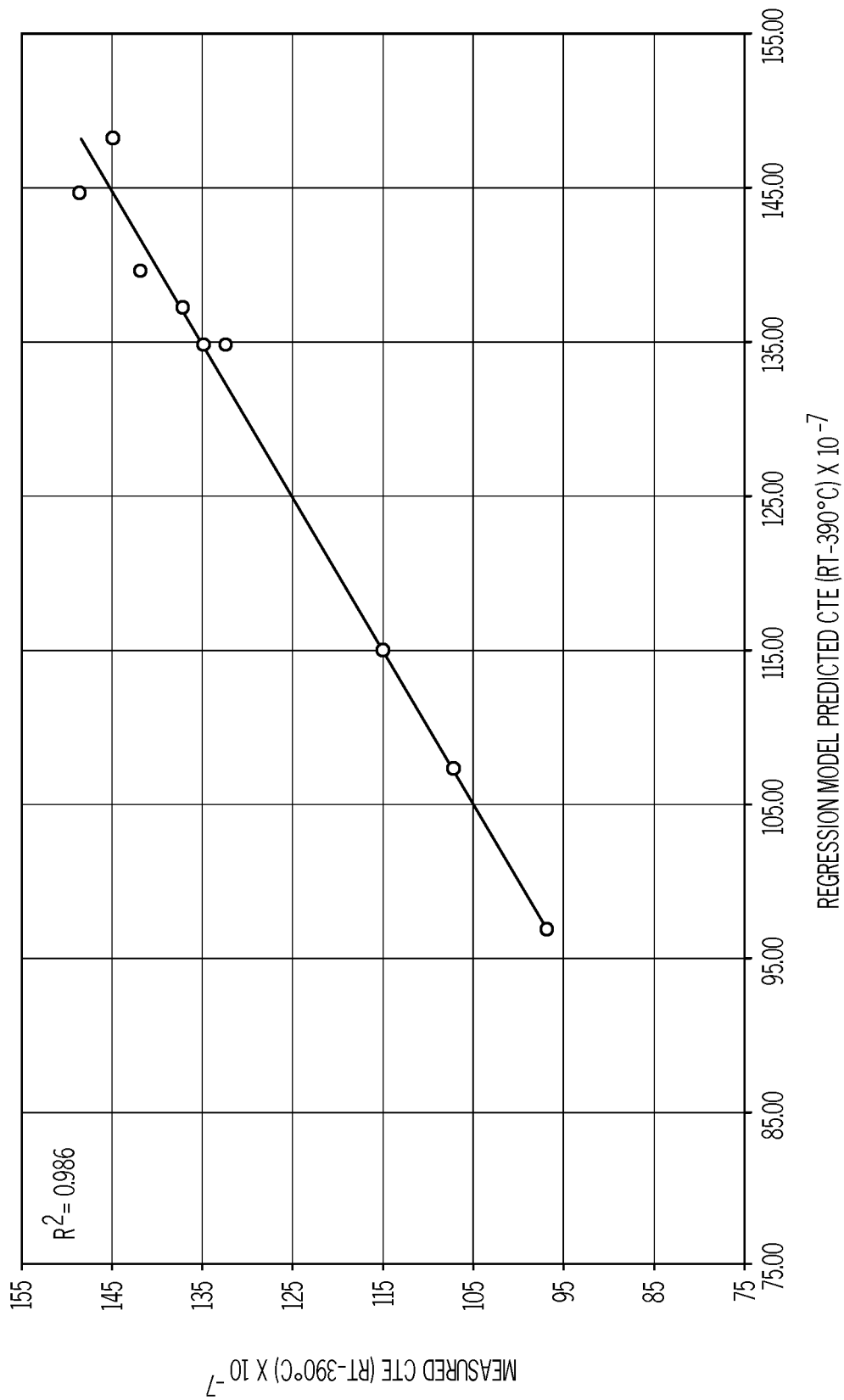
FIG. 11 is a plot of the measured CTE (Y-axis; values×10$^{-7}$/° C.) as a function of the predicted CTE (X-axis; values×10$^{-7}$/° C.) over 20° C. to 390° C. for example glass compositions in accordance with one or more embodiments shown and described herein.

The predicted results from these linear regression models are provided in Table 19 above. As shown in Table 19, each of the glass compositions is expected to have a CTE between $90 \times 10^{-7}/°$ C. and $150 \times 10^{-7}/°$ C. The agreement between the measured and predicted values is shown in FIGS. 10 and 11. Specifically, FIG. 10 is a plot of the measured CTE (Y-axis;

TABLE 18

Table 18: Adjustable Glass Compositions with CTE in the range of 90-150 × $10^{-7}/°$ C. over 20° C. to 300° C. and 20° C. to 390° C. (Reported in Oxide wt %)

| | $SiO_2$ | $Al_2O_3$ | $Li_2O$ | $Na_2O$ | $K_2O$ | MgO | CaO | $Sb_2O_3$ |
|---|---|---|---|---|---|---|---|---|
| Comp. 137 | 65.73 | 11.55 | 6.02 | 7.3 | 0.34 | 1.34 | 6.62 | 0.51 |
| Comp. 138 | 65.82 | 11.57 | 6.03 | 11.18 | 0.35 | 1.3 | 2.74 | 0.51 |
| Comp. 139 | 65.89 | 11.61 | 6.98 | 10.2 | 3.02 | 0.29 | 0.82 | 0.5 |
| Comp. 140 | 63.28 | 9.65 | 8.74 | 9.54 | 7.47 | 0.012 | 0.026 | 0.49 |
| Comp. 141 | 63.44 | 9.62 | 3.16 | 10.62 | 12 | 0.007 | 0.025 | 0.47 |
| Comp. 142 | 6.303 | 9.7 | 6.12 | 11.65 | 8.44 | 0.009 | 0.026 | 0.48 |
| Comp. 143 | 61.5 | 9.63 | 3.13 | 12.47 | 11.99 | 0.01 | 0.026 | 0.46 |
| Comp. 144 | 59.64 | 9.66 | 3.12 | 14.37 | 11.98 | 0.01 | 0.026 | 0.46 |
| Comp. 145 | 58.29 | 9.67 | 3.11 | 15.69 | 12 | 0.008 | 0.029 | 0.45 | values×10$^{-7}$/° C.) as a function of the predicted CTE (X-axis; values×10$^{-7}$/° C.) over 20° C. to 300° C. for the glasses from Table 18. FIG. 11 is a plot of the measured CTE (Y-axis; values×10$^{-7}$/° C.) as a function of the predicted CTE (X-axis; values×10$^{-7}$/° C.) over 20° C. to 390° C. for the glasses from Table 18. As may be seen from the R$^2$ value for both of FIGS. 10 and 11, the model has a high predictive capability for CTE from 90-150×10$^{-7}$/° C. measured from 20° C. to 300° C. and from 20° C. to 390° C.

Example 4

Additional compositions were studied to explore the ability to adjust the CTE over a wider range of temperatures. In particular, previous experiments observed the CTE over the range from 20° C. to 260° C. Additional glass compositions having CTEs between 40×10$^{-7}$/° C. and 70×10$^{-7}$/° C. measured over 20° C. to 300° C. and 20° C. to 390° C. are provided in Table 21, and predicted CTE values are provided in Table 22.

TABLE 21

Table 21: Adjustable Glass Compositions with CTE in the range of 40-70 × 10$^{-7}$/° C. over 20° C. to 300° C. and 20° C. to 390° C. (Reported in Oxide wt %)

|  | SiO$_2$ | Al$_2$O$_3$ | B$_2$O$_3$ | Na$_2$O | MgO | CaO | Sb$_2$O$_3$ | SnO$_2$ |
|---|---|---|---|---|---|---|---|---|
| Comp. 146 | 49.7 | 24.94 | 9.76 | 3.22 | 3.46 | 8.13 | 0.57 | 0 |
| Comp. 147 | 49.7 | 29.94 | 9.76 | 3.22 | 3.46 | 8.13 | 0.57 | 0 |
| Comp. 148 | 48.93 | 24.9 | 10.33 | 3.581 | 3.152 | 8.47 | 0.00 | 0.21 |
| Comp. 149 | 48.91 | 24.95 | 10.28 | 3.56 | 3.17 | 8.44 | 0.00 | 0.21 |
| Comp. 150 | 49.81 | 24.94 | 9.68 | 3.85 | 2.8 | 8.14 | 0.57 | 0 |
| Comp. 151 | 49.81 | 24.94 | 9.68 | 3.85 | 2.8 | 8.14 | 0.57 | 0 |
| Comp. 152 | 49.07 | 24.93 | 10.05 | 3.69 | 3.06 | 8.43 | 0.00 | 0.21 |
| Comp. 153 | 49.19 | 25.16 | 9.57 | 5.102 | 1.573 | 8.58 | 0.00 | 0.2 |
| Comp. 154 | 49.56 | 25.33 | 9.01 | 4.99 | 1.64 | 8.65 | 0.00 | 0.19 |
| Comp. 155 | 49.39 | 25.05 | 9.52 | 5.75 | 0.81 | 8.53 | 0.00 | 0.2 |
| Comp. 156 | 49.39 | 25.04 | 9.77 | 6.296 | 0.358 | 8.5 | 0.00 | 0.2 |
| Comp. 157 | 49.09 | 24.99 | 9.86 | 6.77 | 0.13 | 8.37 | 0.00 | 0.203 |
| Comp. 158 | 48.88 | 25.03 | 9.71 | 6.83 | 0.26 | 8.41 | 0.00 | 0.203 |
| Comp. 159 | 49.13 | 25.01 | 9.84 | 6.73 | 0.093 | 8.38 | 0.00 | 0.204 |
| Comp. 160 | 47.37 | 25.12 | 9.82 | 7.43 | 1.1 | 8.45 | 0.00 | 0.2 |
| Comp. 161 | 47.62 | 25.44 | 9.11 | 7.54 | 1.21 | 8.39 | 0.00 | 0.2 |
| Comp. 162 | 47.46 | 25.34 | 9.29 | 7.498 | 1.196 | 8.39 | 0.00 | 0.199 |
| Comp. 163 | 43.86 | 24.93 | 9.8 | 5.33 | 5.26 | 10.17 | 0.52 | 0 |
| Comp. 164 | 43.87 | 25.45 | 14.78 | 5.3 | 2.38 | 7.46 | 0.51 | 0 |
| Comp. 165 | 49.73 | 24.87 | 9.79 | 0.02 | 6.74 | 8.17 | 0.52 | 0 |
| Comp. 166 | 49.75 | 24.88 | 9.8 | 1.41 | 5.255 | 8.16 | 0.515 | 0 |
| Comp. 167 | 49.82 | 24.88 | 9.8 | 1.78 | 4.88 | 8.15 | 0.52 | 0 |
| Comp. 168 | 49.63 | 25.01 | 9.8 | 2.14 | 4.54 | 8.22 | 0.52 | 0 |
| Comp. 169 | 49.7 | 24.96 | 9.8 | 2.97 | 3.7 | 8.19 | 0.51 | 0 |
| Comp. 170 | 49.25 | 24.92 | 9.57 | 6.47 | 0.19 | 8.46 | 0 | 0.2 |
| Comp. 171 | 49.44 | 25.2 | 9.15 | 4.38 | 2.25 | 8.6 | 0 | 0.2 |

TABLE 22

Table 22: Properties of Adjustable Glass Compositions with CTE in the range of 40-70 × 10$^{-7}$/° C. over 20° C. to 300° C. and 20° C. to 390° C.

|  | Measured CTE (20° C.-300° C.) | Predicted CTE (20° C.-300° C.) | Measured CTE (20° C.-390° C.) | Predicted CTE (20° C.-390° C.) |
|---|---|---|---|---|
| Comp. 146 | 48 | 48.8 | 49 | 50.99 |
| Comp. 147 | 49 | 48.5 | 50 | 49.54 |
| Comp. 148 | 49 | 49.9 | 50 | 51.56 |
| Comp. 149 | 49 | 49.9 | 49 | 51.53 |
| Comp. 150 | 50 | 50.6 | 51 | 52.62 |
| Comp. 151 | 50 | 50.6 | 51 | 52.62 |
| Comp. 152 | 51 | 50.3 | 52 | 52.02 |
| Comp. 153 | 52 | 54.4 | 54 | 55.66 |
| Comp. 154 | 54 | 54.1 | 55 | 55.43 |
| Comp. 155 | 57 | 56.1 | 58 | 57.25 |
| Comp. 156 | 59 | 57.7 | 61 | 58.77 |
| Comp. 157 | 60 | 59.4 | 61 | 60.51 |
| Comp. 158 | 60 | 59.8 | 62 | 61.03 |
| Comp. 159 | 61 | 59.2 | 62 | 60.27 |
| Comp. 160 | 63 | 63.5 | 65 | 65.03 |
| Comp. 161 | 64 | 64.2 | 65 | 65.97 |
| Comp. 162 | 64 | 64.0 | 66 | 65.71 |
| Comp. 163 | 61 | 60.7 | 62 | 62.00 |
| Comp. 164 | 55 | 54.9 | 57 | 56.30 |
| Comp. 165 | 42 | 39.7 | 43 | 42.67 |
| Comp. 166 | 44 | 43.6 | 45 | 46.17 |
| Comp. 167 | 45 | 44.7 | 56 | 47.14 |
| Comp. 168 | 46 | 45.7 | 47 | 48.04 |
| Comp. 169 | 47 | 48.1 | 49 | 50.25 |
| Comp. 170 | 59 | 58.3 | 60 | 59.39 |
| Comp. 171 | 53 | 52.3 | 54 | 53.83 |

Standard linear regression analysis was used to construct a predictive model for CTE over 20° C. to 300° C. and over 20° C. to 390° C. based on the compositions provided in Table 21 and corresponding measured properties. The regression coefficients that were obtained are provided in Table 23.

TABLE 23

Table 23: Linear Regression Coefficients for CTE over 20° C. to 300° C. and 20° C. to 390° C.

| Oxide | CTE (20° C.-300° C.) | Coefficient | CTE (20° C.-390° C.) | Coefficient |
|---|---|---|---|---|
| $SiO_2$ | Intercept | 31.86272 | Intercept | 47.81324443 |
| $Al_2O_3$ | X Variable 1 | −0.06728 | X Variable 1 | −0.28850455 |
| $B_2O_3$ | X Variable 2 | −0.2062 | X Variable 2 | −0.442997258 |
| $Na_2O$ | X Variable 3 | 4.215118 | X Variable 3 | 4.387516515 |
| MgO | X Variable 4 | 1.336897 | X Variable 4 | 1.751246324 |
| CaO | X Variable 5 | 0.301558 | X Variable 5 | −0.675842501 |

Figure 12:
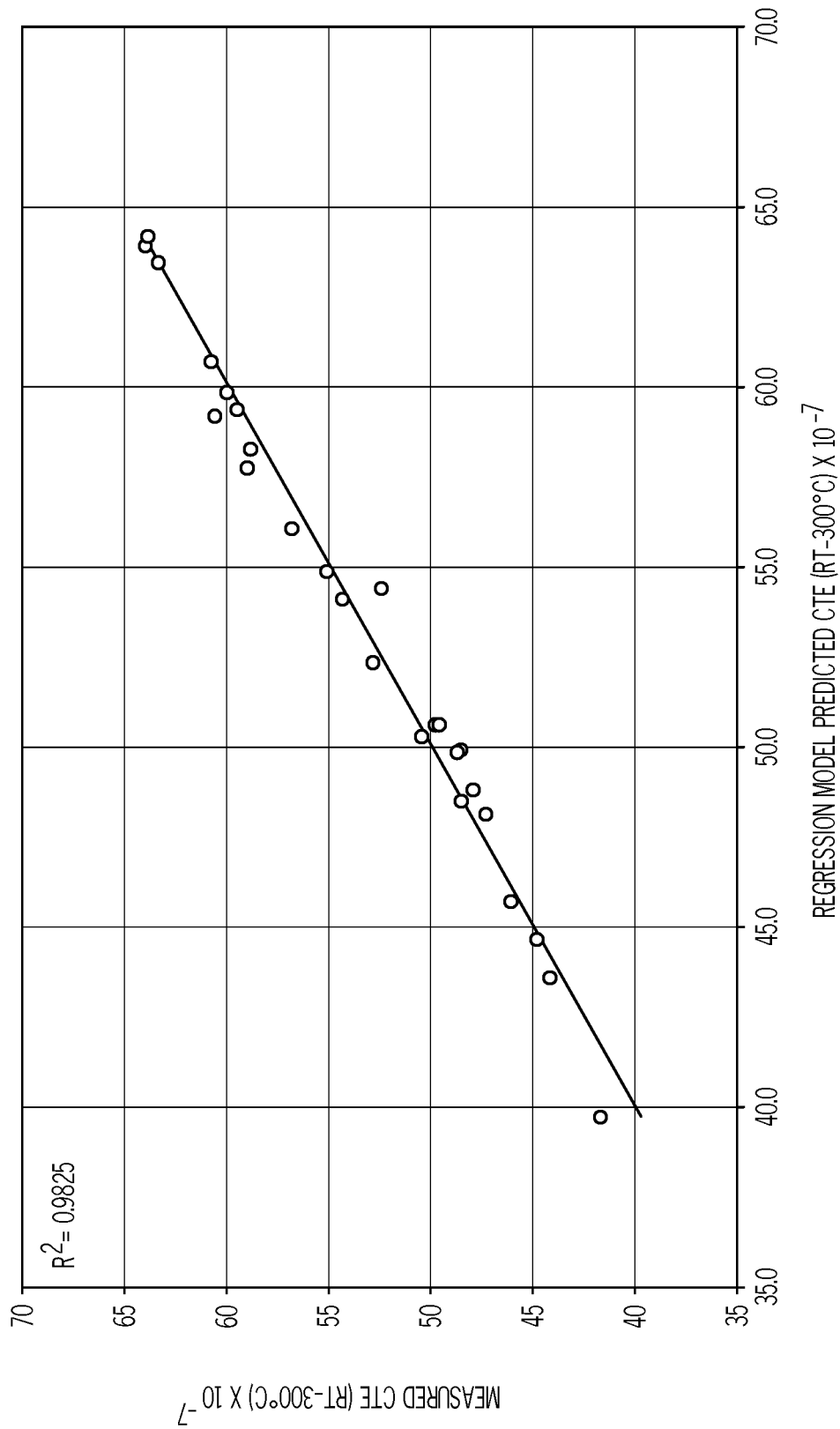
FIG. 12 is a plot of the measured CTE (Y-axis; values×10$^{-7}$/° C.) as a function of the predicted CTE (X-axis; values×10$^{-7}$/° C.) over 20° C. to 300° C. for example glass compositions in accordance with one or more embodiments shown and described herein.
Figure 13:
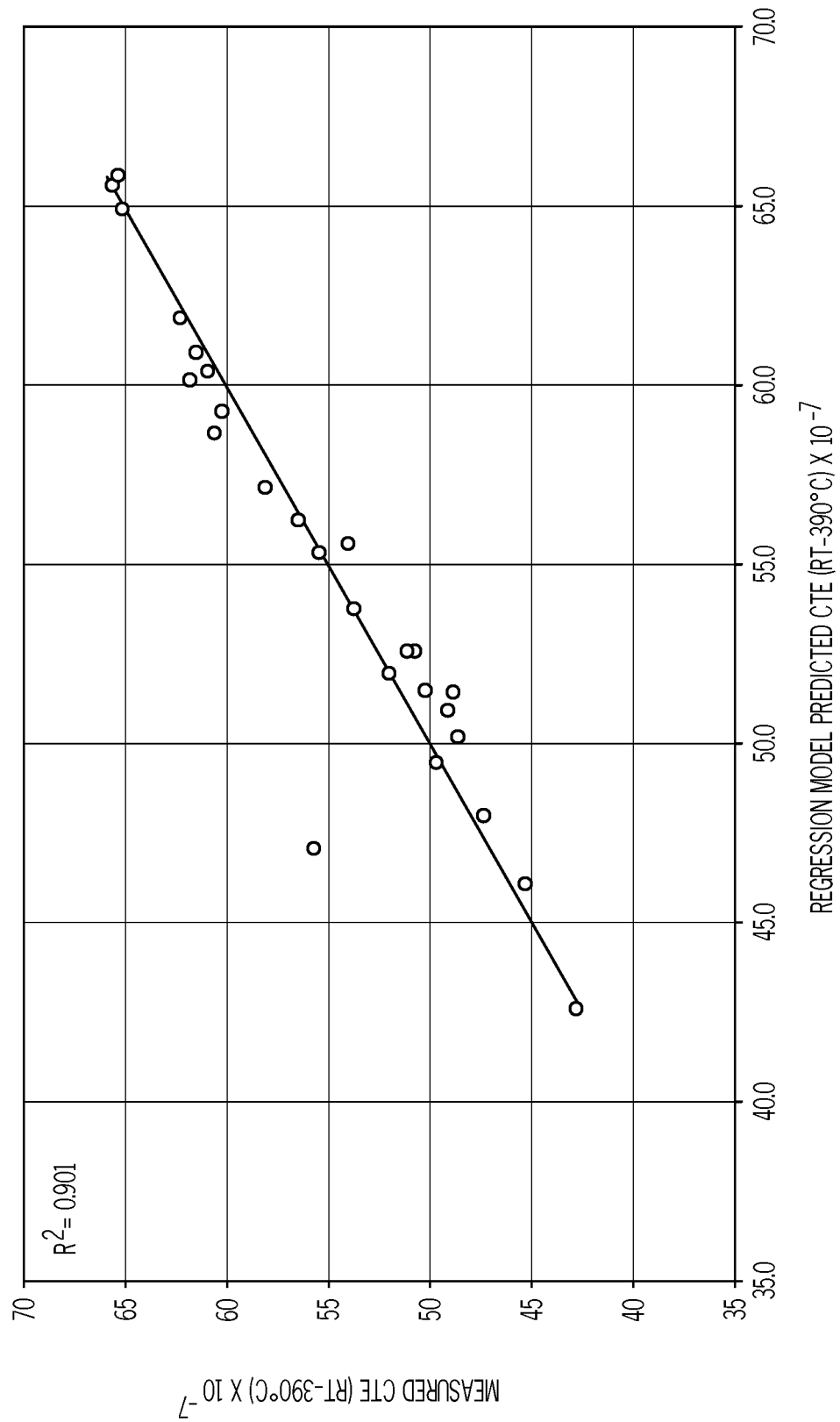
FIG. 13 is a plot of the measured CTE (Y-axis; values×10$^{-7}$/° C.) as a function of the predicted CTE (X-axis; values×10$^{-7}$/° C.) over 20° C. to 390° C. for example glass compositions in accordance with one or more embodiments shown and described herein.

The predicted results from these linear regression models are provided in Table 22 above. As shown in Table 22, each of the glass compositions is expected to have a CTE between $40 \times 10^{-7}/°$ C. and $70 \times 10^{-7}/°$ C. The agreement between the measured and predicted values is shown in FIGS. 12 and 13. Specifically, FIG. 12 is a plot of the measured CTE (Y-axis; values×$10^{-7}/°$ C.) as a function of the predicted CTE (X-axis; values×$10^{-7}/°$ C.) over 20° C. to 300° C. for the glasses from Table 21. FIG. 13 is a plot of the measured CTE (Y-axis; values×$10^{-7}/°$ C.) as a function of the predicted CTE (X-axis; values×$10^{-7}/°$ C.) over 20° C. to 390° C. for the glasses from Table 21. As may be seen from the $R^2$ value for both of FIGS. 12 and 13, the model has a high predictive capability for CTE from $40-70 \times 10^{-7}/°$ C. measured from 20° C. to 300° C. and from 20° C. to 390° C.

Additional glass compositions having CTEs between $80 \times 10^{-7}/°$ C. and $100 \times 10^{-7}/°$ C. measured over 20° C. to 300° C. and 20° C. to 390° C. are provided in Table 24, and predicted CTE values are provided in Table 25.

TABLE 24

Table 24: Adjustable Glass Compositions with CTE in the range of 80-100 × $10^{-7}/°$ C. over 20° C. to 300° C. and 20° C. to 390° C. (Reported in Oxide wt %)

| | $SiO_2$ | $Al_2O_3$ | $B_2O_3$ | $Na_2O$ | $K_2O$ | MgO | CaO | $TiO_2$ | ZnO | $Sb_2O_3$ |
|---|---|---|---|---|---|---|---|---|---|---|
| Comp. 172 | 62.77 | 2.87 | 0.8 | 8.33 | 9.16 | 3.03 | 0.04 | 0.7 | 11.15 | 0.43 |
| Comp. 173 | 61.45 | 2.78 | 0.92 | 8.29 | 9.15 | 3.31 | 0.041 | 0.69 | 11.98 | 0.44 |
| Comp. 174 | 62.96 | 2.913 | 0.95 | 16.35 | 0.01 | 4.125 | 0.051 | 0.695 | 11.45 | 0.44 |
| Comp. 175 | 62.9 | 2.96 | 0.82 | 15.31 | 0.01 | 4.98 | 0.06 | 0.7 | 11.64 | 0.4 |
| Comp. 176 | 62.93 | 2.923 | 0.95 | 14.41 | 0.009 | 6.127 | 0.068 | 0.695 | 11.44 | 0.44 |
| Comp. 177 | 63.01 | 2.91 | 0.79 | 13.64 | 0 | 6.79 | 0.07 | 0.7 | 11.38 | 0.44 |
| Comp. 178 | 62.84 | 2.905 | 0.95 | 13.59 | 0.01 | 7.144 | 0.075 | 0.693 | 11.42 | 0.438 |
| Comp. 179 | 61.03 | 2.81 | 0.87 | 13.42 | 0.009 | 8.255 | 0.081 | 0.676 | 12.57 | 0.407 |
| Comp. 180 | 63.42 | 2.92 | 0.94 | 13.16 | 0 | 7.15 | 0.08 | 0.7 | 11.35 | 0.44 |
| Comp. 181 | 59.69 | 2.72 | 0.9 | 12.86 | 0.009 | 9.76 | 0.09 | 0.671 | 12.77 | 0.417 |
| Comp. 182 | 63.38 | 2.93 | 0.74 | 12.66 | 0.01 | 7.48 | 0.08 | 0.7 | 11.27 | 0.44 |
| Comp. 183 | 64.19 | 3.1 | 0.94 | 12.7 | 0.01 | 6.96 | 0.075 | 0.7 | 10.82 | 0.38 |
| Comp. 184 | 63.53 | 2.93 | 0.91 | 12.24 | 0.01 | 7.87 | 0.09 | 0.7 | 11.25 | 0.44 |
| Comp. 185 | 63.07 | 2.91 | 0.95 | 13.09 | 0.009 | 7.48 | 0.078 | 0.69 | 11.45 | 0.44 |
| Comp. 186 | 62.66 | 2.89 | 0.94 | 13.54 | 0.009 | 7.44 | 0.08 | 0.69 | 11.36 | 0.44 |
| Comp. 187 | 63.46 | 2.99 | 0.87 | 13.34 | 0.009 | 6.57 | 0.071 | 0.69 | 11.56 | 0.42 |
| Comp. 188 | 63.23 | 2.99 | 0.86 | 13.89 | 0.009 | 6.5 | 0.07 | 0.68 | 11.44 | 0.42 |
| Comp. 189 | 63.05 | 2.9 | 0.95 | 13.34 | 0.01 | 7.18 | 0.076 | 0.69 | 11.4 | 0.44 |
| Comp. 190 | 62.69 | 2.89 | 0.94 | 13.79 | 0.009 | 7.15 | 0.076 | 0.69 | 11.41 | 0.44 |

TABLE 25

Table 25: Properties of Adjustable Glass Compositions with CTE in the range of 80-100 × $10^{-7}/°$ C. over 20° C. to 300° C. and 20° C. to 390° C.

| | Measured CTE (20° C.-300° C.) | Predicted CTE (20° C.-300° C.) | Measured CTE (20° C.-390° C.) | Predicted CTE (20° C.-390° C.) |
|---|---|---|---|---|
| Comp. 172 | 99.8 | 99.51 | 101.7 | 101.3 |
| Comp. 173 | 98.6 | 98.89 | 100.8 | 101.2 |
| Comp. 174 | 95 | 94.00 | 97.7 | 97.3 |
| Comp. 175 | 90 | 89.99 | 92.8 | 93.0 |
| Comp. 176 | 85.1 | 86.79 | 89.9 | 89.7 |
| Comp. 177 | 84.5 | 84.48 | 86.9 | 86.8 |
| Comp. 178 | 83.3 | 83.87 | 85.9 | 86.5 |
| Comp. 179 | 82.7 | 82.72 | 85.3 | 85.4 |
| Comp. 180 | 82.4 | 82.14 | 84.7 | 84.6 |
| Comp. 181 | 81.5 | 81.12 | 84 | 83.6 |
| Comp. 182 | 80.3 | 80.53 | 82.1 | 82.3 |
| Comp. 183 | 80.4 | 80.03 | 82.8 | 82.8 |
| Comp. 184 | 78.9 | 78.48 | 80.9 | 80.4 |
| Comp. 185 | 82.6 | 81.79 | 85 | 84.3 |
| Comp. 186 | 82.8 | 83.55 | 84.9 | 85.9 |
| Comp. 187 | 81.9 | 82.13 | 84.4 | 84.7 |
| Comp. 188 | 83.8 | 83.89 | 86.6 | 86.4 |
| Comp. 189 | 82.8 | 82.74 | 85.1 | 85.2 |
| Comp. 190 | 84.8 | 84.54 | 87 | 87.1 |

Standard linear regression analysis was used to construct a predictive model for CTE over 20° C. to 300° C. and over 20° C. to 390° C. based on the compositions provided in Table 24 and corresponding measured properties. The regression coefficients that were obtained are provided in Table 26.

TABLE 26

Table 26: Linear Regression Coefficients for CTE over 20° C. to 300° C. and 20° C. to 390° C.

| Oxide | CTE (20° C.-300° C.) | Coefficient | CTE (20° C.-390° C.) | Coefficient |
|---|---|---|---|---|
| $SiO_2$ | Intercept | 12.4017 | Intercept | −24.4848 |
| $Al_2O_3$ | X Variable 1 | −4.18178 | X Variable 1 | −0.37352 |
| $B_2O_3$ | X Variable 2 | −0.3376 | X Variable 2 | 2.690242 |
| $Na_2O$ | X Variable 3 | 3.983931 | X Variable 3 | 4.298453 |
| $K_2O$ | X Variable 4 | 4.043165 | X Variable 4 | 4.238349 |
| MgO | X Variable 5 | 0.820754 | X Variable 5 | 1.194832 |
| CaO | X Variable 6 | −64.9976 | X Variable 6 | −100.006 |
| $TiO_2$ | X Variable 7 | 49.88685 | X Variable 7 | 69.03159 |
| ZnO | X Variable 8 | −0.50671 | X Variable 8 | 0.193678 |

Figure 14:
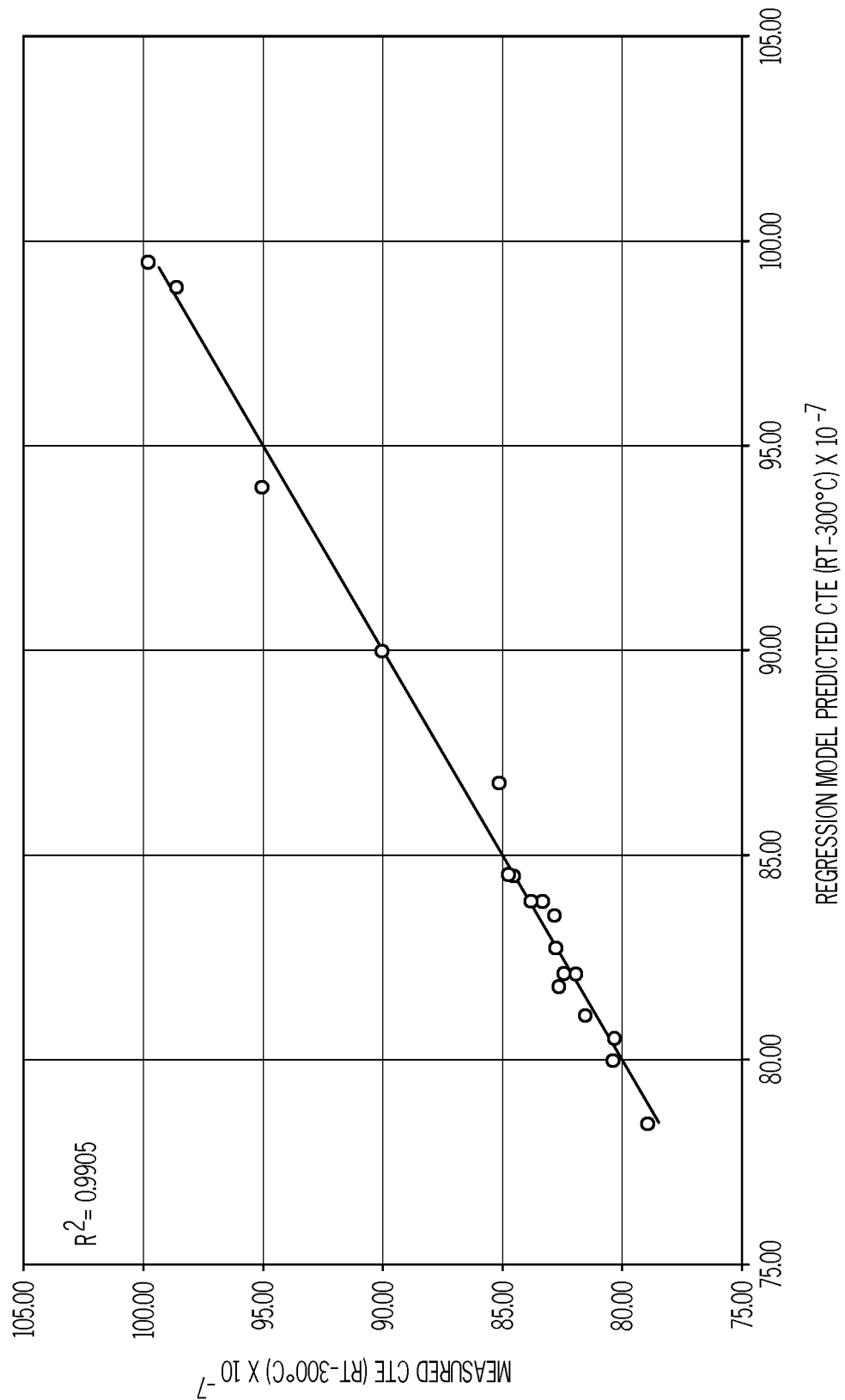
FIG. 14 is a plot of the measured CTE (Y-axis; values×10$^{-7}$/° C.) as a function of the predicted CTE (X-axis; values×10$^{-7}$/° C.) over 20° C. to 300° C. for example glass compositions in accordance with one or more embodiments shown and described herein.
Figure 15:
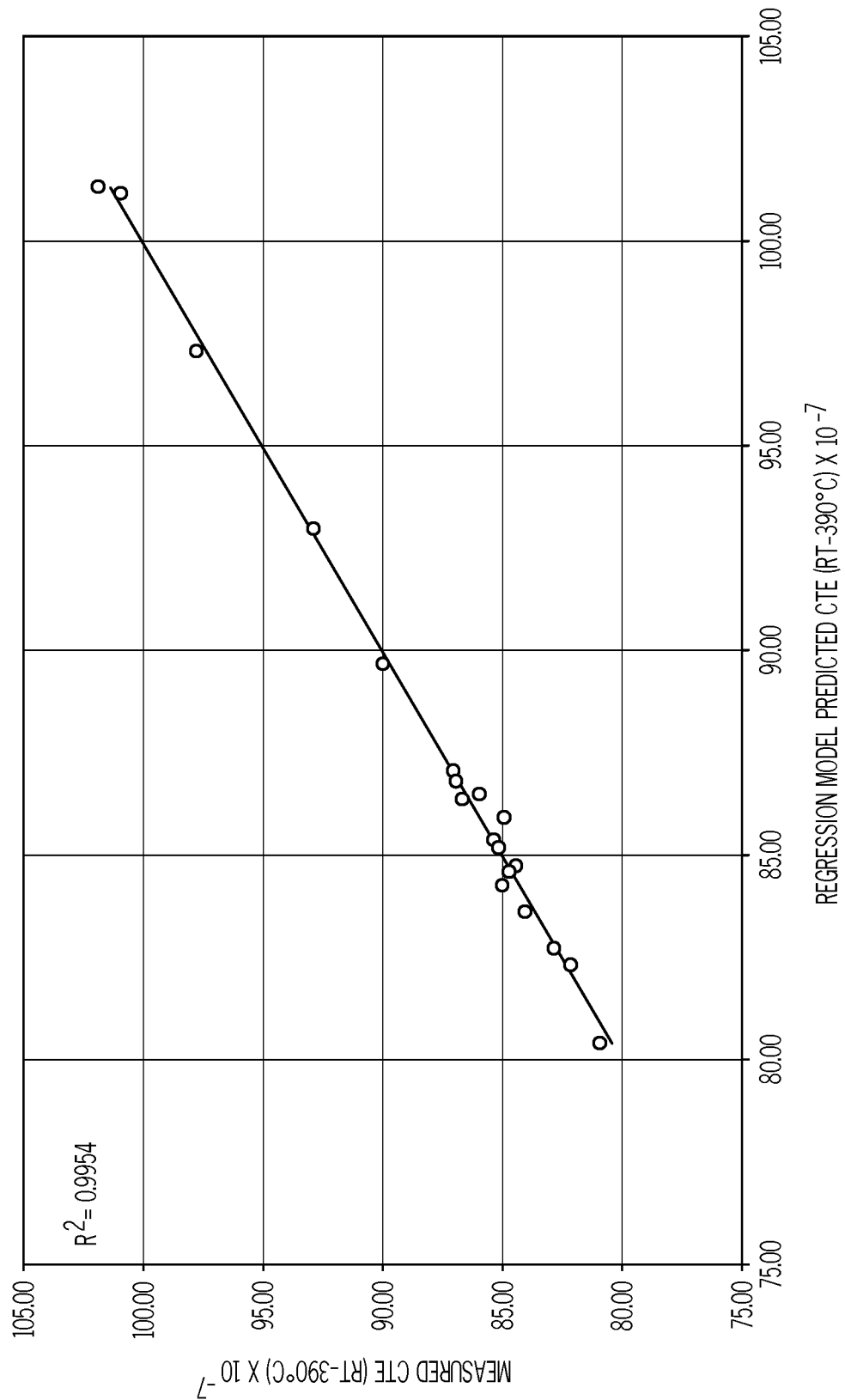
FIG. 15 is a plot of the measured CTE (Y-axis; values×10$^{-7}$/° C.) as a function of the predicted CTE (X-axis; values×10$^{-7}$/° C.) over 20° C. to 390° C. for example glass compositions in accordance with one or more embodiments shown and described herein.

The predicted results from these linear regression models are provided in Table 25 above. As shown in Table 25, each of the glass compositions is expected to have a CTE between $80 \times 10^{-7}/°$ C. and $100 \times 10^{-7}/°$ C. The agreement between the measured and predicted values is shown in FIGS. 14 and 15. Specifically, FIG. 14 is a plot of the measured CTE (Y-axis; values×$10^{-7}/°$ C.) as a function of the predicted CTE (X-axis; values×$10^{-7}/°$ C.) over 20° C. to 300° C. for the glasses from Table 23. FIG. 15 is a plot of the measured CTE (Y-axis; values×$10^{-7}/°$ C.) as a function of the predicted CTE (X-axis; values×$10^{-7}/°$ C.) over 20° C. to 390° C. for the glasses from Table 23. As may be seen from the $R^2$ value for both of FIGS. 14 and 15, the model has a high predictive capability for CTE from $80-100 \times 10^{-7}/°$ C. measured from 20° C. to 300° C. and from 20° C. to 390° C.

Example 5

During a production run of the method described above, it was discovered that the viscosity of the glass was not conducive to the forming process being used. Referring to FIG. 1, this forming process involved flowing glass from a downcomer 9 into a forming vessel 10 to form a boule. The steep viscosity curve of the glass resulted in the boule forms not filling completely the forming vessel 10. The glass accumulated in the center directly beneath the downcomer 9 and would not flow to the edges of the forming vessel 10. After the forming vessel 10 was allowed to fill for a pre-determined amount of time, the forming vessel 10 was moved away from the downcomer 9, and a press was used to force the glass outward toward the edges of the mold. When the glass viscosity was too high, the press was not able to move the glass enough to fill properly the forming vessel 10, causing boules that did not have the desired dimensions for the boule. An unacceptable boule has a rounded edge and a non-uniform thickness throughout, whereas a properly made boule has straight edges and maintains a uniform thickness throughout. To correct this issue, the steepness of the viscosity curve may be reduced so the glass will flow more during filling of the forming vessel 10 and will remain fluid enough during the subsequent pressing that it will move outward to fill the entire forming vessel 10.

Adding fluorine to the glass lowers the viscosity of the glass at both melting and forming temperatures; however, the fluorine has a larger impact at lower temperatures. Thus, fluorine softens the glass more at the forming temperatures than at melting temperatures, resulting in a shallower viscosity curve. Several glasses at various CTE values were melted with fluorine (in the form of $AlF_3$) and properties were measured. Table 27 shows the compositions melted with fluorine along with data including viscosity, coefficient of thermal expansion (CTE) and elastic modulus. Included in these tables is also the measured CTE and elastic modulus for the same composition without fluorine. In addition, a liquidus temperature of 1200° C. was measured for Composition 193, the liquid phase of which was a Ca/Na solid solution feldspar.

TABLE 27

Table 27: Compositions with fluorine added and property data

| Oxide (wt %) | Comp. 191 | Comp. 192 | Comp. 193 | Comp. 194 | Comp. 195 | Comp. 196 | Comp. 197 |
|---|---|---|---|---|---|---|---|
| $SiO_2$ | 49.56 | 49.96 | 47.68 | 47.65 | 45.43 | 45.68 | 46.39 |
| $Al_2O_3$ | 24.79 | 24.56 | 24.91 | 24.86 | 24.41 | 24.2 | 24.61 |
| $B_2O_3$ | 9.75 | 9.66 | 9.31 | 9.24 | 8.61 | 8.64 | 8.98 |
| $Na_2O$ | 3.2 | 3.8 | 7.23 | 7.2 | 5 | 4.46 | 2.69 |
| MgO | 3.43 | 2.83 | 1.3 | 1.29 | 6.53 | 6.3 | 6.43 |
| CaO | 8.09 | 7.99 | 8.19 | 8.15 | 9.38 | 9.32 | 9.42 |
| $AlF_3$ | 0.83 | 0.83 | 0.75 | 1.03 | 1.29 | 1.28 | 1.34 |
| $Sb_2O_3$ | 0.6 | 0.58 | 0.51 | 0.51 | 0.50 | 0.5 | 0.55 |
| Measured CTE w/o $F^1$ (×$10^{-7}/°$ C.) | 47.5 | 49.1 | 61.6 | 61.6 | 58.70 | 55.9 | 50.2 |
| Measured CTE (×$10^{-7}/°$ C.) | 47.8 | 48.7 | 62.6 | 62 | 60.3 | 57 | 51.6 |
| Modeled CTE (×$10^{-7}/°$ C.) | 47.7 | 49 | 61.1 | 60.8 | 58.5 | 56 | 50.1 |
| Measured Young's Modulus w/o $F^1$ (GPa) | 80.48 | 79.10 | 76 | 76 | 85.3 | 85.7 | 86.8 |
| Measured Young's Modulus (GPa) | 79.9 | 78.3 | 75.4 | 75 | 84.7 | 84.3 | 85.2 |
| Modeled Young's Modulus (GPa) | 78.8 | 77 | 73.8 | 73.7 | 84.6 | 84 | 85.6 |
| Measured 200 P temperature (° C.) | 1417 | $N/D^2$ | $N/D^2$ | $N/D^2$ | $N/D^2$ | $N/D^2$ | 1303 |
| Measured 400 P temperature (° C.) | 1350 | $N/D^2$ | $N/D^2$ | $N/D^2$ | $N/D^2$ | $N/D^2$ | 1251 |

TABLE 27-continued

Table 27: Compositions with fluorine added and property data

| | | | | | | | |
|---|---|---|---|---|---|---|---|
| Measured 2000 P temperature (° C.) | 1224 | N/D[2] | N/D[2] | N/D[2] | N/D[2] | N/D[2] | 1150 |
| Measured 4000 P temperature (° C.) | 1179 | N/D[2] | N/D[2] | N/D[2] | N/D[2] | N/D[2] | 1113 |
| Measured 35000 P temperature (° C.) | 1064 | N/D[2] | N/D[2] | N/D[2] | N/D[2] | N/D[2] | 1019 |

| Oxide (wt %) | Comp. 198 | Comp. 199 | Comp. 200 | Comp. 201 | Comp. 202 | Comp. 203 |
|---|---|---|---|---|---|---|
| $SiO_2$ | 46.95 | 44.26 | 43.98 | 43.11 | 42.23 | 41.77 |
| $Al_2O_3$ | 24.73 | 24.71 | 24.41 | 24.34 | 24.27 | 24.25 |
| $B_2O_3$ | 8.882 | 8.82 | 8.24 | 7.29 | 7.18 | 8.02 |
| $Na_2O$ | 2.1 | 4.66 | 8.69 | 9.43 | 10.22 | 10.23 |
| MgO | 6.45 | 6.46 | 5.93 | 5.76 | 6.07 | 6 |
| CaO | 9.43 | 9.39 | 7.01 | 8.45 | 8.33 | 8.12 |
| $AlF_3$ | 1.28 | 1.28 | 1.03 | 0.97 | 1.01 | 1.11 |
| $Sb_2O_3$ | 0.52 | 0.51 | 0.52 | 0.52 | 0.52 | 0.54 |
| Measured CTE w/o F[1] ($\times 10^{-7}$/° C.) | 49.4 | 57.6 | 68.6 | 75 | 78.4 | 76.7 |
| Measured CTE ($\times 10^{-7}$/° C.) | 49 | 59 | 71 | 74.8 | 78.6 | N/D[2] |
| Modeled CTE ($\times 10^{-7}$/° C.) | 48.1 | 57.5 | 68.1 | 72.8 | 75.8 | 75.4 |
| Measured Young's Modulus w/o F[1] (GPa) | 87.2 | 85.6 | 80.8 | 80.5 | 80.8 | 80.6 |
| Measured Young's Modulus (GPa) | 86.4 | 84.9 | 80.1 | 81.7 | 81.7 | N/D[2] |
| Modeled Young's Modulus (GPa) | 86.2 | 85 | 80 | 81 | 81.1 | 80.3 |
| Measured 200 P temperature (° C.) | 1319 | 1275 | 1287 | 1271 | 1258 | N/D[2] |
| Measured 400 P temperature (° C.) | 1265 | 1223 | 1227 | 1212 | 1200 | N/D[2] |
| Measured 2000 P temperature (° C.) | 1162 | 1121 | 1113 | 1100 | 1088 | N/D[2] |
| Measured 4000 P temperature (° C.) | 1126 | 1084 | 1073 | 1061 | 1049 | N/D[2] |
| Measured 35000 P temperature (° C.) | 1031 | 990 | 969 | 961 | 948 | N/D[2] |

Figure 16:
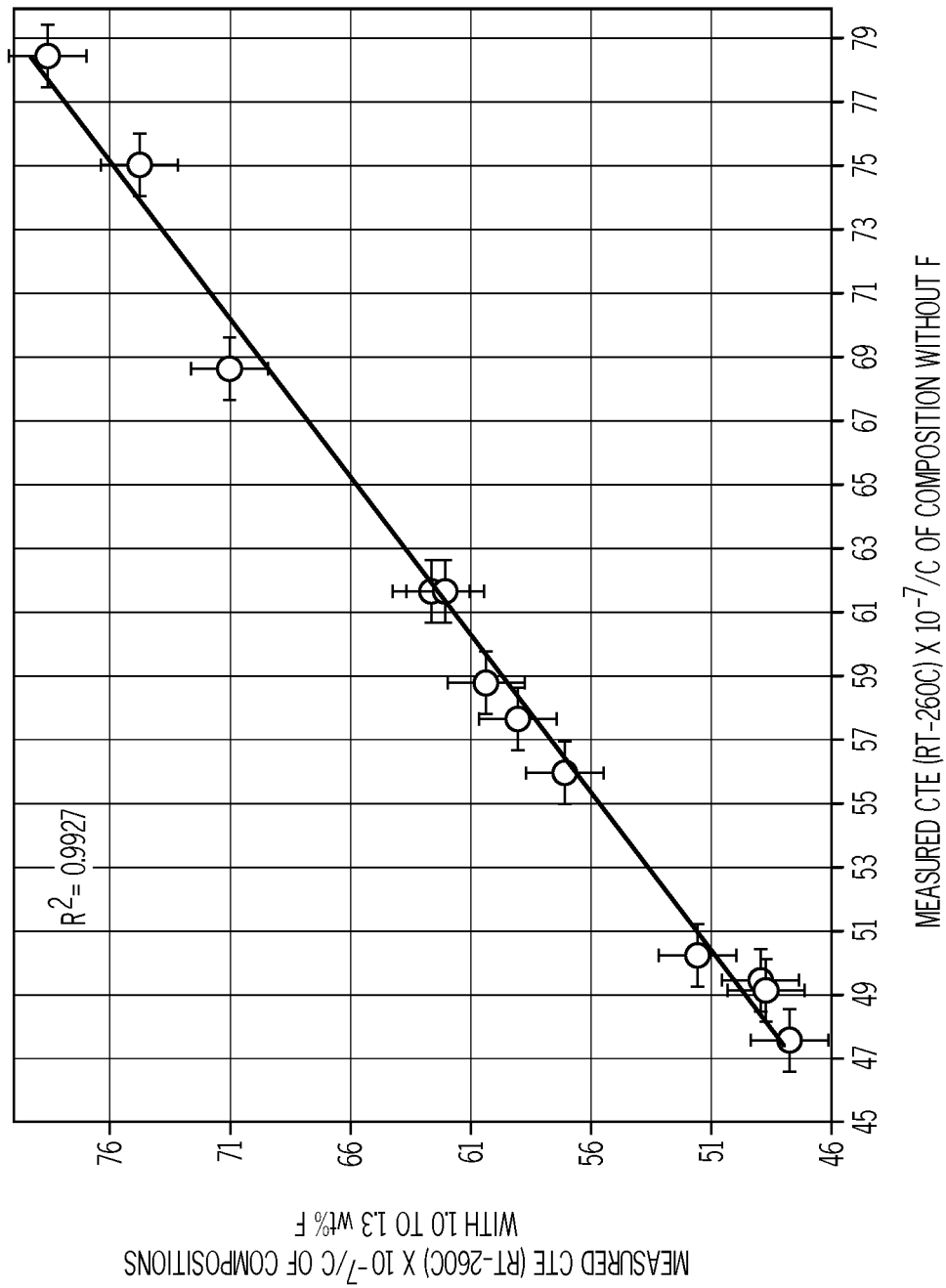
FIG. 16 is a plot of the measured CTE of several glasses containing fluorine (Y-axis; values×10$^{-7}$/° C.) versus the CTE of those same glasses made without fluorine (X-axis; values×10$^{-7}$/° C.) in accordance with one or more embodiments shown and described herein.

[1]w/o F refers to the same glass composition without $AlF_3$.
[2]N/D = not determined FIG. 16 is a plot of the measured CTE of several glasses containing fluorine (Y-axis; values×$10^{-7}$/° C.) versus the CTE of those same glasses made without fluorine (X-axis; values×$10^{-7}$/° C.). As shown in FIG. 16, and in particular the trend line slope of about 1.0, the addition of up to about 1.3 weight % of fluorine does not produce a significant impact on measured CTE of the glasses. From the size of the error bars, it is possible to conclude that the difference between the CTE of the glasses with and without fluorine is within the accuracy of the measurement system.

Figure 17:
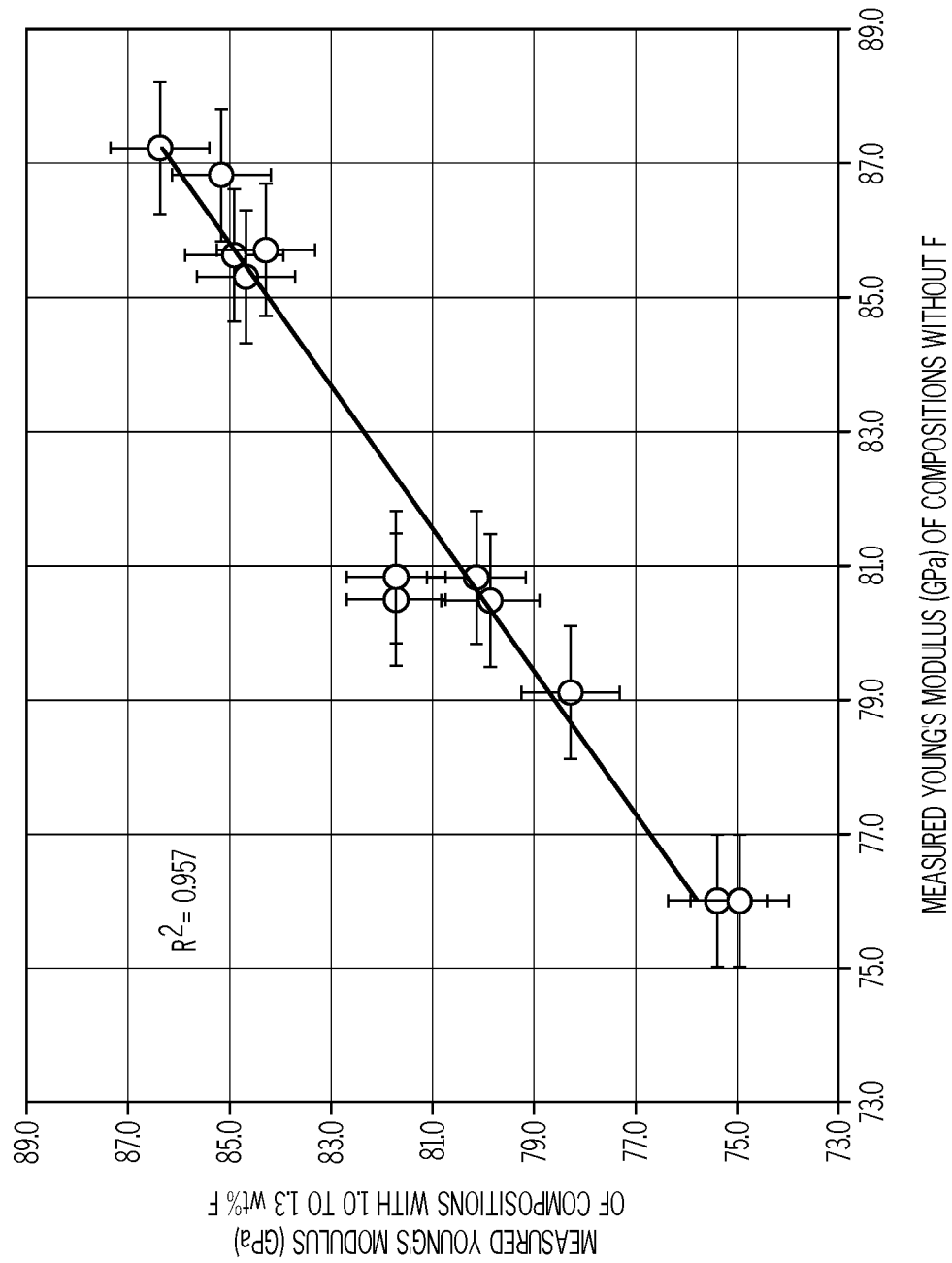
FIG. 17 is a plot of the measured elastic modulus of several glasses containing fluorine (Y-axis; values in GPa) versus the measured elastic modulus of those same glasses made without fluorine (X-axis; values in GPa) in accordance with one or more embodiments shown and described herein.

FIG. 17 is a plot of the measured elastic modulus of several glasses containing fluorine (Y-axis; values in GPa) versus the measured elastic modulus of those same glasses made without fluorine (X-axis; values in GPa). As shown in FIG. 17, and in particular the trend line slope of about 1.0, the addition of up to about 1.3 weight % of fluorine does not produce a significant impact on measured elastic modulus of the glasses. From the size of the error bars, it is possible to conclude that the difference between the elastic modulus of the glasses with and without fluorine is within the accuracy of the measurement system.

Figure 18:
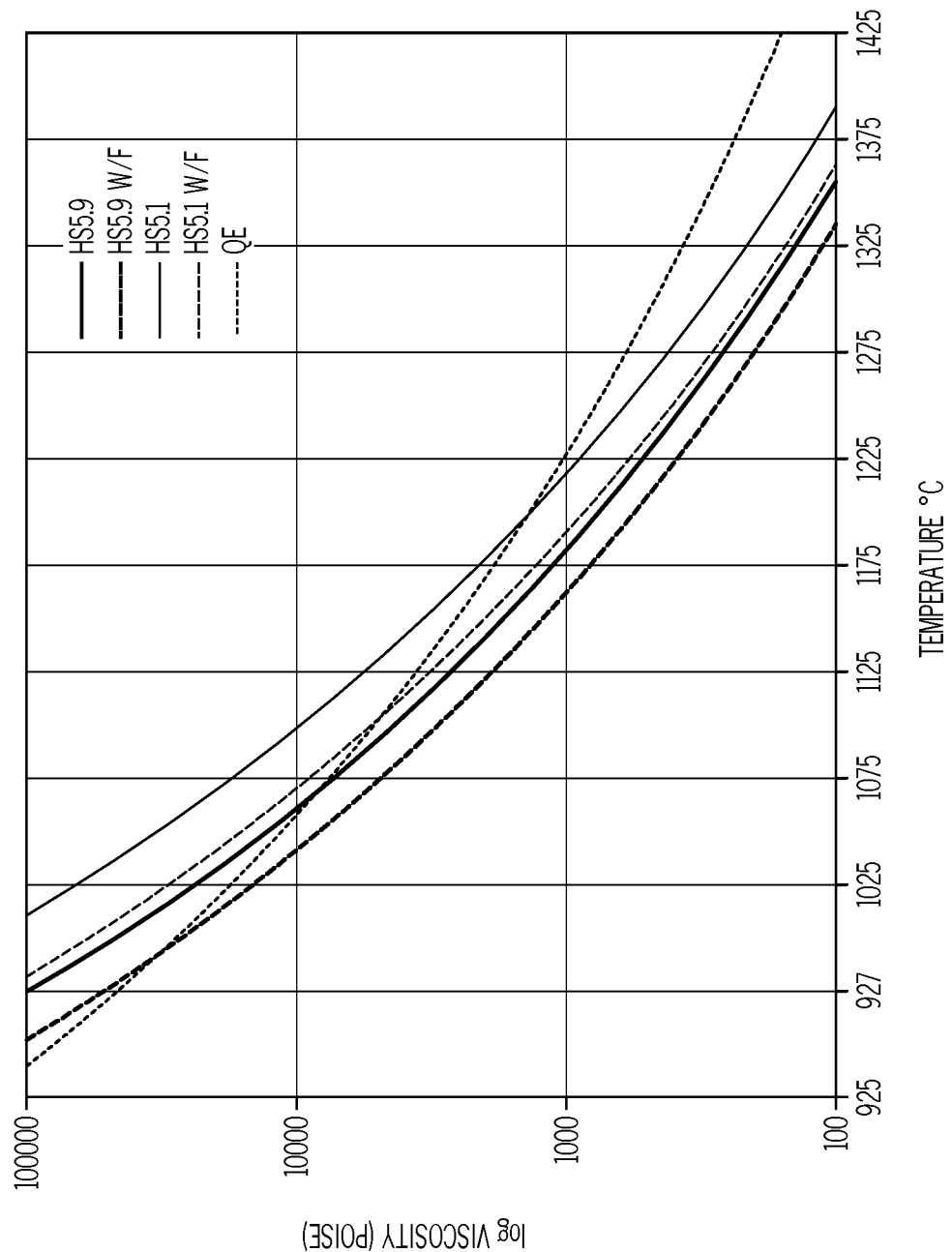
FIG. 18 is a plot of log viscosity (Y-axis; values in Poise) versus temperature (X-axis; values in ° C.) for two of the fluorine-free production glasses, HS5.1 and HS5.9, compared to the same glass compositions with 1.3 weight % fluorine and a standard production glass, QE, in accordance with one or more embodiments shown and described herein.

FIG. 18 is a plot of log viscosity (Y-axis; values in Poise) versus temperature (X-axis; values in ° C.) for two of the fluorine-free production glasses, HS5.1 and HS5.9, compared to the same glass compositions with 1.3 weight % fluorine and a standard production glass, QE. As can be seen in FIG. 18, the addition of fluorine to the HS5.1 and HS5.9 glasses results in a lowering of the glass high temperature viscosity and also causes a shallowing of the viscosity curve as compared to the viscosity curve of the glass without fluorine. The standard production glass, QE, exhibits the shallowest viscosity curve slope, and thus is the most processable of the tested systems. However, the observed differences in behavior of the glasses with fluorine are sufficient to allow boule production. This change in viscosity was shown to aid forming boules in a production melt.

Figure 19:
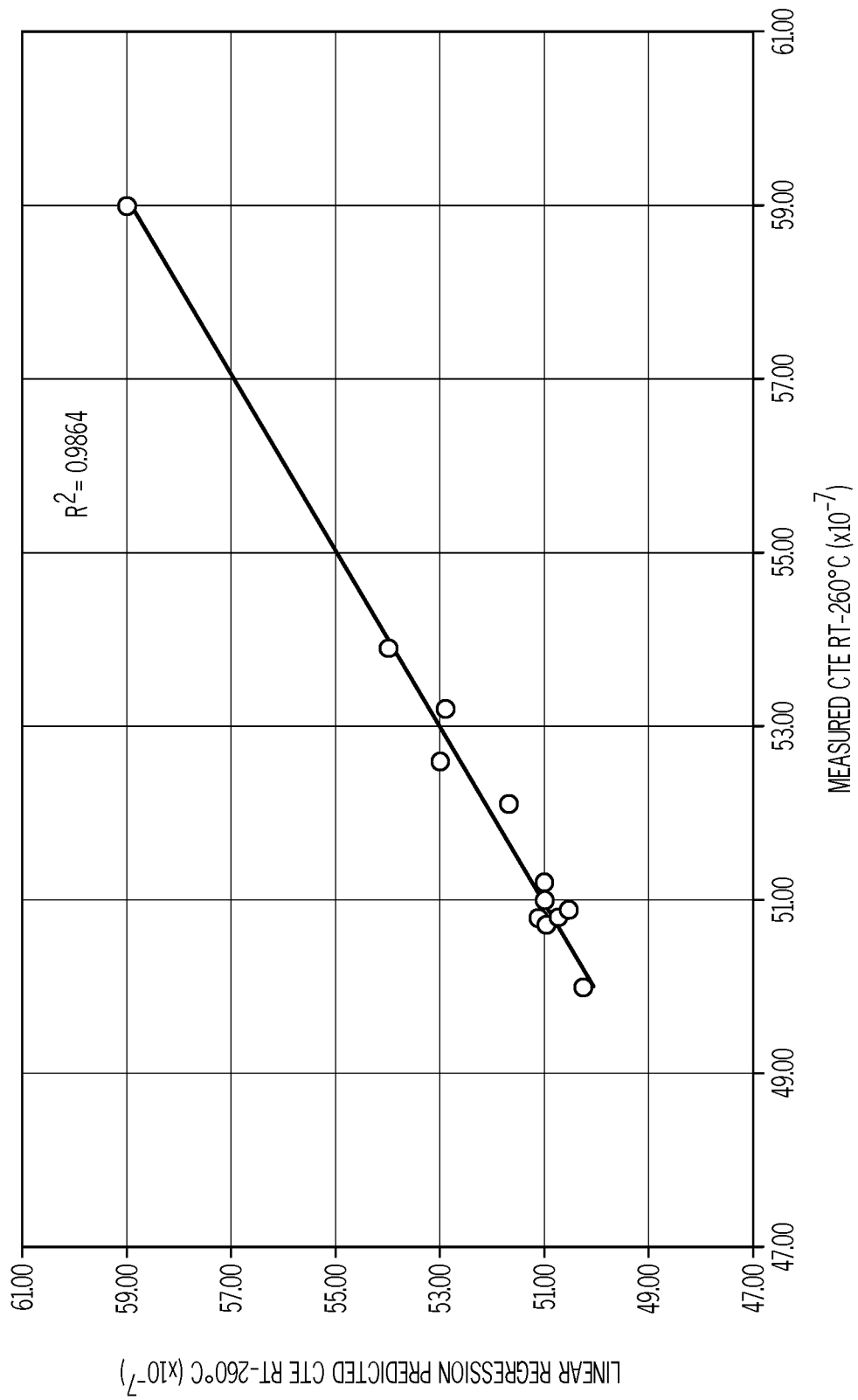
FIG. 19 is a plot of the predicted CTE (Y-axis; values×10$^{-7}$/° C.) versus the measured CTE (X-axis; values×10$^{-7}$/° C.) for exemplary fluorine-containing glass compositions in accordance with one or more embodiments shown and described herein.

FIG. 19 is a plot of the predicted CTE (Y-axis; values×$10^{-7}$/° C.) versus the measured CTE (X-axis; values×$10^{-7}$/° C.) for exemplary fluorine-containing glass compositions. As may be seen from the $R^2$ value of FIG. 19, the model has a high predictive capability for CTE from 50-59×$10^{-7}$/° C. measured from 20° C. to 260° C.

Figure 20:
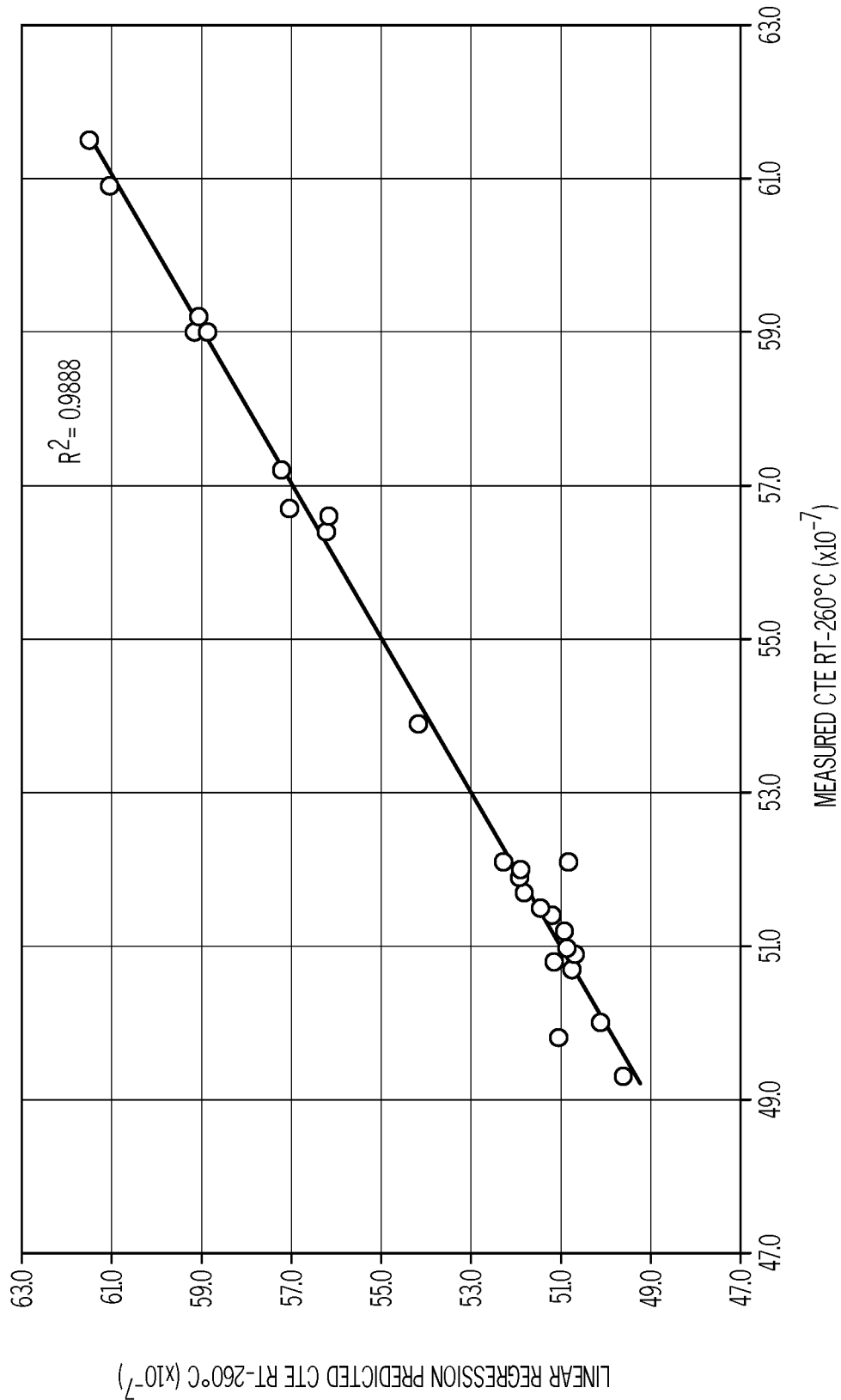
FIG. 20 is a plot of the predicted CTE (Y-axis; values×10$^{-7}$/° C.) versus the measured CTE (X-axis; values×10$^{-7}$/°

FIG. 20 is a plot of the predicted CTE (Y-axis; values×$10^{-7}$/° C.) versus the measured CTE (X-axis; values×$10^{-7}$/° C.) for exemplary fluorine-containing glass compositions. As may be seen from the $R^2$ value of FIG. 20, the model has a high predictive capability for CTE from 49-62×$10^{-7}$/° C. measured from 20° C. to 260° C.

FIG. 21 is a plot of the predicted CTE (Y-axis; values×$10^{-7}$/° C.) versus the measured CTE (X-axis; values×$10^{-7}$/° C.) for exemplary fluorine-containing glass compositions. As may be seen from the $R^2$ value of FIG. 21, the model has a high predictive capability for CTE from 70-80×$10^{-7}$/° C. measured from 20° C. to 260° C.

FIG. 22 is a plot of the predicted CTE (Y-axis; values×$10^{-7}$/° C.) versus the measured CTE (X-axis; values×$10^{-7}$/° C.) for exemplary fluorine-containing glass compositions. As may be seen from the $R^2$ value of FIG. 22, the model has a high predictive capability for CTE from 68-80×$10^{-7}$/° C. measured from 20° C. to 260° C.

FIG. 23 is a plot of the predicted Young's modulus (Y-axis; GPa) versus the measured Young's modulus (X-axis; GPa) for exemplary fluorine-containing glass compositions. As may be seen from the $R^2$ value of FIG. 23, the model has predictive capability for Young's modulus for materials having a CTE ranging from 50-59×$10^{-7}$/° C. measured from 20° C. to 260° C.

FIG. 24 is a plot of the predicted Young's modulus (Y-axis; GPa) versus the measured Young's modulus (X-axis; GPa) for exemplary fluorine-containing glass compositions. As may be seen from the $R^2$ value of FIG. 24, the model has predictive capability for Young's modulus for materials having a CTE ranging from 49-62×$10^{-7}$/° C. measured from 20° C. to 260° C.

FIG. 25 is a plot of the predicted Young's modulus (Y-axis; GPa) versus the measured Young's modulus (X-axis; GPa) for exemplary fluorine-containing glass compositions. As may be seen from the $R^2$ value of FIG. 25, the model has predictive capability for Young's modulus for materials having a CTE ranging from 70-80×$10^{-7}$/° C. measured from 20° C. to 260° C.

FIGS. 26 and 27 are plots of the predicted Young's modulus (Y-axis; GPa), using alternative models, versus the measured Young's modulus (X-axis; GPa) for exemplary fluorine-containing glass compositions. As may be seen from the $R^2$ value of FIGS. 26 and 27, these models do not have significant predictive capability for Young's modulus for materials having a CTE ranging from 70-80×$10^{-7}$/° C. measured from 20° C. to 260° C. Without intending to be bound by any particular theory, it is believe these correlations were poor due to a limited volume of CTE and Young's modulus data over this range of glass compositions.

Embodiments described herein include methods for manufacturing glass articles, having adjustable CTEs and other properties, that may be used in electronic devices such as semiconductor devices, display devices, sensors, and the like. In some embodiments, the method includes melting a first glass composition in a melter and feeding a second glass composition may into the melter. This second glass composition includes the same combination of glass constituent components but at least one glass constituent component has a concentration that is different from the concentration of the same component in the first glass composition. Glass articles may be drawn from the melter while maintaining the contents of the melter in a molten state, including: (1) a first glass article that is formed from the first glass composition; (2) at least one intermediate glass article that is composed of neither the first glass composition nor the second glass composition and which may be drawn either simultaneously with the feeding of the second glass composition or at some different time; (3) and a final glass article that is composed of a composition that is different from the first glass composition and may be the same as or different from the second glass composition. The concentration of the at least one component in the at least one intermediate glass article may be between the concentration of the at least one component in the first glass composition and the concentration of the at least one component in the second glass composition. The first glass article may have a first set of values for a set of properties. The final glass article may have a second set of values for the same set of properties, the second set of values being different from the first set of values. The at least one intermediate glass article may have an intermediate set of values for the set of properties that is between the first set of values and the second set of values. In the same or different embodiments, the method includes replacing an amount of a first alkaline earth component or a first alkali component having a first cation field strength in the molten base glass composition with an amount of a second alkaline earth component or a second alkali component having a second cation field strength that is different from the first cation field strength, such that glass compositions with various CTEs can be obtained by making minor adjustments to a base glass composition. Various embodiments may further advantageously provide glass compositions having desirable Young's modulus and 200 Poise temperatures, which may be predicted based on linear modeling.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method comprising:
    melting, in a melter, a first glass composition comprising a combination of glass constituent components;
    feeding into the melter a second glass composition comprising the same combination of glass constituent components, wherein at least one glass constituent component of the second glass composition has a concentration that is different from a concentration of the same component of the first glass composition;
    drawing at least three glass articles from the melter while maintaining the contents of the melter in a molten state, the at least three glass articles comprising:
        a first glass article comprising the first glass composition;
        at least one intermediate glass article comprising a glass composition that is neither the first glass composition nor the second glass composition; and
        a final glass article comprising a glass composition different from the first glass composition;
    wherein:
        the first glass composition and the second glass composition both comprise $AlF_3$,
        a concentration of the at least one glass constituent component in the at least one intermediate glass article is between the concentration of the at least one glass constituent component in the first glass composition and the concentration of the at least one glass constituent component in the second glass composition, and
        the first glass article has a first set of values for a set of properties, the final glass article has a second set of values for the same set of properties, the second set of values being different from the first set of values, and the at least one intermediate glass article has an intermediate set of values for the set of properties that is between the first set of values and the second set of values.

2. The method of claim 1, wherein the final glass article comprises the second glass composition.

3. The method of claim 1, wherein the concentration of the at least one glass constituent component of the second glass composition is different from the concentration of the at least one glass constituent component of the first glass composition by no more than 2 weight %.

4. The method of claim 1, wherein the at least one glass constituent component is selected from $SiO_2$, $Al_2O_3$, $B_2O_3$, $Na_2O$, MgO, CaO, $AlF_3$, and $Sb_2O_3$.

5. The method of claim 4, wherein the at least one glass constituent component comprises $AlF_3$.

6. The method of claim 5, wherein the first glass composition comprises from greater than or equal to 0.5 wt % to less than or equal to 1.5 wt % $AlF_3$.

7. The method of claim 1, wherein the set of properties comprises one or more of a coefficient of thermal expansion ("CTE"), a Young's modulus, a density, a 200 Poise temperature, a surface quality, a refractive index, a resistivity, and an edge strength.

8. The method of claim 7, wherein the CTE of the first glass article is equal to or within $\pm 7.5 \times 10^{-7}/°$ C. different from the CTE of the final glass article.

9. The method of claim 7, wherein the refractive index of the first glass article is less than or equal to ±0.01 different from the refractive index of the final glass article.

10. The method of claim 1, wherein a viscosity of the first glass composition and of the second glass composition within the melter varies by no more than 25 Poise during the drawing of the at least three glass articles.

11. The method of claim 1, wherein a 200 Poise temperature of the first glass composition and of the second glass composition within the melter is less than or equal to 1500° C.

12. The method of claim 1, wherein the feeding the second glass composition is simultaneous with the drawing the at least three glass articles.

13. The method of claim 1, wherein the at least one intermediate glass article comprises at least 3 glass articles, each having a different concentration of the at least one glass constituent component that is between the concentration of the at least one glass constituent component in the first glass composition and the concentration of the at least one glass constituent component in the second glass composition.

14. The method of claim 1, further comprising:
feeding into the melter a third glass composition comprising the same combination of glass constituent components, wherein at least one glass constituent component has a concentration that is different from a concentration of the same component of the first glass composition and the second glass composition; and
drawing at least a first additional glass article and a final additional glass article from the melter while maintaining the contents of the melter in a molten state, the first additional glass article having a first additional set of values for the set of properties and the final additional glass article having a final additional set of values for the set of properties.

15. The method of claim 14, wherein the set of properties comprises one or more of a coefficient of thermal expansion ("CTE"), a Young's modulus, a density, a 200 Poise temperature, a surface quality, a refractive index, a resistivity, and an edge strength.

16. The method of claim 15, wherein the CTE of the first glass article is equal to or within $\pm 15 \times 10^{-7}/°$ C. different from the CTE of the final additional glass article.

17. The method of claim 14, wherein a viscosity of the first glass composition and of the second glass composition within the melter varies by no more than 25 Poise during the drawing of the first glass article and the drawing of the final additional glass article.

18. The method of claim 1, wherein the first glass composition comprises:
greater than or equal to 45 wt % and less than or equal to 55 wt % $SiO_2$;
greater than or equal to 20 wt % and less than or equal to 27 wt % $Al_2O_3$;
greater than or equal to 8 wt % and less than or equal to 10 wt % $B_2O_3$;
greater than or equal to 0 wt % and less than or equal to 8 wt % $Na_2O$;
greater than or equal to 0 wt % and less than or equal to 6 wt % MgO;
greater than or equal to 7 wt % and less than or equal to 9 wt % CaO;
greater than or equal to 0 wt % and less than or equal to 0.7 wt % $Sb_2O_3$; and
greater than 0 wt % and less than or equal to 1.5 wt % $AlF_3$.

* * * * *

UNITED STATES PATENT AND TRADEMARK OFFICE
CERTIFICATE OF CORRECTION

| | | |
|---|---|---|
| PATENT NO. | : 11,485,663 B2 | Page 1 of 1 |
| APPLICATION NO. | : 16/542585 | |
| DATED | : November 1, 2022 | |
| INVENTOR(S) | : Indrajit Dutta et al. | |

It is certified that error appears in the above-identified patent and that said Letters Patent is hereby corrected as shown below:

On the Title Page

Page 2, item [56], Column 2, Line 11, delete "(1995." and insert -- (1995). --.

Signed and Sealed this
Twenty-eighth Day of February, 2023

Katherine Kelly Vidal
*Director of the United States Patent and Trademark Office*